US011626770B2

(12) United States Patent
Miner

(10) Patent No.: US 11,626,770 B2
(45) Date of Patent: Apr. 11, 2023

(54) SYSTEMS AND METHODS FOR PROVIDING ENHANCED MECHANICAL/ELECTRICAL ENERGY STORAGE

(71) Applicant: Joshua Robert Miner, Ashburn, VA (US)

(72) Inventor: Joshua Robert Miner, Ashburn, VA (US)

(*) Notice: Subject to any disclaimer, the term of this patent is extended or adjusted under 35 U.S.C. 154(b) by 461 days.

(21) Appl. No.: 16/699,620

(22) Filed: Nov. 30, 2019

(65) Prior Publication Data

US 2020/0106333 A1 Apr. 2, 2020

Related U.S. Application Data

(63) Continuation-in-part of application No. 16/121,604, filed on Sep. 4, 2018, now Pat. No. 11,005,335.

(60) Provisional application No. 62/553,787, filed on Sep. 1, 2017.

(51) Int. Cl.
| | |
|---|---|
| *H01H 1/14* | (2006.01) |
| *H01H 3/26* | (2006.01) |
| *H02J 7/14* | (2006.01) |
| *H02K 21/02* | (2006.01) |
| *H02K 21/22* | (2006.01) |
| *H02K 7/00* | (2006.01) |
| *H02K 7/02* | (2006.01) |
| *H02P 29/40* | (2016.01) |
| *H02P 7/03* | (2016.01) |

(52) U.S. Cl.
CPC .............. *H02K 7/025* (2013.01); *H01H 1/14* (2013.01); *H01H 3/26* (2013.01); *H02J 7/1469* (2013.01); *H02K 7/006* (2013.01); *H02K 21/021* (2013.01); *H02K 21/222* (2013.01); *H02P 7/04* (2016.02); *H02P 29/40* (2016.02); *H01H 2003/266* (2013.01); *H02K 2213/09* (2013.01)

(58) Field of Classification Search
USPC ......................................................... 323/351
See application file for complete search history.

(56) References Cited

U.S. PATENT DOCUMENTS

| | | | | |
|---|---|---|---|---|
| 4,674,031 A | * | 6/1987 | Siska, Jr. ................ | G06F 1/305 |
| | | | | 361/111 |
| 11,005,335 B2 | | 5/2021 | Miner | |

(Continued)

*Primary Examiner* — Toan T Vu
*Assistant Examiner* — Xuan Ly

(57) ABSTRACT

A power apparatus, power assembly, energy assembly or energy apparatus that stores and disperses energy, the power assembly including: (1) a first and second energy object that experiences movement so as to store kinetic energy in the energy object, the energy object including a magnet assembly through which electrons are driven resulting in electric output from the magnet assembly, and the electric output dependent on experienced EMF (electro-motive force) that is experienced by the magnet assembly. The power assembly can include a switch assembly adapted to perform switching to switch between a first arrangement in which the first positive output is connected to the second positive output, and a second arrangement in which the first positive output is connected to the first negative output, and such second arrangement provides increased energy output relative to the first arrangement. A flip assembly can be provided that performs flipping of output energy.

14 Claims, 38 Drawing Sheets

(56) References Cited

U.S. PATENT DOCUMENTS

| | | | |
|---|---|---|---|
| 2008/0088200 A1* | 4/2008 | Ritchey | H02K 21/12 |
| | | | 310/112 |
| 2010/0320937 A1* | 12/2010 | Huang | H05B 45/3725 |
| | | | 315/297 |
| 2013/0178086 A1* | 7/2013 | Connell | H02B 1/42 |
| | | | 439/251 |
| 2014/0218140 A1* | 8/2014 | Dolinski | H01H 1/42 |
| | | | 335/196 |
| 2015/0300448 A1 | 10/2015 | Murphy | |
| 2016/0072373 A1* | 3/2016 | Farquharson | H02K 7/116 |
| | | | 74/DIG. 9 |
| 2016/0212854 A1* | 7/2016 | Kuroda | H01L 21/4857 |
| 2016/0285329 A1 | 9/2016 | Knapp | |
| 2016/0315521 A1 | 10/2016 | Gimlan | |
| 2017/0025922 A1* | 1/2017 | Jian | H02K 7/025 |
| 2017/0200579 A1* | 7/2017 | Song | H01H 51/2209 |
| 2019/0165659 A1 | 5/2019 | Hattori | |
| 2019/0210717 A1 | 7/2019 | Lauder | |
| 2019/0229578 A1* | 7/2019 | Chaang | F03G 7/10 |
| 2019/0372449 A1 | 12/2019 | Mills | |
| 2020/0106334 A1* | 4/2020 | Miner | H01H 3/26 |
| 2021/0152069 A1* | 5/2021 | Rich | H02K 53/00 |

* cited by examiner (Top View)

(Top View)

(Top View)

(Top View)

(Top Perspective View)

(Side View)

SYSTEMS AND METHODS FOR PROVIDING ENHANCED MECHANICAL/ELECTRICAL ENERGY STORAGE

RELATED PATENT APPLICATIONS

This application is a continuation-in-part application and claims priority to U.S. patent application Ser. No. 16/121,604 filed Sep. 4, 2018, the content of which is incorporated herein by reference in its entirety.

Such U.S. patent application Ser. No. 16/121,604 claims priority to U.S. Provisional Patent Application 62/553,787 filed Sep. 1, 2017, the content of which is incorporated herein by reference in its entirety.

BACKGROUND OF THE DISCLOSURE

Known technology is lacking in providing a truly effective system which is able to be charged and hold energy for a period of time before exerting the inputted energy. The systems and methods of the disclosure address various shortcomings of known systems.

SUMMARY OF THE DISCLOSURE

A power apparatus, power assembly, or energy apparatus that stores and disperses energy, the energy apparatus including: (1) a first and second energy object that experiences movement so as to store kinetic energy in the energy object, the energy object including a magnet assembly through which electrons are driven resulting in electric output from the magnet assembly, and the electric output dependent on experienced EMF (electro-motive force) that is experienced by the magnet assembly. The power assembly can include a switch assembly adapted to perform switching to switch between a first arrangement in which the first positive output is connected to the second positive output, and a second arrangement in which the first positive output is connected to the first negative output, and such second arrangement provides increased energy output relative to the first arrangement. A flip assembly can be provided that performs flipping of output energy.

BRIEF DESCRIPTION OF THE DRAWINGS

The present disclosure can be more fully understood by reading the following detailed description together with the accompanying drawings, in which like reference indicators are used to designate like elements, and in which.

DETAILED DESCRIPTION OF THE DISCLOSURE

Hereinafter, aspects of the disclosure in accordance with various embodiments will be described. As used herein, any term in the singular may be interpreted to be in the plural, and alternatively, any term in the plural may be interpreted to be in the singular.

As described above, known technology is lacking in providing an effective system which is able to be charged and hold energy for a period of time before exerting the inputted energy.

Figure 27:
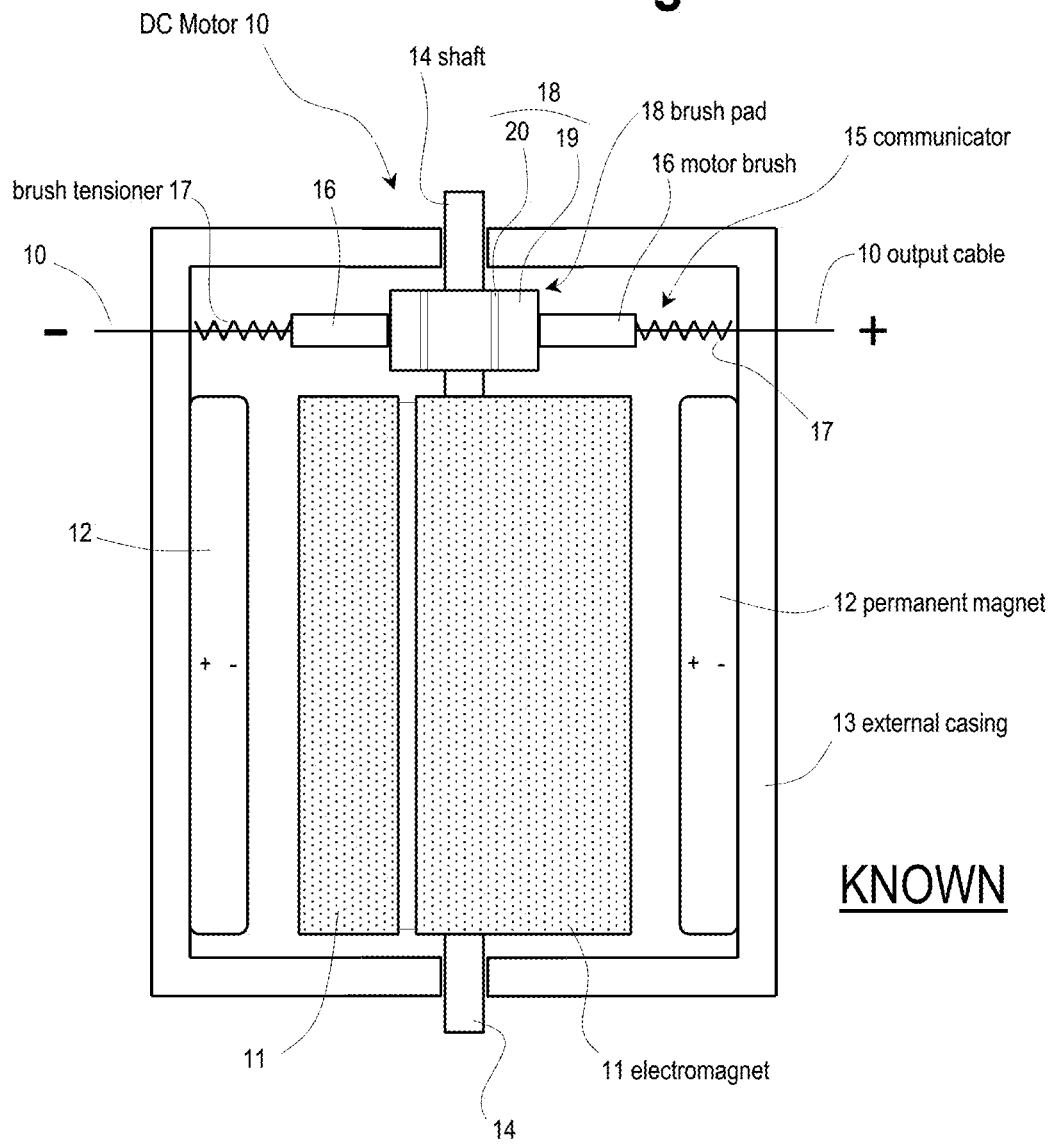
FIG. 27 is a schematic diagram of a motor.

Relatedly, FIG. 27 is a schematic diagram showing a common, known DC motor 10. A DC or Direct Current motor can utilize an electromotive force (EMF), generated by the interaction of a rotating electromagnet 11 with or in a magnetic field. This magnetic field is commonly generated by a permanent magnet 12 that is fixed to the external casing 13. Many common DC motors position the rotating electromagnets 11 around and fixed to a shaft 14 which rotates within the external casing 13. The permanent magnets 20 can have an orientation normal with respect to the rotation of the electromagnets 10 around a shaft 50.

In operation, DC motors can require a stream of current to the rotating electromagnets 10, i.e. to accelerate the electromagnets 11 under such external electrical input. As a result, the motor outputs power via shaft 14. Alternatively, the electromagnets 10 can also generate electricity via electromotive force due to the conversion of rotational kinetic energy to electrical output, i.e. if the shaft 14 is turned under an external application of force applied to the shaft.

Current is input or output from the motor via a communicator 15, which bridges the gap from the rotating electromagnets 10 to output wires or cables 10. The communicator 15, for each output, can include a motor brush 16, a brush tensioner 17, and a brush pad 18. The brush tensioner 17 can be a spring, for example, that applies pressure to the motor brush 16—so that the motor brush 16 presses against the brush pad 18. The brush pad 18 is fixed to and rotates with the motor. The brush pad 18 can include multiple conductive sections 19 and multiple insulated sections 20. The insulated sections 20 serve to separate two adjacent conductive sections 19. In known manner, as the shaft 14 rotates, each of the motor brushes 16 respectively switch from conductive section 19 to conductive section 19, in synch with respective alternating of the push and pull, and position, of the electromagnets 11 vis-à-vis the permanent magnets 12.

An AC motor utilizes many of the same components as a DC motor, except in the AC motor the electromagnets can be placed in the external casing of the system, and the permanent magnets around a rotating shaft. This type of motor additionally lacks a communicator, since the alternating of current as the motor spins can be handled by the alternating inherent in the AC current. An AC motor and DC Motor can act as a motor in the normal manner, as well as act as a generator if external force is applied to the shaft of the motor.

As used herein, a "motor" can be understood to be a structure that can input electrical energy and convert that electrical energy to physical energy. Such physical energy can be in the form of rotating a mechanical component, such as an output shaft. The output shaft can be connected to a flywheel and operate to bring the flywheel up to a desired rotational speed, so as to store energy. Alternatively, if the output shaft of such "motor" is rotated, then the motor indeed acts to output electrical energy. Accordingly, such "motor" can act as a generator—or in other words, such "motor" can be a "generator".

Systems and methods of the disclosure as described herein provide an alternative to traditional batteries, such as chemical batteries. The disclosure provides systems and methods to effectively store energy in a physical form. The disclosure, in one aspect, provides the ability to take high watt input energy and convert such input energy into a mechanical force, for example kinetic energy in rotation of a flywheel structure, before pulling energy off the mechanical force created.

The energy can be pulled off at a slower pace than such energy was originally input. Also, energy can be pulled off at a desired pace. The disclosure provides both features relating to storing energy (at an initial time) faster than the energy is utilized (at a later time) as well as various related features.

As described in this disclosure, various methodologies are provided to store energy faster than the energy is exported or "pulled off" the battery. Energy may be exported using various structure, which may respectively include advantages and drawbacks. An aspect of technology, of the disclosure, is the ability to utilize movable magnets to change the magnetic field experienced by an electric motor/generator, which includes what may be characterized as "original magnets". In a common motor, these "original magnets" can be stationary magnets that interact with "electromagnets" that are mounted on, and rotate with, a shaft of the motor. Accordingly, a variable output system can be provided to produce desired current by either having (a) the movable magnets fight against the strength of "original" magnets so as to create a neutral or lessoned magnetic field experienced by the electromagnets (of the motor), or (b) the movable magnets enhance the strength of the original magnets so as to create an enhanced magnetic field experienced by the electromagnets (of the motor). A system of the disclosure can include a set of magnets that are drawn in or pulled out of (or away from) a motor structure so as to create a desired electrical output, as described below. A system of the disclosure can include a single magnet that is either drawn in or pulled out of (or away from) a motor structure so as to create a desired electrical output. Applications of the energy storage or battery of the disclosure can include vehicles and personal power banks for personal devices, as well as a wide variety of other applications.

As used herein, a "battery" may be described as a system which is able to input energy in a charging process, hold the input energy for a period of time, and then output the stored energy as needed or desired.

In accordance with at least one aspect of the disclosure, the disclosure provides a battery system that can store energy at a faster rate with higher originating watts/torque/speed into a physical form within the system, than when energy is pulled off the system. The energy may be output to any energy consuming device as may be desired—so that such energy consuming device can perform its designated operation. In accordance with embodiments of the disclosure, a change in power input wattage and output wattage, of a system of the disclosure, can either be performed with, for example, a multistage output system or a magnetic manipulation system, as described herein.

In accordance with at least one embodiment of the disclosed subject matter, the disclosure provides a battery that utilizes or is exposed to a physical force. As a result of such exertion of physical force, energy is collected and stored in the battery in a kinetic form, e.g. in a rotating flywheel. The system provides the opportunity or ability to pull the stored energy off (of the battery) to power another system, component, mechanism or item.

As used herein, a chemical battery may be characterized as a battery which utilizes a chemical solution to store energy in a non inertial form.

In accordance with the disclosed subject matter, the technology provides a system and methodology to decrease charging time of the described battery, in accordance with the disclosed subject matter, and to maximize efficiency in power transference (after charging).

The disclosure can provide a physical system to store energy in a mechanical form in a physical mass, in conjunction with the energy being introduced into the system in an electrical form. Such may, for example, include the speeding up of a flywheel. Later, the energy stored in the physical mass can be output in an electrical form, i.e. electrical energy can be output in conjunction with a slowing down of the flywheel as energy is pulled off the system.

In accordance with the disclosure, power storage can be provided that includes a gyroscopic wheel or flywheel spinning at a designated speed. A "power-up motor" can be used to input the initial power or energy that is stored. A secondary motor or what can be characterized as an "original" or "generating motor", can be used to generate, using the stored energy, the power of the system. In accordance with one embodiment of the disclosure, the generating motor can be part of a DC motor system, an AC motor system, or another power generation system. The power-up motor, to speed up a flywheel for example, can be or be a part of a DC motor, an AC motor, or another type of motor.

Accordingly, different types of motors, such as an AC electric motor or a DC electric motor, can be used to input energy, rotation, power and/or torque to the system. However, other arrangements can be used to input energy, i.e. for example to speed up a flywheel.

A battery of the disclosure can be used in a vehicle. Illustratively, a very powerful, high watt power-up motor can be available, such as provided at a "service station" on the highway. Such power-up motor can be physically connected to the flywheel, of the battery on the vehicle, and "speed up" the flywheel so as to store energy in the form of kinetic energy. This stored energy can then be used, as needed, by a much smaller motor on the vehicle, wherein the motor on the vehicle is part of a battery system of the disclosure.

In accordance with at least one embodiment of the disclosed subject matter, kinetic energy, stored in the rotational speed of a flywheel for example, is accessed, pulled from, or syphoned from, so as to output power. Accordingly, rotational speed or rotational momentum of the flywheel, of the system, is converted into electricity. In accordance with an aspect of the disclosed subject matter, the system can provide an ability to output power (from the "generating motor") at a different rate than power was input into the system from (from the "power-up motor"). In accordance with at least one embodiment of the disclosed subject matter, the "generating motor" can be the same as "power-up motor", i.e. a single motor can perform both operations or functions of both the "generating motor" and the "power-up motor", The "generating motor" as described herein might also be characterized as a "generator".

As described herein, in some systems of the disclosure multiple motors may be used. In a multiple motor system of the disclosure, the system can include a flywheel. The flywheel can be respectively connected to the multiple motors, which can be separate and include a power-up motor and a generating motor. A "staging" arrangement or system can be provided between the power-up motor and the flywheel. Such "staging" arrangement can allow the power-up motor to turn the flywheel but not the flywheel to turn the power-up motor. Examples of a staging system can include a one-way transmission, or a ratchet arrangement. Accordingly, the power-up motor can be "cut out" or disconnected from the flywheel when the power-up motor is not supplying power to perform initial speed up or speed up of the flywheel. In other words, once the power-up motor has rotationally accelerated the flywheel to the desired rotational speed, the power-up motor can then become isolated from other components of the system including, in particular, isolated from the flywheel and the power-up motor. Accordingly, the power-up motor can be disconnected from the flywheel and stop turning while the flywheel continues to turn.

The second motor, i.e. the generating motor, which is attached to the flywheel is then able to act or perform as a generator, which can supply an output of electrical current. This secondary motor, i.e. the generating motor, can generate a differing amount of power as compared to the power-up motor. For example. the generating motor can generate a different wattage than was initially inputted by the power-up motor. Accordingly, the system can act as a battery, which can take in current or energy for a certain period of time at high watts from the power-up motor, while speeding up a physical mass, before using a separate motor (the generating motor) to generate a smaller amount of wattage for a longer period of time, when compared to the initial input watts and time duration of the power-up motor.

A system of the disclosure may also utilize a single motor system. In a single motor system, a single motor can be provided which is connected to a mass. This single motor can be surrounded by magnetic bodies. The magnetic bodies can be manipulated by a one, a plurality, or a series of simple machinery. The magnetic bodies, which can encompass the single motor, can be rotated or spaced around the motor in different arrangements, so to alter the magnetic field that is present, i.e. the magnetic field that the motor experiences. This altering of the magnetic field can decrease or increase the power generation and input torque/speed of the system. That is, by manipulating the magnetic bodies and their spatial relationship to the magnets in the motor, the system can increase the magnetic field upon speeding up or to speed up the motor (and consequently to speed up the flywheel), before decreasing the magnetic field upon the flywheel being in motion (i.e. in a power generation state). Accordingly, such increase in magnetic strength in the initial storage of energy can allow the motor to act as a strong input motor when needed to initially store energy (by speeding up a flywheel for example). Then, the decrease in magnetic field would allow the motor to act as a weaker motor, i.e. as a generator, when the flywheel is in motion—and expending the energy of the flywheel to create electricity.

Accordingly, the systems and methods of the disclosure can manipulate a magnetic field around and in a motor so as to vary an electromotive force (EMF) that is experienced in the interior of the motor—and in particular the EMF force that is experienced by the electromagnets of the motor that are attached to a turning shaft of the motor. Accordingly, the systems and methods of the disclosure can manipulate a magnetic field in a particular manner, around and in the motor, to first store energy in a physical form—and at a later time—convert that stored energy to an electrical output.

The technology of the disclosure can be helpful to the battery industry, because it can allow batteries that utilize a weighted flywheel, i.e. a flywheel having mass, to store energy at a faster rate than the energy is ultimately used, a feat not usually possible by modern flywheel style batteries or chemical batteries. An improvement provided by the systems and methods of the disclosure is the manipulation of magnets about a rotatable axis, about which a motor/generator is mounted, that can provide variable internal magnetic fields to draw off energy as desired. The motor/generator can be energized by a mechanically connected rotating flywheel. Energy can be drawn off at a desired amount/rate in order to efficiently produce current, i.e. electrical output, as needed. By having a current that matches the required amount for the task at hand, a very effective and efficient system is created, which is able to use its energy for the longest period of time possible.

In accordance with embodiments of the disclosure, components of a system of the disclosure may be fastened or contained within an encasement. One attribute of the encasement can be to mitigate or lesson resistance of rotation, such as frictional forces, and provide the highest possible transfer of energy from the power-up motor to the energy storage device, for example a flywheel. Another attribute of the encasement can be to mitigate or lesson resistance and provide the highest possible transfer of energy from energy storage device, for example a flywheel, to the generating motor—so as to provide output energy. The output energy can be used to power a car, for example.

Lowering resistance of a system of the disclosure may, for example, involve lowering the resistance of the shaft attachment assembly that attaches a shaft of the motor to a housing of the motor. Resistance may also be lowered by minimizing air resistance. Some examples of lowering shaft resistance can include (a) using magnetic bearings with minimal or no friction based resistance, (b) using perfectly or well weighted objects to minimize oscillation or vibration that can result in a loss of power transference, and (c) providing a completely circular component based system to decrease air resistance caused by rotation, and avoid vacuum pockets by not using or minimizing the use of non-circular parts. The speed of the system, i.e. of the energy storage device such as a flywheel, can be a substantial influence on the viability of the technology. Such speed of the energy storage device of the system can determine or limit a maximum power storage of a system of the disclosure.

A battery of the disclosure may operate within a confined space and include a flywheel, for example, having a predetermined mass. A battery of the disclosure can utilize a light weight mass, such as, for example, 50 pounds, or any size mass as may be desired. If a specified energy storage capability is needed, mass of a flywheel and speed of the flywheel can dictate stored energy that the flywheel possesses. For a given energy storage needed, rotational speed may be exchanged for mass. In other words, to provide a requisite amount of energy stored, as mass of a flywheel is decreased then speed of the flywheel would need to be increased in a proportional manner. Accordingly, mass of flywheel can be exchanged for speed of flywheel, while maintaining the same power storage capabilities, since potential energy is a factor of both speed and mass.

The systems and methods described herein can help revolutionize the battery industry, and provide technology to make the battery industry more "physical battery based" and less chemical battery based. Some of the applications for batteries of the disclosure would be in electrical cars, industrial machinery, and electronic systems of medium to large size which can need to be used for long periods of time and that can require quick charge cycle. Batteries of the disclosure can also provide the benefit of not being easily breakable. Compared to traditional batteries which wear down in a short amount of time, these physical batteries of the disclosure can be used for many years, without malfunction, or breakdown.

In accordance with at least one aspect, systems and methods of the disclosure can help convert the planet Earth from a fossil fuel based energy system to an electrical system, powered by highly efficient and green technology. This can help with issues such as global warming, and help humanity make the transition to all electric power before the fossil fuels on our planet run out.

Figure 1:
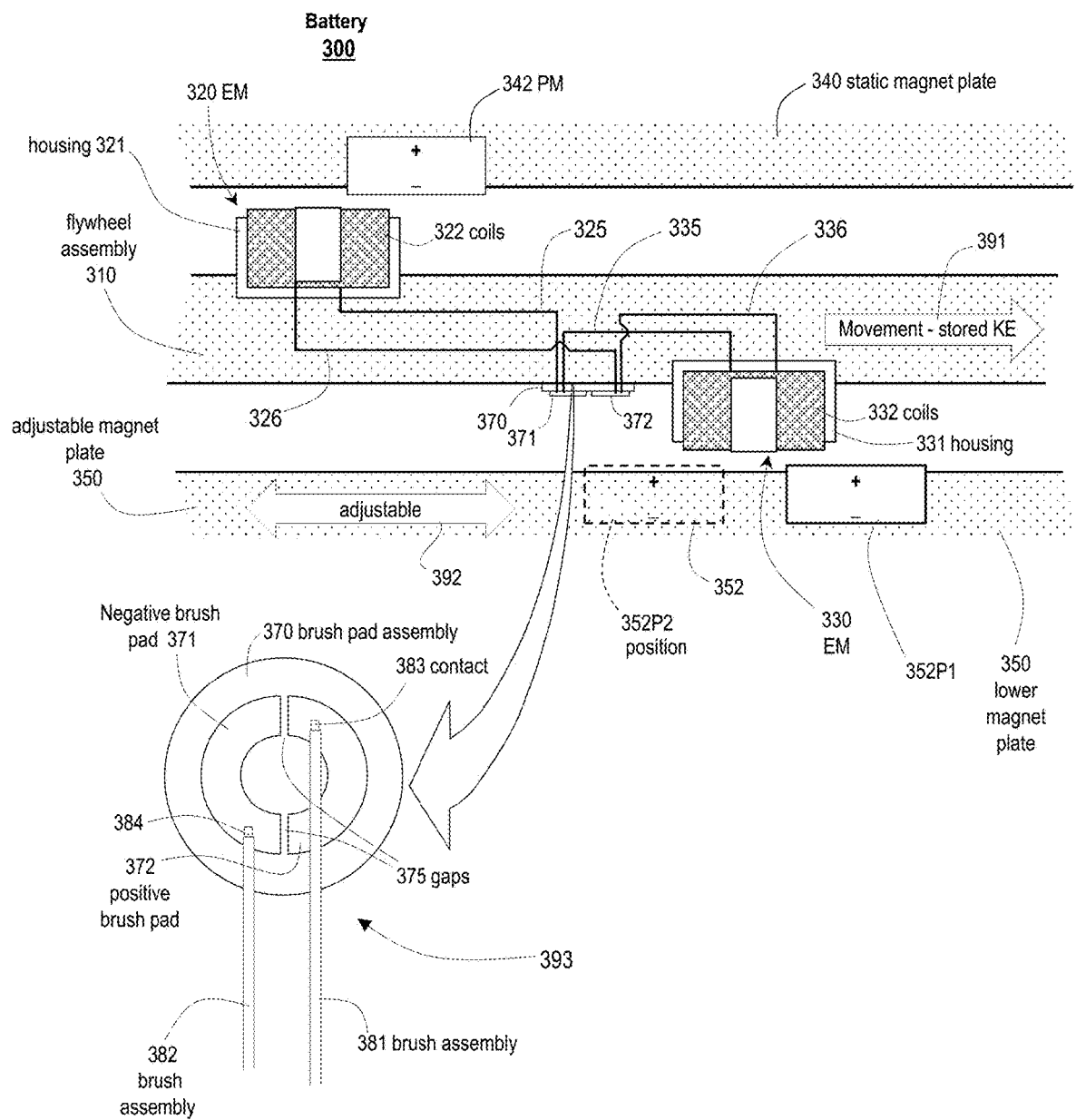
FIG. 1 is a schematic diagram of a battery assembly or battery, in accordance with at least one embodiment of the disclosure.

FIG. 1 is a diagram of a battery assembly or battery 300, in accordance with at least one embodiment of the disclosure. The battery assembly 300 includes a flywheel assembly 310. The flywheel assembly 310 includes electromagnet 320 and electromagnet 330. The flywheel assembly 310, along with the electromagnets 320, 330, rotate or spin. It is this rotation, or movement 391 as illustrated in FIG. 1, of the flywheel assembly 310, that constitutes stored kinetic energy of the battery assembly 300. As the flywheel assembly 310 rotates or spins faster, such increased rotation speed constitutes more stored energy. The flywheel can be described as an energy object. As shown in FIG. 1, electromagnets are mounted on the flywheel assembly 310.

Figure 2:
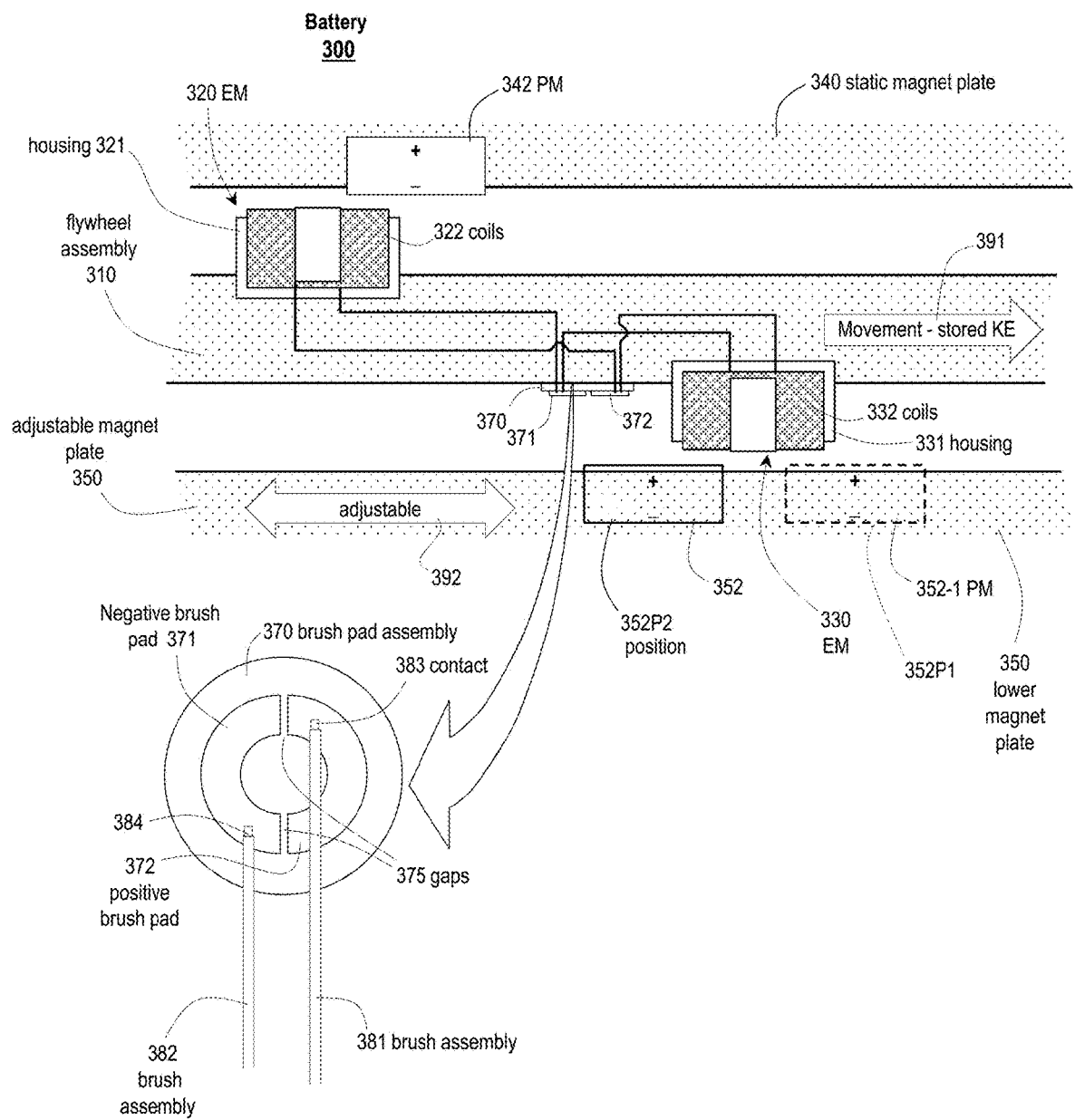
FIG. 2 is a schematic diagram of the battery assembly or battery of FIG. 1 showing a different arrangement, in accordance with at least one embodiment of the disclosure.

Such electromagnets variably interact with one or more respective permanent magnets. This interaction can result in the battery 300 not outputting electrical energy, as shown in the arrangement of FIG. 1. This interaction can result in the battery 300 outputting electrical energy, as shown in the arrangement of FIG. 2. If the battery 300 does not output electrical energy, the battery can maintain a state of free spin (absent minimal frictional forces) and in such state of free spin the kinetic energy of the battery 300 is preserved. Various further details of the battery assembly 300 are described in detail below. However, at this point in the disclosure, other aspects of the systems and methods of the disclosure will be described.

Figure 3:
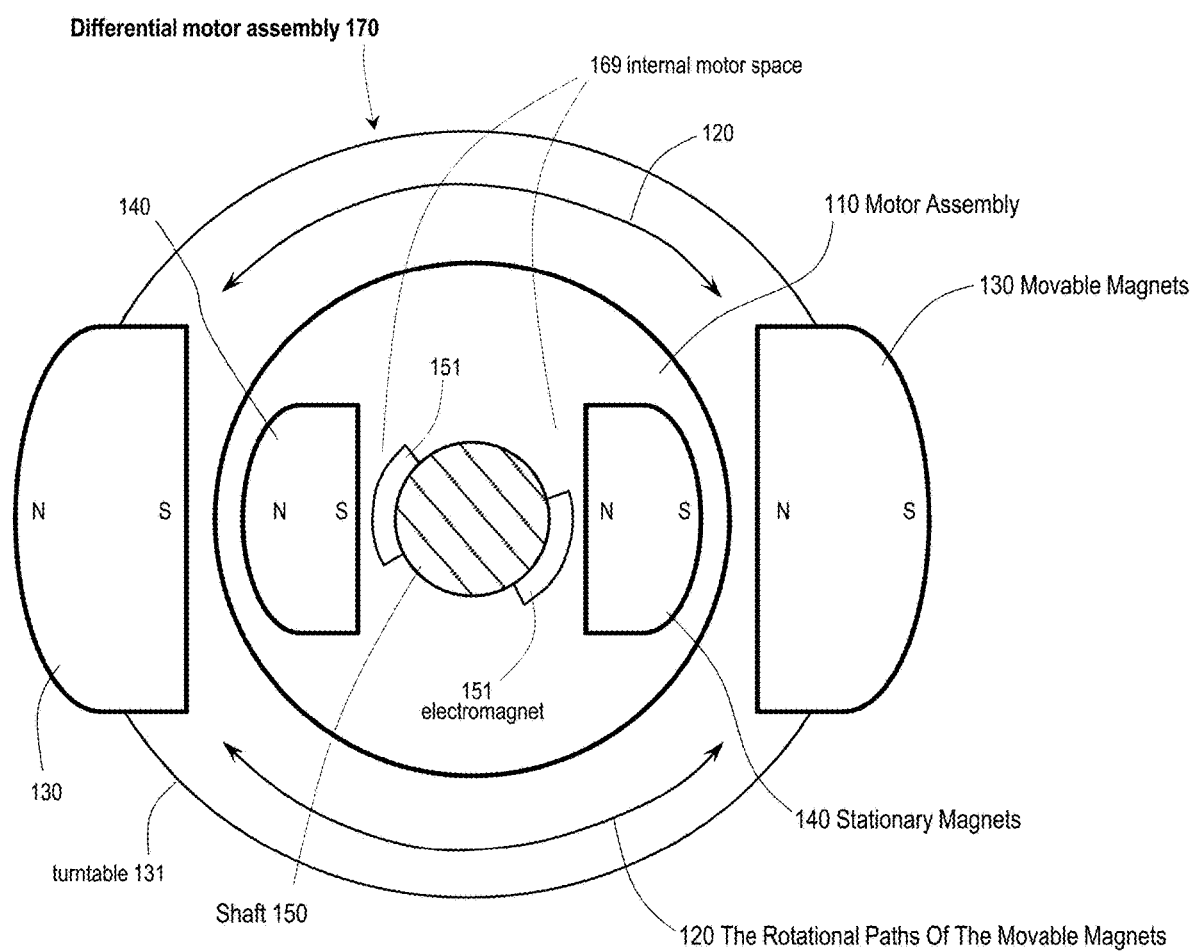
FIG. 3 is a schematic diagram that illustrates one example of a differential motor assembly, in accordance with at least one embodiment of the disclosure.

FIG. 3 is a schematic diagram of one example of a "differential motor assembly" 170, in accordance with at least one embodiment of the disclosure. The differential motor assembly 170 can be used in a battery assembly of the disclosure as described below.

The differential motor assembly 170 as shown in FIG. 3 includes stationary magnets 140 and a shaft output 150. The arrangement shown in FIG. 3 includes an electric dc motor (motor assembly 110), which is surrounded by movable magnets 130. The movable magnets 130 rotate, about a rotation path 120, around the motor on a turning system such as a turntable 131. This rotation of the magnets 130, i.e. change in position of the magnets 130, around the motor assembly 110 may either strengthen or weaken the motor 110's assembly's output wattage and input torque/speed as described below. This increasing and decreasing of wattage, dependent on the position of the movable magnets 130, is because of the increase or decrease of the motor assembly's magnetic fields, i.e. the magnetic fields that are experienced by (a) the DC motor and (b) the components of the DC motor including electromagnets 151 that are mounted on the shaft output, i.e. the output shaft, 150. Illustratively, the two farthest setups, i.e. the extremes, that can result due to the position of the magnet(s) are, respectively, shown in the diagrams of FIG. 4 and FIG. 5, as described below.

The two movable magnets 130 shown in FIG. 3 both have their north and south poles, respectively, facing the same way, and can be rotated around the central motor assembly 110 to shift the direction of the magnetic field produced thereby. This magnetic field of the movable magnets 130 can either increase or decrease the magnetic field of the two stationary magnets 140 which are inside of the motor assembly 110. This increase or decrease of the field, as noted above, respectively strengthens or weakens the output wattage and input torque/speed of the motor assembly 110, and in particular strengthens or weakens the magnetic field experienced by the electromagnet 151 of the motor assembly 110, which is attached to shaft 150. Various details, such as motor brushes, brush pads, etc. are not shown in FIG. 3 for clarity.

Figure 4:
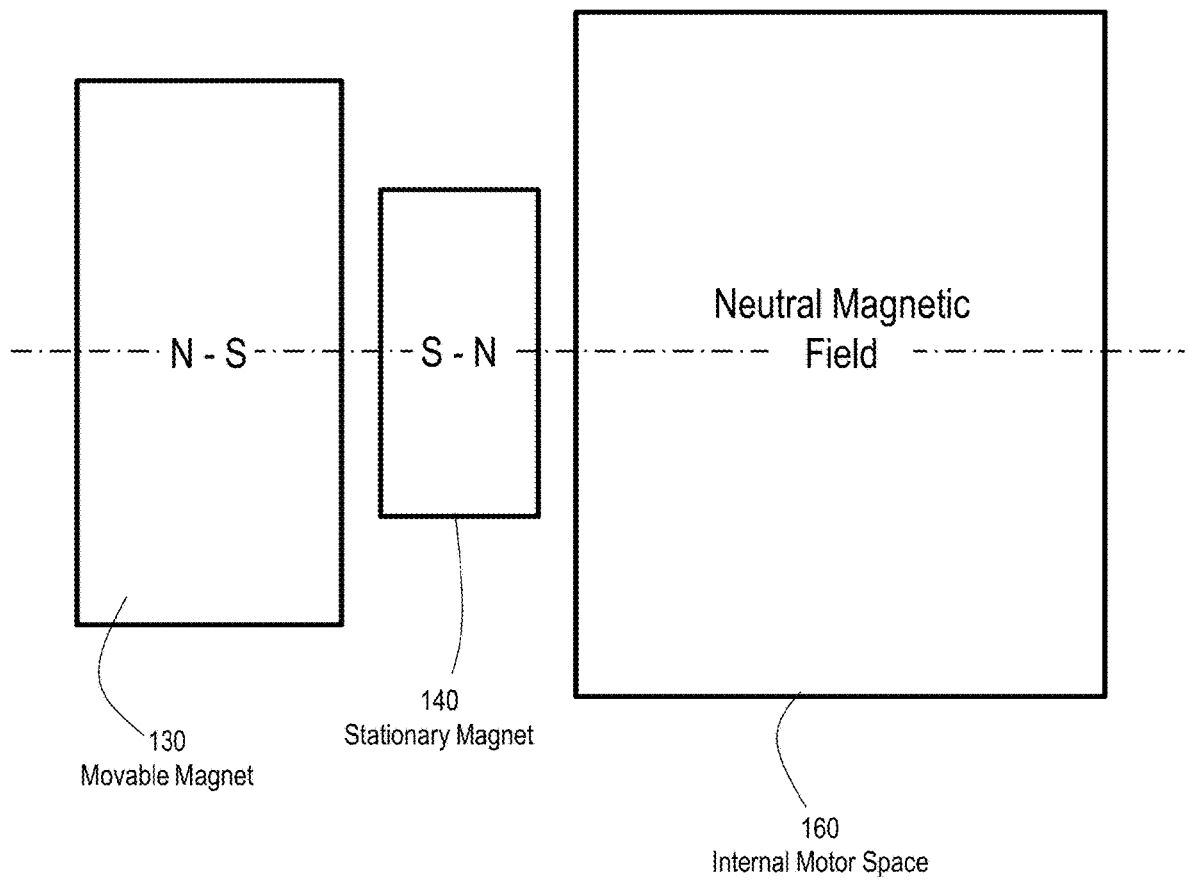
FIG. 4 is a schematic diagram that illustrates how the position of stationary magnets 140 and movable magnets 130 can be aligned, in accordance with at least one embodiment of the disclosure.

FIG. 4 is a diagram that illustrates how the position of stationary magnets 140 and movable magnets 130 can be aligned from a line drawn out from the center of the motor assembly 170, to have their poles be opposite in direction to each other, in accordance with at least one embodiment of the disclosure. This opposition of the poles of the stationary magnets 140 and the movable magnets 130 makes it possible to create an area where there is no magnetic field, i.e. so as to provide a neutral magnetic field inside of the internal motor space 160. Magnet 130 can be provided to be bigger than magnet 140 so as to compensate for the distance differential vis-à-vis the internal space of the motor assembly 110.

This absence of a magnetic field inside of the motor assembly 110 brings down the resistance of the motor as experienced by the electromagnets 151 (of the motor assembly 110) attached to the output shaft 150 fighting the stationary magnets 140 and the movable magnets 130 to almost nothing, if not nothing, and allows the motor to free spin. This free spinning, or close to free spinning, of the motor allows the system to maintain a storage of electricity or energy, in the form of kinetic energy, for a longer period of time without giving off a charge, i.e. in the situation when there is no need or desire for a charge to be output from the assembly. In other words, the movable magnets 130 effectively cancel out the force that the stationary magnets 140 exert on the electromagnets 151, which are attached to the shaft output 150, in the interior of the motor assembly 110. This allows a free spinning, or close to free spinning, scenario.

One can also rotate the position of the movable magnet 130 to a position near the stationary magnet, but not aligned, to have a wattage output less than that of the motor assembly alone, i.e. less than the output of the motor if the movable magnets 130 were not present, i.e. in the arrangement of the differential motor assembly 170 being attached to a flywheel. This then allows the system to slowly use stored power for a prolonged period of time which is longer than the normal time of the differential motor assembly 170 being simply affixed to a flywheel, without the movable magnets 130. In other words, while FIGS. 4 and 5 show the extremes or respective ends of the spectrum, innumerable interim states may be provided in which the movable magnets 130 partially cancel out the stationary magnets 140.

Figure 5:
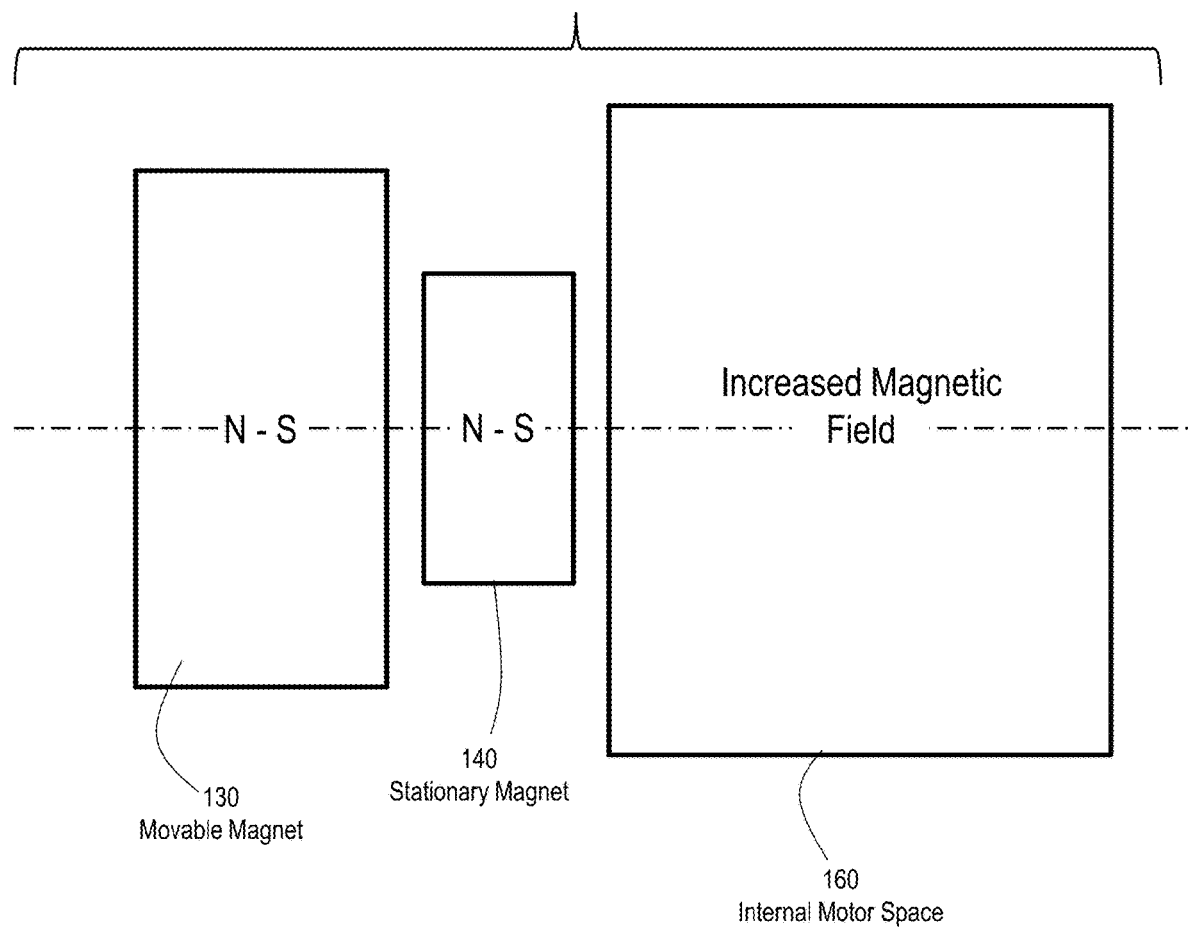
FIG. 5 is a schematic diagram that illustrates how the position of the stationary magnets 140 and movable magnets 130 can be aligned, in accordance with at least one embodiment of the disclosure.

FIG. 5 is a diagram that illustrates how the position of the stationary magnets 140 and movable magnets 130 can be aligned from a line drawn out from the center of the motor assembly, for example, to have their poles be identical or correspond in direction to each other, in accordance with at least one embodiment of the disclosure. This similar or same direction of the poles makes it possible to create an internal motor space 160 where there is a stronger magnetic field of a specific pole. This strengthening of a magnetic pole inside of the motor can increase the resistance of the motors internal electromagnets 151 to nearly double, for example, in accord with one example of the disclosure, i.e. with the alternative being that the movable magnets and the stationary magnets cancel out the internal space's magnetic field when the movable magnets 130 are shifted or rotated 180 degrees. The alignment, as shown in FIG. 5 of the poles of the movable magnets and the stationary magnets allows the motor to output a higher wattage than the motor assembly would otherwise export without the movable magnets 130.

Accordingly, the arrangement of FIG. 3, in manner as further described below, allows (a) the kinetic energy of the differential motor assembly 170 to be used quickly (i.e. converted to electrical energy) when needed (FIG. 5), or alternatively (b) allows the kinetic energy of the differential motor assembly 170 to be maintained hand-in-hand with outputting no or minimal electrical energy (FIG. 4). Accordingly, the arrangement allows the system to maintain electricity for a period of time, without needing to expend charge where there is no need to expend charge.

In accordance with the disclosed subject matter, one can also rotate the alignment of the movable magnet to a position near the stationary magnet, but not aligned, to have a wattage output to be greater than that of the motor alone but less than that of the movable magnets and the stationary magnets combined. This then allows the system to quickly use the stored power (for a shorter period of time), with such shorter period of time being quicker than the normal time of the motor being simply affixed to a flywheel, for example, by gears or a shaft. This output ratio of the movable magnet being nearly aligned with the stationary magnet to increase the magnetic field, will be determined by how much influence the movable magnets 130 and the stationary magnets 140 have on the electromagnets 151 in the interior of the motor assembly 110. This increased magnetic field can allow the motor to take in high wattage electricity and store such energy at a faster rate than the motor assembly 110 expends energy, i.e. such expension or expending of energy being when the movable magnets 130 and the stationary magnets 140 are not aligned to increase their magnetic strength.

Figure 6:
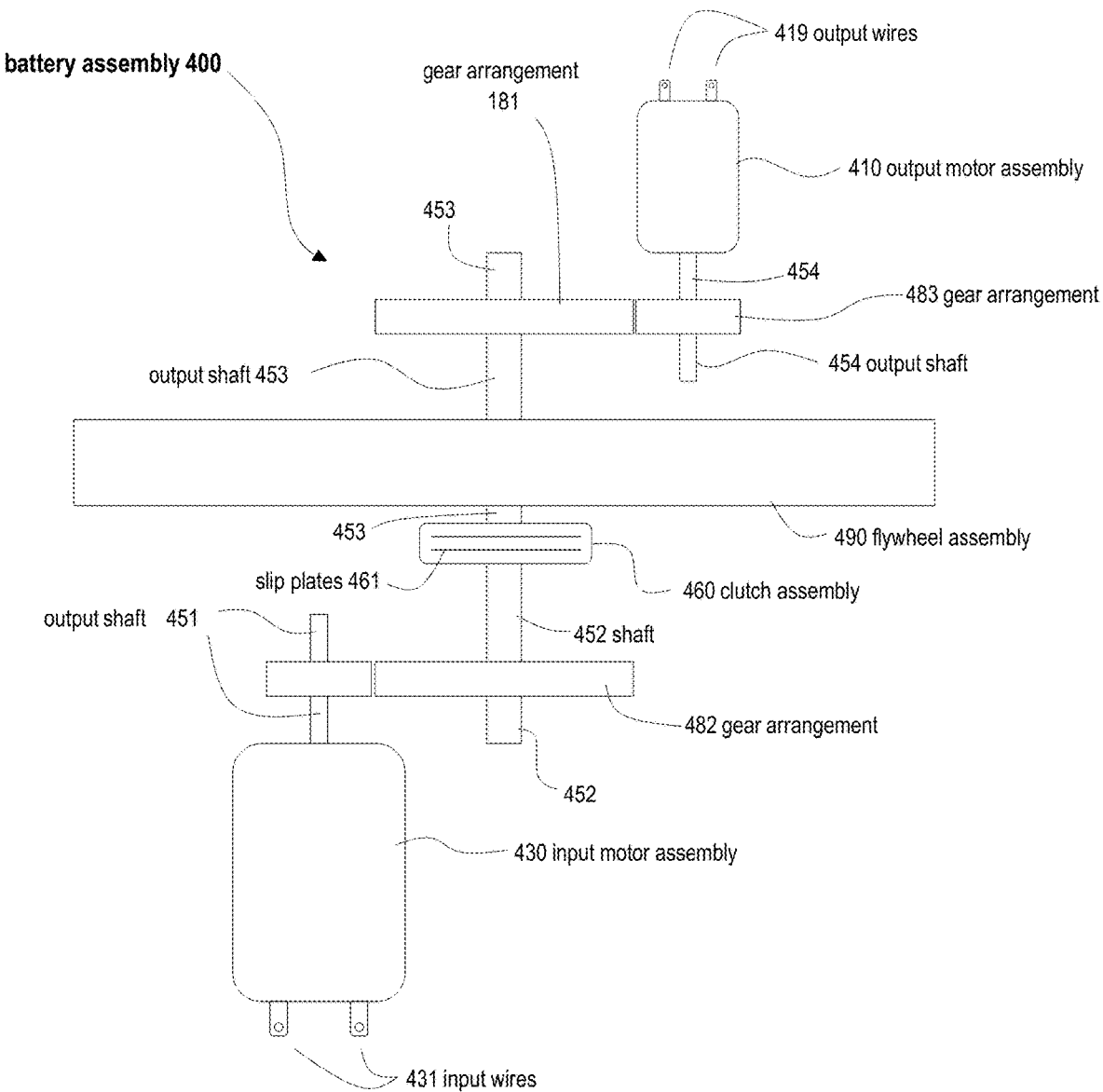
FIG. 6 is a schematic diagram that illustrates a dual motor assembly, in accordance with at least one embodiment of the disclosure.

FIG. 6 illustrates a battery assembly 400 that can achieve goals or objectives as described above with reference to the differential motor assembly 170 of FIG. 3. The battery assembly 400 can incorporate the differential motor assembly 170 of FIG. 3 including movable magnets 130. Such goals or objectives can include inputting power to the battery assembly 400 at a higher wattage than the export of power from the battery assembly 400. Accordingly, the battery assembly 400 provides for decreasing an amount of time the assembly takes to charge the battery assembly 400, with such battery assembly 400 then being able to output energy for a prolonged period of time as desired, in accordance with at least one embodiment of the disclosure. FIG. 6 shows an example arrangement that can use the differential motor assembly 170 (of FIG. 3) as the generating motor or output motor assembly 410, in conjunction with a second motor assembly 430, i.e. input motor assembly 430 being a power-up motor.

In accordance with at least one embodiment of the disclosed subject matter, in operation of the arrangement of FIG. 4, the input motor assembly 430 is first energized, via electrical energy flowing in via wires 431, so as to rotate— and in particular so as to rotate shaft 451 of FIG. 4. Energy, i.e. rotation, is then transferred through a gear arrangement 482 to a shaft 452, and through a clutch assembly 460 to a shaft 453. The shaft 453 is connected or fixed to a weighted flywheel assembly 490 or flywheel 490, and accordingly, the rotation of the shaft 453 speeds up the weighted flywheel assembly 490.

As shown in FIG. 6, a second gear or sprocket ratio or arrangement 483 is then used to transfer the flywheel 490's energy to an output motor assembly 410, which acts as a generator to output electricity via wires 419. That is, the output motor 410 is akin to the motor 110 of FIG. 3 and can be of similar arrangement to the motor 110 of FIG. 3.

In accordance with at least one embodiment of the disclosed subject matter, the clutch assembly 460 allows the input motor 430 to turn the shaft 451, to turn the shaft 452 via gear arrangement 482, to turn the shaft 453 via clutch 431, and ultimately to turn the weighted flywheel assembly 190, but not for the shaft 453 (and the weighted flywheel assembly 490) to turn the input motor assembly 430. That is, the clutch assembly 460 can be a one-way clutch. Such arrangement allows the input motor assembly 430 to be effectively "disconnected" from the flywheel 490 during operation of the output motor 410 in a connected state with the flywheel 490. For example, the clutch 460 can include slip plates 461 that are controlled to engage or disengage so as to provide transfer of power or not provide transfer of power, respectively, as desired.

The gear or sprocket arrangements 482 allows the motor 430 to speed the flywheel 490 up to a higher rotation speed, than that of the motor 430, by using an unbalanced gear ratio, i.e. not a 1:1 gear ratio. For example, a 1:4 gear ratio might be used or any other gear ratio as may be desired—so as to speed up the flywheel and provide the kinetic energy that will be dispersed, as needed or desired, by the output motor 410. It is appreciated that the output motor 410 will (after all kinetic energy and at least some lost energy due to friction etc. is dispersed by the output motor 410) generate less energy than was imputed into the battery assembly 400. However, the output motor assembly 410 can disperse stored energy at a controlled rate as desired. Accordingly, the battery assembly 400 can output energy at lower wattage than the wattage at which energy was put into the system and do so at a controlled rate.

Figure 7:
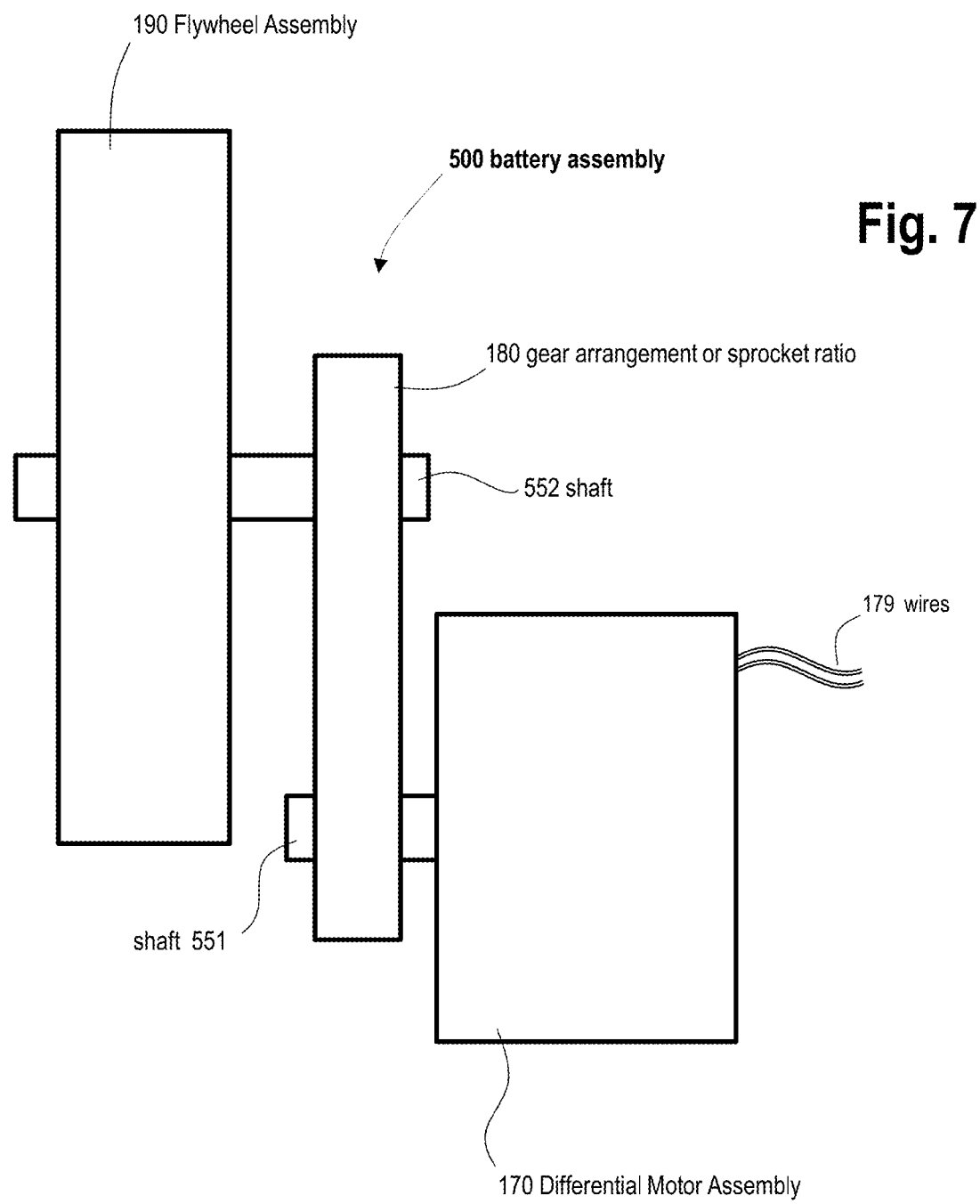
FIG. 7 is a schematic diagram that shows a single motor assembly, in accordance with at least one embodiment of the disclosure.

FIG. 7 shows a battery assembly 500 that utilizes the differential motor assembly 170 shown in FIG. 3 in accordance with at least one embodiment of the disclosure. As described herein, the differential motor assembly 170 can transform high wattage input electricity to low watt output energy that is dispersed as desired, in accordance with at least one embodiment of the disclosure. In particular, the differential motor assembly 170 of the disclosure allows electricity to be output, with wattage as desired as dependent on position of the movable magnets 130. The electricity can be output, from the differential motor assembly 170, via wires 179. That is, the differential motor assembly 170 functions as described in FIG. 3, while being geared through a gear ratio or gear arrangement 180 to a weighted flywheel assembly or flywheel 190.

In this example, the differential motor assembly (DMA) 170 is first energized via wires 179 so as to speed up the weighted flywheel assembly 190 through the shafts 551, 552. This speed up (and accumulation of kinetic energy) can be performed with the DMA 170 in its high magnetism state described in FIG. 5. A gear ratio or arrangement 180 may be used so as to increase the speed of the weighted flywheel assembly 190. In other words, the differential motor assembly 170 is initially used as a motor, driven by electric power from wires 179, so as to speed up the weighted flywheel assembly 190. The weighted flywheel assembly 190 is sped up until a desired RPM (revolutions per minute) is attained. This stores the electrical energy as mechanical energy, i.e. kinetic energy, in the weighted flywheel assembly 190.

Then the differential motor assembly 170 is switched to the "neutral magnetic field" state of FIG. 4. While the differential motor assembly 170 is in the "neutral magnetic field" state of FIG. 4 no energy or minimal energy is output from the differential motor assembly 170. The flywheel 190, gear arrangement 180 and differential motor assembly 170 can be allowed to spin in such "no energy is output" state.

At a later time and as desired, the differential motor assembly 170 can be switched or transitioned toward or to the "increased magnetic field" state of FIG. 5 so that energy is output from the differential motor assembly 170. That is, as the weighted flywheel assembly 190 turns the differential motor assembly 170, through the gear ratio 180, while the differential motor assembly 170 is in an "increased magnetic field" state of FIG. 5, energy is output from the differential motor assembly 170. That is, electrical output is generated and output via wires 179.

The electrical output can be used to power a car or other device as desired. A variable generator is thus provided by the differential motor assembly 170.

Figure 8:
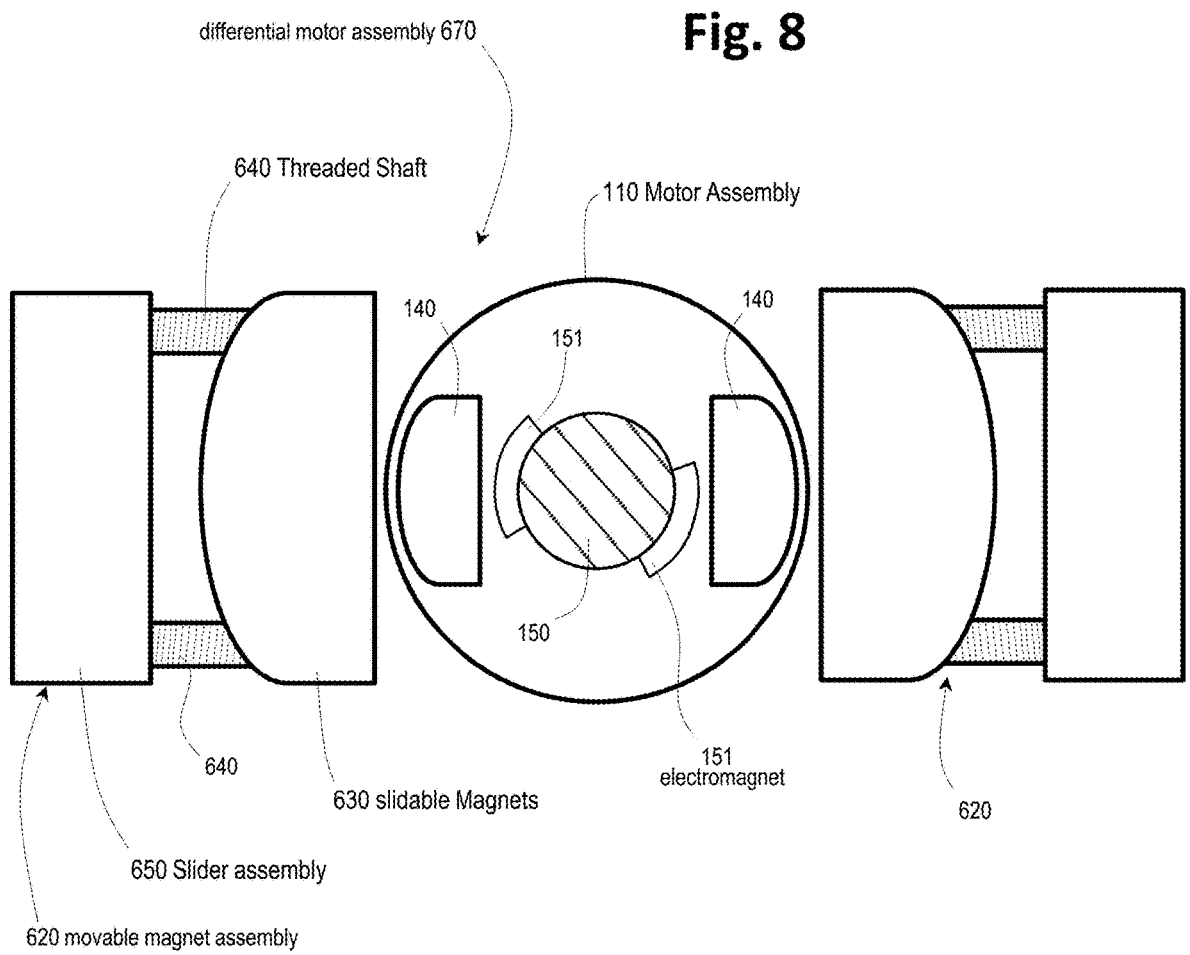
FIG. 8 is a schematic diagram that illustrates a fine adjustment system for the differential motor assembly, in accordance with at least one embodiment of the disclosure.

One can dictate what wattage value, and how much energy and how quickly, comes off the differential motor assembly 170 by where the movable magnets 130 are placed in the differential motor assembly 170 relative to the stationary magnets 140. By having the magnets 130, 140 in the neutral position, described in FIG. 4, one can achieve a free spin of the differential motor assembly 170 where the motor 110 does not produce any current or energy output. However, positions between the positions respectively shown in FIG. 4 and FIG. 5 can be used to create different outputs, and thus the output can be variable as desired. Such variable output can provide a lower output wattage than the wattage at which energy was initially imputed into the differential motor assembly 170, in accordance with an aspect of the disclosed subject matter. FIG. 8 is a schematic diagram of a differential motor assembly 670 that provides for fine adjustment of the differential motor assembly 670, in accordance with at least one embodiment of the disclosure. The arrangement includes one or more movable magnets 630 or, more accurately as to FIG. 8, slidable magnets 630 suspended or supported adjacent the motor assembly 110 by a movable magnet assembly 620. The movable magnet assembly 620 includes threaded shafts 640 as controlled by slider assembly 650 (or other adjustable mechanism), in accordance with at least one embodiment of the disclosure. The motor 110 can include an output shaft 150, stationary magnets 140, and electromagnet 151 (of the motor or motor assembly 110) the same as or similar to that shown in the motor assembly 110 of FIG. 3. A movable magnet assembly 620 may be provided on both sides of the motor assembly 110, as shown in FIG. 8.

With such an arrangement of the differential motor assembly 670 as shown in FIG. 8, a capability is provided to space the slidable magnet(s) 630 away from the motor assembly 110 at varying distances as desired. With this adjustment, functionality is provided to vary an amount that the slidable magnets 630 "cancel" out (or do not cancel out) the stationary magnets 140, i.e. so as to vary a magnetic field that is experienced by the electromagnets 151, as shown in FIG. 3.

In other words, this variation in position of the slidable magnets 630 variably cancels out the magnetic influence exerted by the stationary magnets 140 (of the motor assembly 110) on to the electromagnets 151 inside the motor assembly 110. In other words, the position of the slidable magnets 630, vis-à-vis the stationary magnets 140, changes the aggregated or additive EMF force inside the motor assembly 110 that is experienced by the electromagnets 151.

Accordingly, the slidable magnets 630, once moved close enough to the stationary magnets 140, can cancel out, or minimize, the magnetic influence exerted by the stationary magnets 140 upon the electromagnets 151.

Accordingly, and in further description of the concepts described above, it is appreciated that when the poles of the two magnet sets (the slidable magnets 630 and the stationary magnets 140 in FIG. 1) face different directions and are in close proximity to each other, such arrangement can completely or substantially cancel out the magnetic field inside the motor 110, as experienced by the electromagnet 151. On the other hand, it is appreciated that when the poles of the two magnet sets (the slidable magnets 630 and the stationary magnets 140 in FIG. 1) face same directions and are in close proximity to each other, such arrangement can double or substantially double the magnetic field inside the motor 110, as experienced by the electromagnets 151.

Accordingly, FIG. 8 illustrates a variation to the differential motor assembly 170 shown in FIG. 3, in accordance with at least one embodiment of the disclosure. The arrangement of FIG. 8 cancels out the magnetic influence, inside the motor assembly 110, of both slidable magnets 630 and stationary magnets 140 once the slidable magnets 630 come closer to the stationary magnets 140. However although one can have a system like the one shown in FIG. 8, one can also have a system (see FIG. 9) that only has the slidable magnets 630, in which the slidable magnets would come into the motor and provide all of the magnetism for the system rather than having two magnets cancel out as seen in FIG. 8. As shown in FIG. 8, the threaded shafts 640 are capable of rotation which either causes the slidable magnets 630 to approach or retract from the motor assembly 110. These threaded shafts 640 work in the same manner even if the stationary magnets are removed from the system and this assembly just has the slidable magnets approach the motor assembly 110 and retract from the motor assembly 110 in order to increase or decrease the resistance of the electromagnets 151 inside the motor assembly 110. This increase or decrease of the resistance, i.e. EMF force, shown by the electromagnets inside the motor assembly 110 either increases or decreases the output wattage when the motor assembly 110 is spinning and is generating current. The threaded shafts 640 allow approaching or retracting of the slidable magnets 630 to be controlled and precise.

Figure 9:
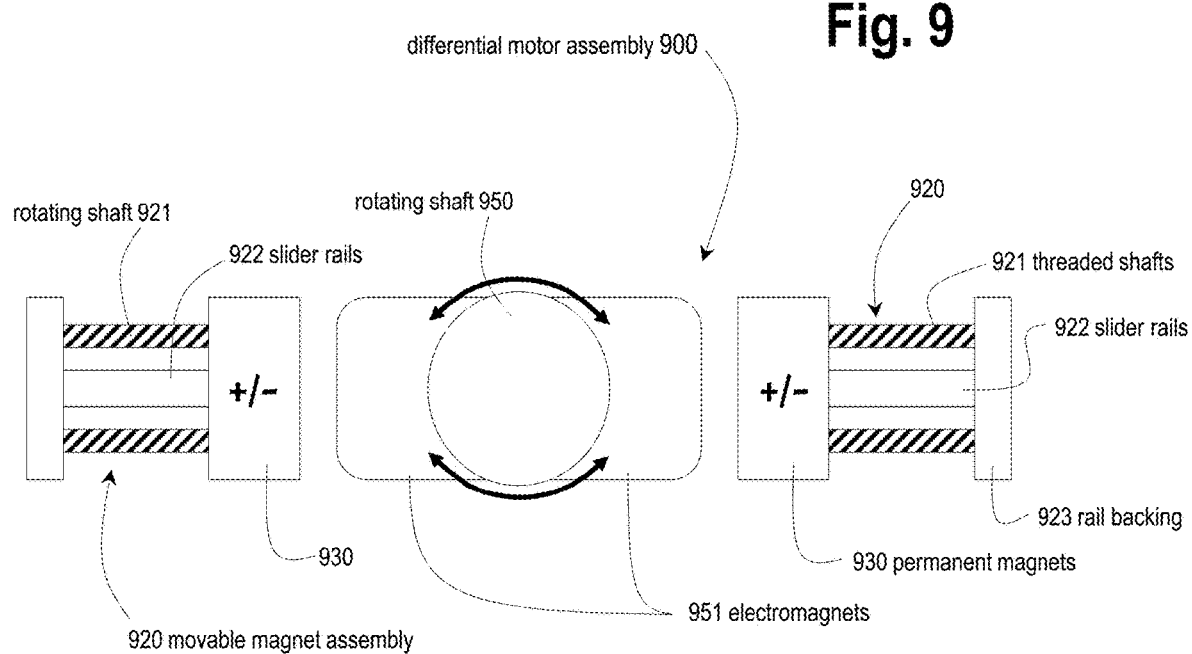
FIG. 9 is a schematic diagram that illustrates a further fine adjustment system for the differential motor assembly, in accordance with at least one embodiment of the disclosure.

In further illustration, FIG. 9 is a schematic diagram of a further differential motor assembly 900, in accordance with at least one embodiment of the disclosure. As described above with reference to FIG. 8, FIG. 9 illustrates an arrangement in which only one set of permanent magnets are provided. This is in contrast to the arrangement of FIG. 3 that includes both the stationary magnets 140, being a part of the motor assembly 110, and the movable magnets 130. In other words, FIG. 9 might be characterized as not including the stationary magnets 140 of FIG. 3.

Accordingly, FIG. 9 provides a system that has the slidable magnets 930 that can be constituted by permanent magnets. The slidable magnets 930 can be positioned so as to be in close proximity to the electromagnets 951 and provide magnetism for the system, applied to the electromagnets 951, i.e. rather than having two magnets cancel out as shown in FIG. 8 or in FIG. 3.

Figure 10:
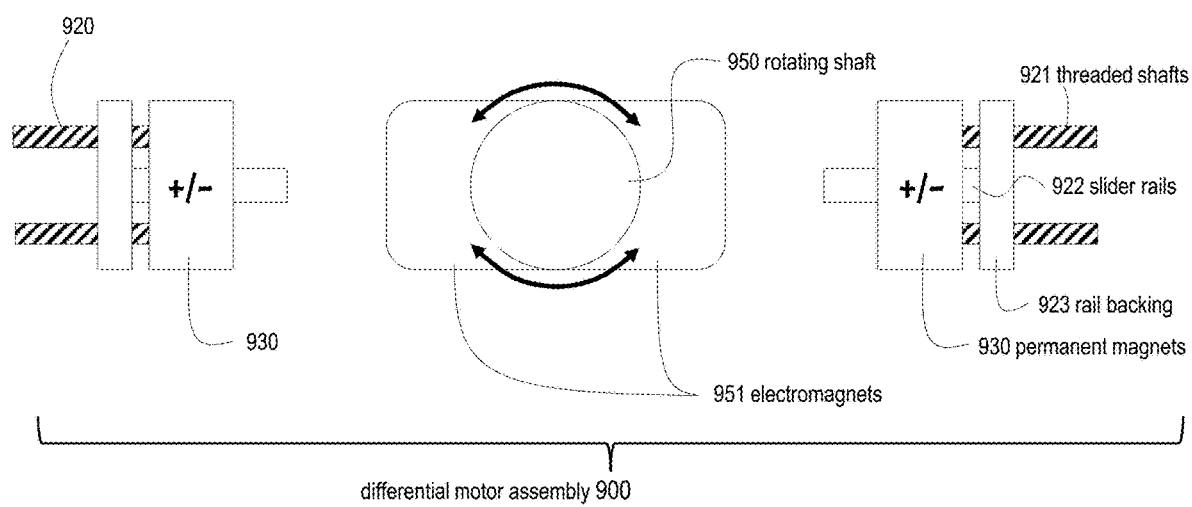
FIG. 10 is a schematic diagram that illustrates the fine adjustment system of FIG. 9 for the differential motor assembly, in accordance with at least one embodiment of the disclosure.

As shown in FIG. 9, movable magnet assemblies 920 are provided on both sides of the electromagnets 951. The movable magnet assemblies 920 each include permanent magnets 930 that are mounted on threaded shafts 921. Each movable magnet assembly 920 may include a rail backing 923. The rail backing 923 provides corresponding threaded apertures to interface with a corresponding rotating shaft 921. For example, the rail backing 923 can include a motorized collar that can be controlled by a suitable control system. As a result, the threaded shafts 921 can be engaged with so as to be threaded in an outboard direction of the electromagnets 951 (and the rotating shaft 950). Accordingly, the permanent magnets 930 can be pulled away from the electromagnets 951. FIG. 10 illustrates the permanent magnets 930 in such a retracted position.

Accordingly, the distance of the permanent magnets 930 from the electromagnets 951 is variable. This variability provides adjustment to the EMF experience that is experienced by the electromagnets 951. Relatedly, the rotating shaft 950 can be connected to an energy storage device such as a flywheel. This connection to an energy storage device may utilize known mechanical linkages, such as a gear arrangement.

In other words, the threaded shafts 921 are capable of rotation which either causes the slidable magnets 930 to approach or retract from the motor assembly 900. Slide rails 922 can be implemented into the system as seen in the assembly to further control the path of the slidable magnets 930 as they are pushed towards and from the motor assembly 900, by the threaded shafts 921. For example, each of the slider rails 922 may be in the form of a rail that engages with a track in the rail backing 923. For example, each of the slider rails 922 may be in the form of a dowel that engages with a hole in the rail backing 923. The slider rails 922 can be provided to maintain desired orientation of the permanent magnets 930.

Figure 11:
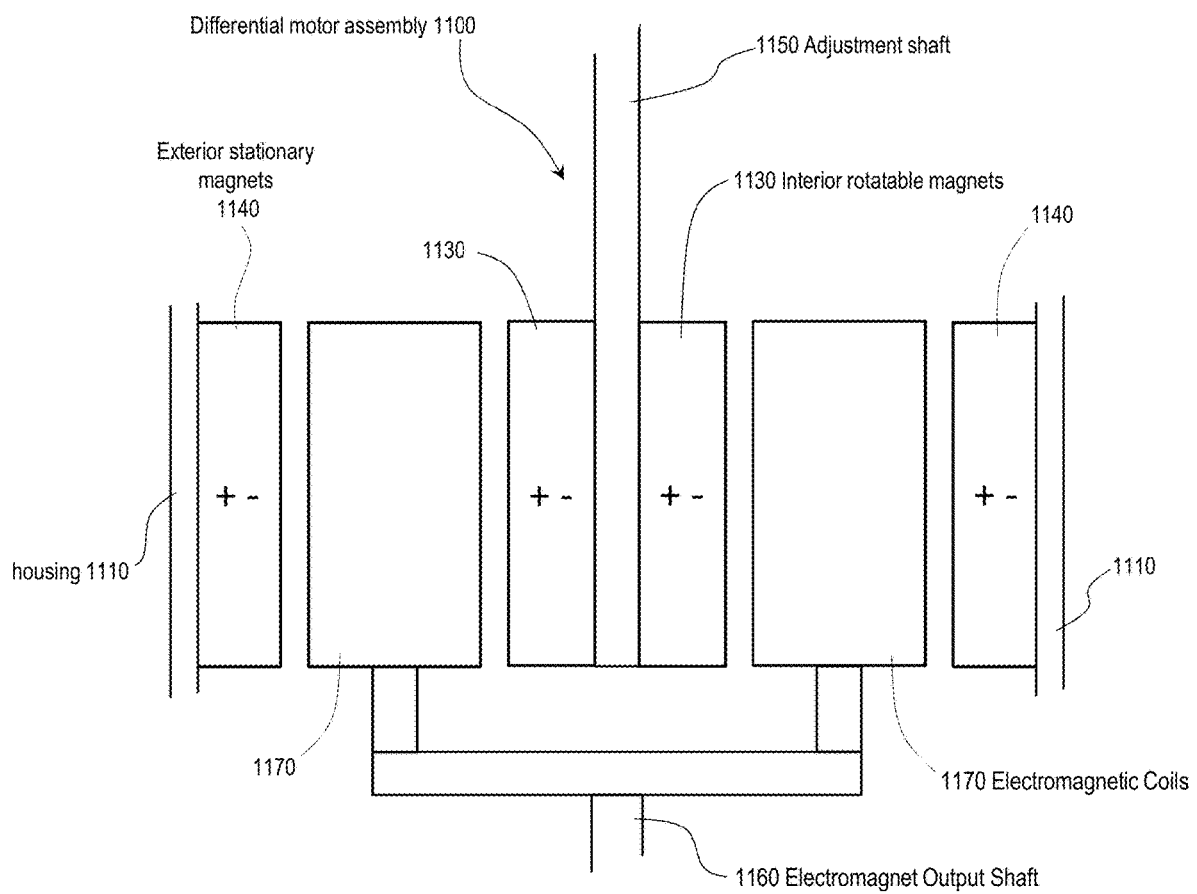
FIG. 11 is a schematic diagram that illustrates a further differential motor assembly, in accordance with at least one embodiment of the disclosure.

FIG. 11 is a schematic diagram illustrating a further version of a differential motor assembly 1100 that has two sets of permanent magnets on either side of electromagnetic coils 1170, instead of just on one side, in accordance with at least one embodiment of the disclosure. As shown, such permanent magnets include the exterior stationary magnets 1140 and the interior movable magnets 1130.

By having the permanent magnets on either side of the electromagnetic coils 1170, one may be able to utilize smaller magnets for such permanent magnets—since the rotatable magnets 1130 can be positioned at the same distance from the electromagnetic coils 1170 as the exterior stationary magnets 1140. In contrast, note the arrangement of FIGS. 4 and 5 in which the movable magnets 130 can be larger as compared to the stationary magnets 140.

In the arrangement of FIG. 11, rotatable magnets 1130 are provided on the inside and exterior stationary magnets 1140 are provided on the outside (of the electromagnetic coils 1170). In an alternative arrangement, one can also build a system with the rotatable magnets on the outside and the stationary magnets on the inside (of the electromagnetic coils 1170). Additionally, both the exterior magnets and the interior magnets can be rotatable.

Having the permanent magnets 1130, 1140 on either side of the electromagnetic coils can allow for higher efficiency of the differential motor assembly 1100 where a larger portion of the electromagnetic field generated is utilized. This particular assembly, as shown in FIG. 11, can work by supplying power (i.e. electrical power) to the electromagnetic coils 1170 which fight (magnetically) against the permanent magnets 1130, 1140 and power the electromagnetic output shaft 1160 so as to rotate. The electromagnetic output shaft 1160 may be connected to a rotating flywheel to store energy, i.e. in the form of kinetic energy, in the rotating flywheel.

The exterior stationary magnets 1140 can be affixed to a supporting housing 1110. The rotatable magnets 1130, positioned in the center of the differential motor assembly, 1100 can be rotated by rotation of a connected adjustment shaft 1150, to either (a) match or (b) not match, the corresponding stationary magnets 1140 on the other side of each electromagnet 1170, or more specifically on the other side of the circular, rotational path of the electromagnet coils 1170. By having the poles of both magnets 1140, 1130 match up (across the rotational path of the electromagnet coils 1170) with each other, an arrangement is created where a strong magnetic field is created, in similar fashion to FIG. 5. Whereas when you have the poles of the magnets 1130, 1140 oppose each other, you diminish or zero out the electromagnetic field in a similar fashion to FIG. 4. This diminish or increase of the electromagnetic field, as experienced by the electromagnet coils 170, respectively, increases or decreases the power output of the motor as well as its ability to generate electricity. The rotatable magnets 1130 can be varied in position vis-à-vis the poles of the exterior stationary magnets 1140 anywhere between (a) poles of the magnets 1130 and 1140 being fully opposed to each other—so as to cancel each other out as experienced by the electromagnet coils 1170, and (b) poles of the magnets 1130 and 1140 being fully aligned to each other—so as to be additive to each other, as experienced by the electromagnet coils 1170. As a result, a variable, transmission like system is provided that enables the differential motor assembly 1100 to output any wattage level between a maximum and their minimum energy output of the assembly.

Hereinafter, further aspects of the battery 300 of FIG. 1 will be described, in accordance with at least one embodiment of the disclosure.

As described above, FIG. 1 is a diagram of a battery assembly 300, in accordance with at least one embodiment of the disclosure. The battery assembly 300 includes a flywheel assembly 310. The flywheel assembly 310 includes electromagnet 320 and electromagnet (EM) 330. The flywheel assembly 310, along with the electromagnets 320, 330, rotate or spin. It is this rotation, or movement 391 as illustrated in FIG. 1, of the flywheel assembly 310, that constitutes stored kinetic energy of the battery assembly 300. As the flywheel assembly 310 rotates or spins faster, such increased rotation speed constitutes more stored energy. As shown in FIG. 1 as described above, electromagnets are mounted on the flywheel assembly 310. Such electromagnets variably interact with one or more respective permanent magnets. This interaction can result in the battery 300 not outputting electrical energy, as shown in the arrangement of FIG. 1. Alternatively, this interaction can result in the battery 300 outputting electrical energy, as shown in the arrangement of FIG. 2. If the battery 300 does not output electrical energy, the battery can maintain a state of free spin (absent minimal frictional forces) and in such state of free spin the kinetic energy of the battery 300 is preserved. Various further details of the battery assembly 300 are described in detail below. The battery 300 further includes a static magnet plate 340 and an adjustable magnet plate 350. The static magnet plate 340 includes a permanent magnet 342. The adjustable magnet plate 350 includes permanent magnet 352. The adjustable magnet plate 350 can be adjusted so as to vary a position of the permanent magnet 352 relative to the permanent magnet 342. Such variability is illustrated in the position 352P1 of the permanent magnet 352 as shown in FIG. 1 as compared to the position 352P2 of the permanent magnet 352 as shown in FIG. 2 (and as shown in phantom in FIG. 1).

In the arrangement of FIG. 1, with the particular position 352P1, as the electro magnet 330 approaches the permanent magnet 352, the electromagnet 330 experiences an ongoing change in EMF as the electromagnet 330 draws closer to the permanent magnet 352, i.e. so as to provide different experienced EMF. This ongoing change in EMF drives a current flow from or of the electromagnet 330. Such current flow passes through wires 335, 336. Wires 335, 336 are connected to brush pad 371 and brush pad 372, respectively.

Additionally, as the electromagnet 320 approaches the permanent magnet 342, the electromagnet 320 experiences an ongoing change in EMF as the electromagnet 320 draws closer to the permanent magnet 342. This ongoing change in EMF drives a current flow from or of the electromagnet 320. Such current flow from the electromagnet 320 passes through wires 325, 326. Wires 325, 326 are connected to brush pad 371 and brush pad 372, respectively. Electromagnet 320 can include coils 322. The coils 322 can be connected to wires 325, 326. Electromagnet 330 can include coils 332. The coils 332 can be connected to wires 335, 336. The wires 325, 326, 335, 336 may be connected to brush pad assembly 370. Brush pad assembly 370 is shown expanded at 393 in FIG. 1. More specifically, wire 335 and wire 325 can be connected to brush pad 371. Wire 326 and wire 336 can be connected to brush pad 372. As shown in the expanded view 393 of FIG. 1, brush pad 371 can be in the form of a half circle pad. Brush pad 372 can also be in the form of a half circle pad. Brush pad 371 can be mirrored image of brush pad 372 with gaps 375 separating the brush pad 371 from the brush pad 372. The battery assembly 300 can also include brush assembly 381 and brush assembly 382. The brush assembly 381 can include a contact 383. The brush assembly 382 can include contact 384. The brush assemblies 381, 382 can pass through the adjustable magnet plate 350 in a manner as described below. As the brush pad assembly 370 rotates, along with the flywheel assembly 350 upon which the brush pad assembly 370 is supported, the contact 383 alternates between contacting brush pad 371 and brush pad 372, in conjunction with the contact 383 alternating between contacting the other of brush pad 372 and brush pad 371. Further details are described below.

In this illustrative arrangement of FIG. 1, the spacing between the electromagnet 320 vis-à-vis the permanent magnet 342 as compared to the spacing between the electromagnet 330 vis-à-vis the permanent magnet 352 is the same or nearly the same. Additionally, the construct of the electromagnet 320 is the same as the construct of the electromagnet 330, i.e. the electromagnets 320, 330 can be the same type of model of electromagnet.

However, of note, the polarity of the permanent magnet 342, to which the electromagnet 320 is exposed, i.e. approaching, is negative. On the other hand, the polarity of the permanent magnet 352, to which the electromagnet 320 is exposed, i.e. approaching, is positive. Accordingly, while both the electromagnet 320 and the electromagnet 330 experience current drives as a result of approaching the respective permanent magnets, the current drive experienced by the electromagnet 320 is in an opposite direction relative to the current drive experienced by the electromagnet 330. As a result, in this illustrative arrangement of FIG. 1, the two current drives balance each other resulting in a zero or nearly zero net current flow as observed in brush pad assembly 370. In other words, the current drive from the electromagnet 320 cancels out the current drive from the electromagnet 330. Such might be characterized as including an opposing flow of electrons that stall or cancel each other out—thus resulting in a "destructive interference" situation between the two current drives associated with the electromagnets 320, 330.

It is appreciated that the particular direction that the current flows, in the arrangement and disposition shown in FIG. 1, will depend on the particular structure of the electromagnets 320, 330 and the particular structure of the respective permanent magnets 342, 352, as dictated by the "right hand rule" of the current flow, in accordance with at least one embodiment of the disclosure. As described above, the two electromagnets 320, 330 are of the same construct.

Accordingly, since the two electromagnets 320, 330 are of the same construct and experience the same EMF experience, except in reverse polarity from each other, each electromagnet 320, 330 can generate equal, but opposing, current. It is this situation that results in the 2 respective current flows from the electromagnets 320, 330 canceling each other out or in other words balancing each other. As noted above, the arrangement might be characterized as a situation of destructive interference between the two current drives.

Accordingly, in the disposition of the battery assembly 300 shown in FIG. 1, there is complete or nearly complete destructive interference between current flows from the electromagnet 320 and the electromagnet 330. That is, no energy is being pulled off or siphoned off as a result of the rotating electromagnets 320, 330 passing by the respective permanent magnets 342, 330. Since no energy or nearly no energy is being pulled off the battery assembly 300, then rotational speed of the flywheel assembly 310 is not diminished or is minimally diminished. In other words, conservation of energy dictates that if no electrical energy is flowing from the battery assembly 300 then energy of the battery, absent frictional forces from the rotation if any, should remain constant. Accordingly, the battery assembly 300, as shown in FIG. 1, provides an arrangement of stored energy with no current flow or minimal current flow. However, in the manner described further below and illustratively shown in FIG. 2, as the permanent magnet 352 is adjusted from the position shown in FIG. 1, there will indeed be an imbalance in EMF experienced by the electromagnet 330 as compared to the electromagnet 320. It is this imbalance in EMF experience between the 2 electromagnets that can provide a current flow. Furthermore, such current flow constitutes energy flowing out of the battery assembly 300. Accordingly, this energy flow results in a proportional decrease in RPM of the flywheel assembly 310. In other words, a portion of the kinetic energy stored in the rotating flywheel assembly 310 is converted to electrical energy flowing into the brush assemblies 381, 382.

It is appreciated that differences in structure of various components, of the various embodiments, described herein may influence of effect desired operation of a particular assembly. For example, similar structure of two components may operate slightly differently or differently due to variations in manufacturing.

FIG. 2 is a further schematic diagram of battery assembly 300, in accordance with at least one embodiment of the disclosure. However, as alluded to above, in FIG. 2 the position of the permanent magnet 352 has been changed from position 352P1 to position 352P2. As a result, the changing EMF environment experienced by the electromagnet 320 and the electromagnet 330, as a consequence of (a) the electromagnet 320 approaching the permanent magnet 342 and (b) the electromagnet 330 departing from the permanent magnet 330 (in the position 352P2), provides an additive current. That is, in the arrangement of FIG. 2, the two current drives are in the same direction so as to be additive to each other. Such a situation might be characterized as resulting in constructive interference between the two current drives.

Accordingly, it should be appreciated that the adjustability of the adjustable magnet plate 350 allows the position of the permanent magnet 352 to be adjusted, as desired, relative to the permanent magnet 342. As the permanent magnet 352 is so adjusted, the cumulative effect of the current drives from the electromagnet 320 and the electromagnet 330 will also vary.

In accordance with at least one embodiment of the disclosure, as the electromagnet 320 approaches the permanent magnet 342 so as to be underneath the permanent magnet 342 (and symmetrically positioned relative to the permanent magnet 342 along a vertical axis), variance in EMF (as experienced by the electromagnet in total) will progressively diminish in such approach. Indeed, at a point in the electromagnet 320 passing by the permanent magnet 342, current output from the electromagnet 320 will diminish in magnitude of a first polarity, attain a zero value at some point, and then increase in magnitude in the opposite polarity. In other words, as the electromagnet 320 passes by the permanent magnet 342, current from the electromagnet 320 will experience a switchover. This switchover, by design of the construct of the battery assembly 300, can be synchronized with the brush assemblies 381, 382 switching over brush pads 371, 372.

As a result of the synchronized switchover of the electromagnet 320 passing by the permanent magnet 342, output 383 from the battery can always be of the same particular polarity, as dependent on the construct of the electromagnet 320. For purposes of illustration, in this example and arrangement, let's say that the particular polarity is positive. That is, as the electromagnet 320 approaches the permanent magnet 342, the positive current flow from the output 383 will gradually decrease. The current flow will attain a 0 value hand in hand with (a) the electromagnet 320 being aligned vertically with the permanent magnet 342, and (b) switchover of the brush assemblies to the other brush pad. As the electromagnet 320 departs from the permanent magnet 342, the still positive current flow from the output 383 will then gradually increase as the electromagnet 320 parts from the permanent magnet 342.

However, while the electromagnet 320 possesses the capability to produce an ongoing positive polarity output, even though varying in magnitude, the electromagnet 330 will or will not cancel out such positive polarity (of the electromagnet 320) as dependent on the adjustable 392 position of the electromagnet 330. In the arrangement shown in FIG. 1, the electromagnet 330 fully cancels out the electromagnet 320. However, as the electromagnet 330 is adjusted 392 to the left as shown in FIG. 1, that cancellation will decrease in magnitude. Indeed, in the arrangement shown in FIG. 2, the current output by the electromagnet 330 (as a result of interaction with the permanent magnet 352) will be substantially additive or aggregated with or to the current output by the electromagnet 320 (as a result of interaction with the permanent magnet 342).

In an assembly with a brush pad including a plurality of brush pad contact surfaces, processing of an assembly of the disclosure is allowed to repeat—as a rotating assembly rotates and/or passes through a portion of the rotation.

The arrangement of FIG. 1 shows two electromagnets 320 and 330 provided in the flywheel assembly 310. In accordance with at least some embodiments of the disclosure, the flywheel assembly 310 can be provided with more electromagnets, as desired. Hand-in-hand, the adjustable magnet plate 350 and the static magnet plate 340 can be provided with additional permanent magnets that interact with the electromagnets. Illustrative examples of arrangements that can include the arrangement of FIG. 1 are FIG. 12 and FIG. 13.

Illustratively, an arrangement of the disclosure may be characterized or described as including a 1st tuning magnet and a 2nd tuning magnet. The 1st tuning magnet can be adjustable such as the lower permanent magnets in the arrangement of FIG. 13 and FIG. 14. The 1st tuning magnets can move to various positions as desired relative to a 2nd tuning magnet, i.e., the upper permanent magnets in the arrangement of FIG. 13. Accordingly, this movement may be characterized as the 1st tuning magnet positionable throughout a range of positions that include a 1st position and a 2nd position. It is this variance in position that can create a different EMF experience for electromagnets in the arrangement, such as the electromagnets shown in FIG. 13.

Figure 13:
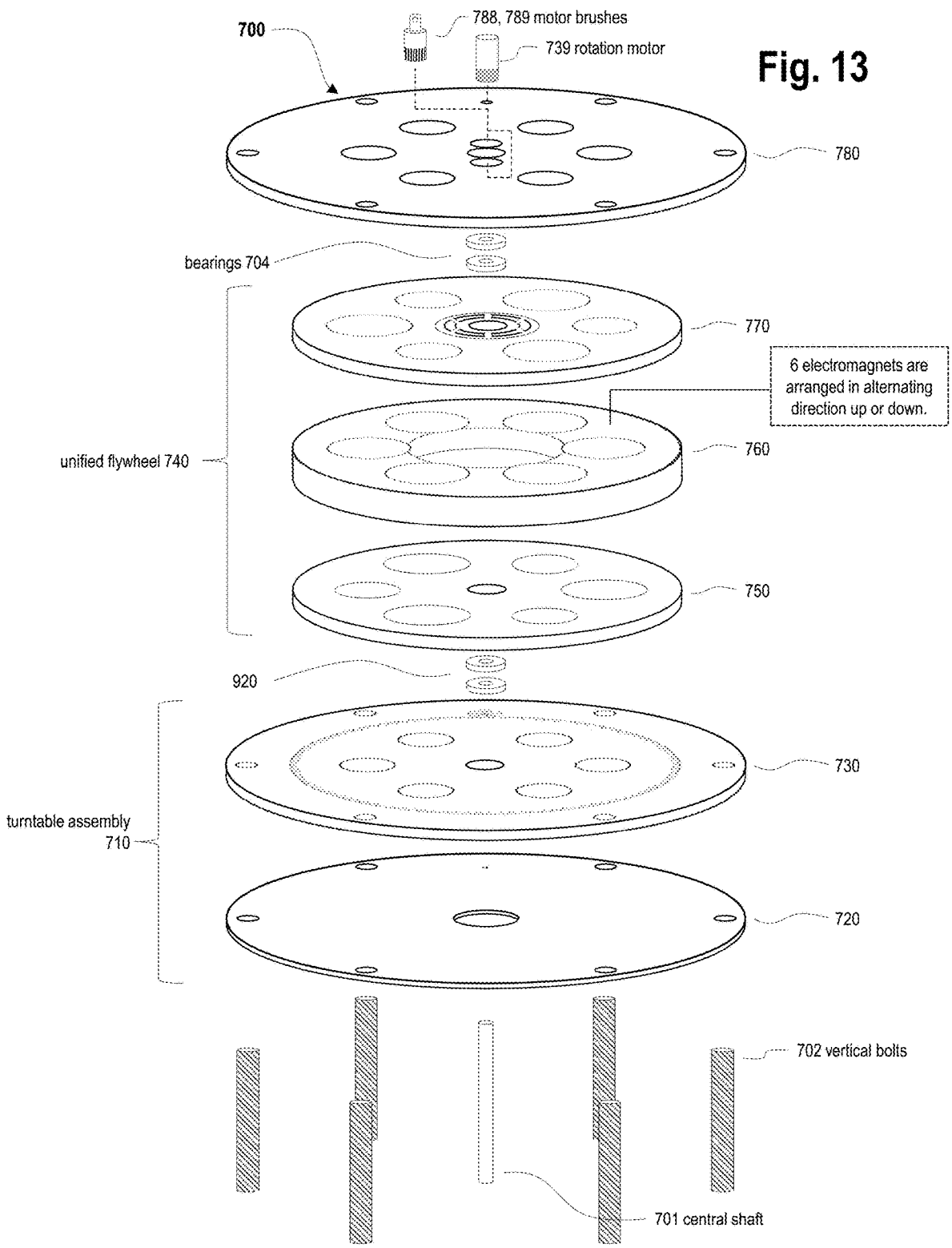
FIG. 13 is an exploded perspective view of a further differential motor assembly with a flywheel, in accordance with at least one embodiment of the disclosure.

As is the case in the arrangement of FIG. 13 and related figures, it is appreciated that particular electromagnets of an assembly may be aimed at or associated with permanent magnets that are intended to interact with electromagnets. Electromagnets of such an assembly may be aimed at or associated with other permanent magnets. Accordingly, particular electromagnets in an arrangement may, by construct of the arrangement, be dictated primarily by one or more permanent magnets. However, the disclosure is not limited to such construct. Relatedly, it is appreciated that directional electromagnets may be utilized in the systems and methods of the disclosure. Such directional electromagnets may be constructed so as to provide and/or interact with an electrical field and/or magnetic field in a particular direction. For example, this might be accomplished by the coils that make up the electromagnet being oriented in a particular direction, with a center core oriented in a particular direction, and/or provided with a housing that limits operation of the electromagnet in a particular direction. For example, the electromagnet might be provided with a steel or insulated backing.

Related to FIG. 1 described above, FIG. 12 illustrates a further differential motor assembly 1200, in accordance with at least one embodiment of the disclosure. The differential motor assembly 1200 utilizes multiple magnet plates (which include rotatable magnet plate 1210, stationary magnet plate 1230, and electromagnet plate 1220). The rotatable magnet plate 1210 may be rotatably mounted on a bearing 1250 on the shaft 1241, supported and rotated by a turn device 1260, such as a motor driven friction wheel. All of plates 1210, 1220, 1230 can be secured to shaft 1241 so as to prevent axial movement along shaft 1241. The stationary magnet plate 1230 can be attached to a housing 1291. The shaft 1241 can be rotatably secured in a housing 1291 and can be attached to flywheel, although the electromagnet plate 1220 in and of itself can possess mass so as to store kinetic energy.

The stationary magnet plate 1230 holds stationary magnets 1231. The rotatable magnet plate 1210 holds rotatable magnets 1211. The rotatable magnet plate 1210 can be rotated relative to the stationary magnet plate 1230 so as to change the magnetic field experienced by electromagnets, i.e. electromagnet coils 1221, which are mounted in the electromagnetic plate 1220.

The rotatable magnet plate 1210 can be rotated around the output shaft 1241 so as to either align the rotatable magnets 1211 with or against the stationary magnets 1231 on the stationary magnet plate 1230. By having the rotatable magnets 1211 and the stationary magnets 1231 align their poles, you create a low magnetic field resistance that allows the electromagnet coils 1221 to generate less current. However, you can also have the rotatable magnets 1211 and the stationary magnets 1231 align with their poles reversed to each other—to generate a high magnetic field resistance which will force the electromagnets 1221 to generate more current when the electromagnets 1221 are rotated.

Figure 12:
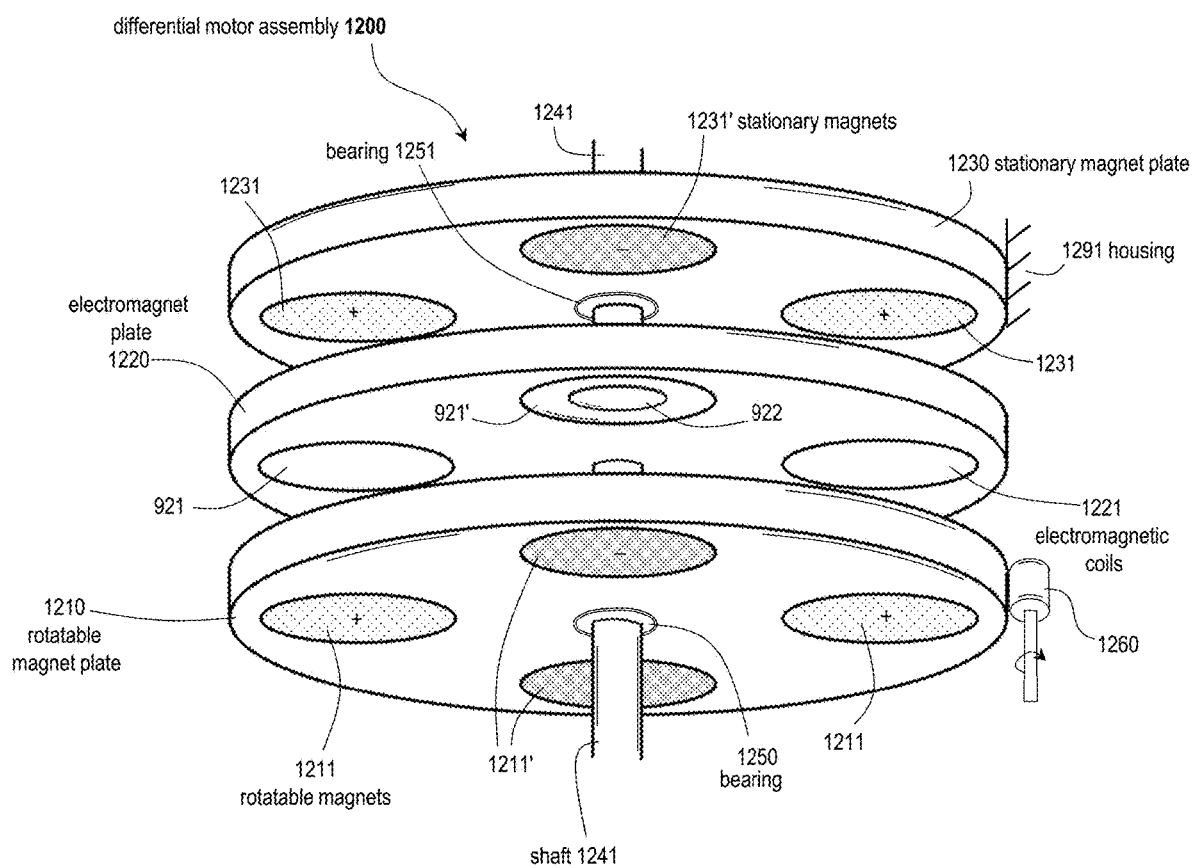
FIG. 12 is a perspective view of a further differential motor assembly with a flywheel, in accordance with at least one embodiment of the disclosure.

The stationary magnets 1231 in the stationary magnet plate 1230 may be of alternating polarity meaning that stationary magnets 1231 may be positive down versus stationary magnets 1231' may be negative down, or vice-a-versa. The rotatable magnets 1211 in the rotatable magnet plate 1210 may be of alternating polarity meaning that rotatable magnets 1211 may be positive down versus stationary magnets 1211' may be negative down, or vice-a-versa. Such alternating arrangement can provide more variability in altering the magnetic field resistance or EMF experienced by the electromagnet coils 1221. Further, directional electromagnets may be used such as electromagnet 1221'—and the direction of such directional electromagnets may be alternated as shown in FIG. 12. For example, such directional electromagnets might be constructed with an insulating backing with an inner core 1222 aimed in a particular direction, as shown in the electromagnet 1231'.

This assembly 1200 also allows the electromagnet coils to generate more power since they can experience a magnetic field on both sides due to both the rotatable magnets 1211 and the stationary magnets 1231. But although this system can have the poles of the rotatable and stationary magnets 1210, 1230 completely in line or completely against each other, the magnets can be in any position between their complete alignment and complete misalignment, to have a variable power output, or motor strength as needed. Wiring may be provided/attached to the electromagnet coils 1221 so as to drive the electromagnetic plate 1220 with current and to output current from the electromagnetic plate 1220.

A system such as the differential motor assembly 1200 can power-up an associated flywheel with either a direct connection or a non-direct system such as a planetary gear set through the output shaft 1241. This can provide more energy storage than just the electromagnetic plate can store. A non-direct connection such as the planetary gear set can allow this differential motor assembly 1200 or other differential motor assemblies described herein to slowly speed up a body, e.g. flywheel, that stores energy in a manner so as to avoid heating up the differential motor assembly 1200 or breaking the differential motor assembly 1200 down from stress. It is appreciated that permanent magnets could be added to a flywheel of the arrangement or other rotating component to suspend or rotationally support such component (with magnetic levitation, for example) in order to lower resistance of such component.

FIG. 13 is an exploded perspective view of a battery 700 in accordance with at least one embodiment of the disclosure. The battery 700 is illustrative of a particular example and implementation of the arrangement shown in FIG. 1, in accordance with at least one embodiment of the disclosure. The battery 700 includes a turntable assembly 710, a unified flywheel or flywheel 740, and an external mount sheet 780. The turntable assembly 710 and the external mount sheet 780 may be secured to each other and secured to a suitable housing. Such securement may be provided utilizing a plurality of vertical bolts that extend through holes in both the turntable assembly 710 and the external mount sheet 780. These bolts may also be attached to a suitable housing to support the battery 700. A central shaft 701 passes through the center of the battery 700. The central shaft were shaft 701 is fixed to the unified flywheel 740 such that when the shaft 701 turns, the unified flywheel 740 also turns. The central shaft 701 can be attached to a suitable physical connection so as to be able to mechanically turn the central shaft 701. For example, such physical connection might be a driveshaft at a service station on a highway, in the situation that the battery 700 is utilized in a vehicle. Such driveshaft would connect to the shaft 701 so as to speed the unified flywheel 740 up to speed. In this manner, kinetic energy would be stored in the unified flywheel 740. The central shaft 701 can also be attached to a further flywheel and/or to a gear arrangement or other arrangements as described herein.

The battery 700 can include bearing or bearings 704 that serve to rotatably support the central shaft 701 so as to allow rotation within external mount sheet 780. The battery 700 can include bearing or bearings 703 that serve to rotatably support the central shaft 701 so as to allow rotation within the turntable assembly 710.

Figure 14:
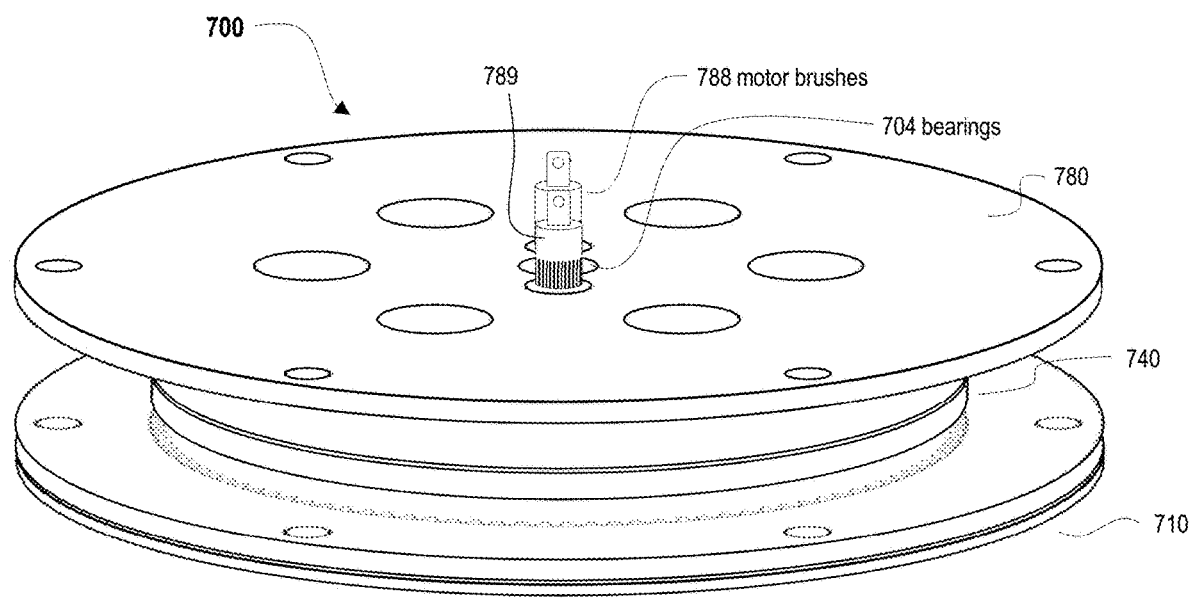
FIG. 14 is an perspective view of the differential motor assembly of FIG. 13, in accordance with at least one embodiment of the disclosure.

FIG. 14 is a perspective view of the battery 700 of FIG. 13 in accordance with at least one embodiment of the disclosure. In particular, FIG. 14 shows motor brushes 788, 789. In manner as described below, the motor brushes 788, 789 interface or engage with a brush pad 790 on the unified flywheel 740. Specifically, the brush pad 790 provided on a flywheel top sheet 770. The motor brushes 788, 789 serve to provide electrical flow to and from the unified flywheel 740. Further details are described below.

Figure 15:
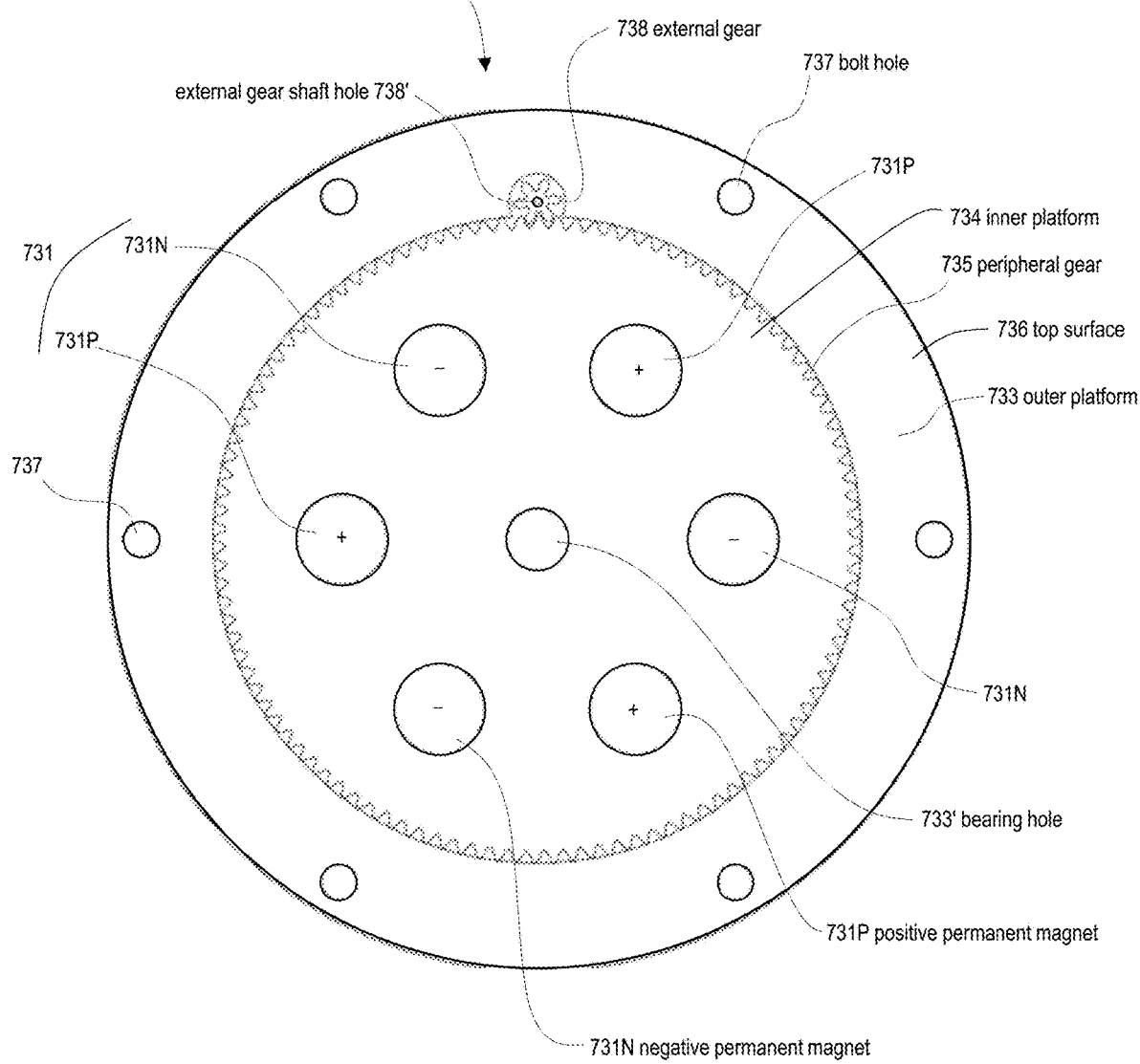
FIG. 15 is a top view of a component of the differential motor assembly of FIG. 14, in accordance with at least one embodiment of the disclosure.

As shown in FIG. 13, the turntable assembly 710 includes an external mount sheet 730 and an external mount sheet backing 720. FIG. 15 is a top view of the external mount sheet 730.

The external mount sheet 730 includes a plurality of bolt holes 737. The bolt holes 737 engage with the vertical bolts 702 so as to support the external mount sheet 730. The external mount sheet 730 also includes an inner platform 734 and an outer platform 733. The outer platform 733 can include a top surface 736 as shown in FIG. 15. The inner platform 734 can rotate within the outer platform 733. The inner platform 734 is provided with peripheral gears or gear rack 735.

The peripheral gears 735 interact with external gear 738. The external gear 738 is pivotally attached in a external gear shaft hole 738' in the outer platform 733. Rotation of the external gear 738 can be controlled as described below. The external gear 738 engages with the peripheral gear 735. As a result, as the external gear 738 is rotated, the inner platform 734 is rotated. This allows rotation of a plurality of permanent magnets 731 that are housed in the inner platform 734. Rotation of the inner platform 734 is provided by a bearing hole 733'.

The permanent magnets 731 provided or housed in the inner platform 734 include 6 magnets in the illustrative battery 700. The magnets can be in the form of short cylindrical magnets being positive on one side and negative on another side. The permanent magnets 731, contained in the inner platform 734, alternate between being a negative permanent magnet 731N and a positive permanent magnet 731P. According, such magnet 731 may be the same magnet but oriented with opposite side up.

Figure 16:
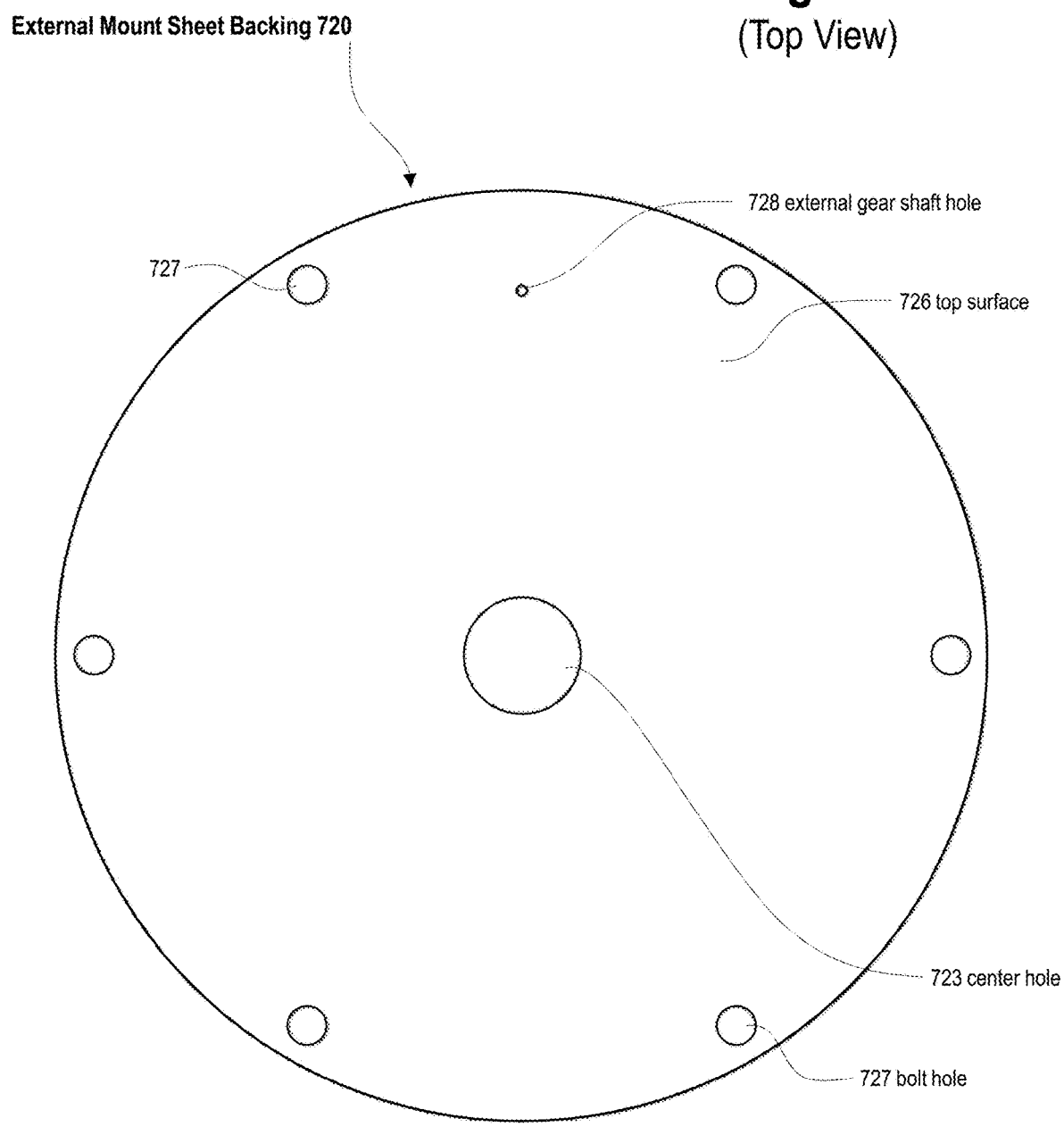
FIG. 16 is a top view of a component of the differential motor assembly of FIG. 14, in accordance with at least one embodiment of the disclosure.

FIG. 16 is a top view of the external mount sheet 720. The external mount sheet backing 720 includes center hole 723. The central shaft 701 passes through the center hole 723. The external mount sheet backing 720 also includes a plurality of bolt holes 727. The bolt holes 727 engage with vertical bolts 702. In this manner, the external mount sheet backing 720 can be connected to the external mount sheet 730. Specifically, the external mount sheet backing 720 can be fixed to the outer platform 733 of the external mount sheet 730.

The external mount sheet backing 720 also includes an external gear shaft hole 728. The external gear shaft hole 728 can serve to secure a shaft that rotatably supports the external gear 738.

The unified flywheel 740 can include a flywheel bottom sheet 750, a flywheel electromagnet plate 760, and a flywheel top sheet 770.

Figure 17:
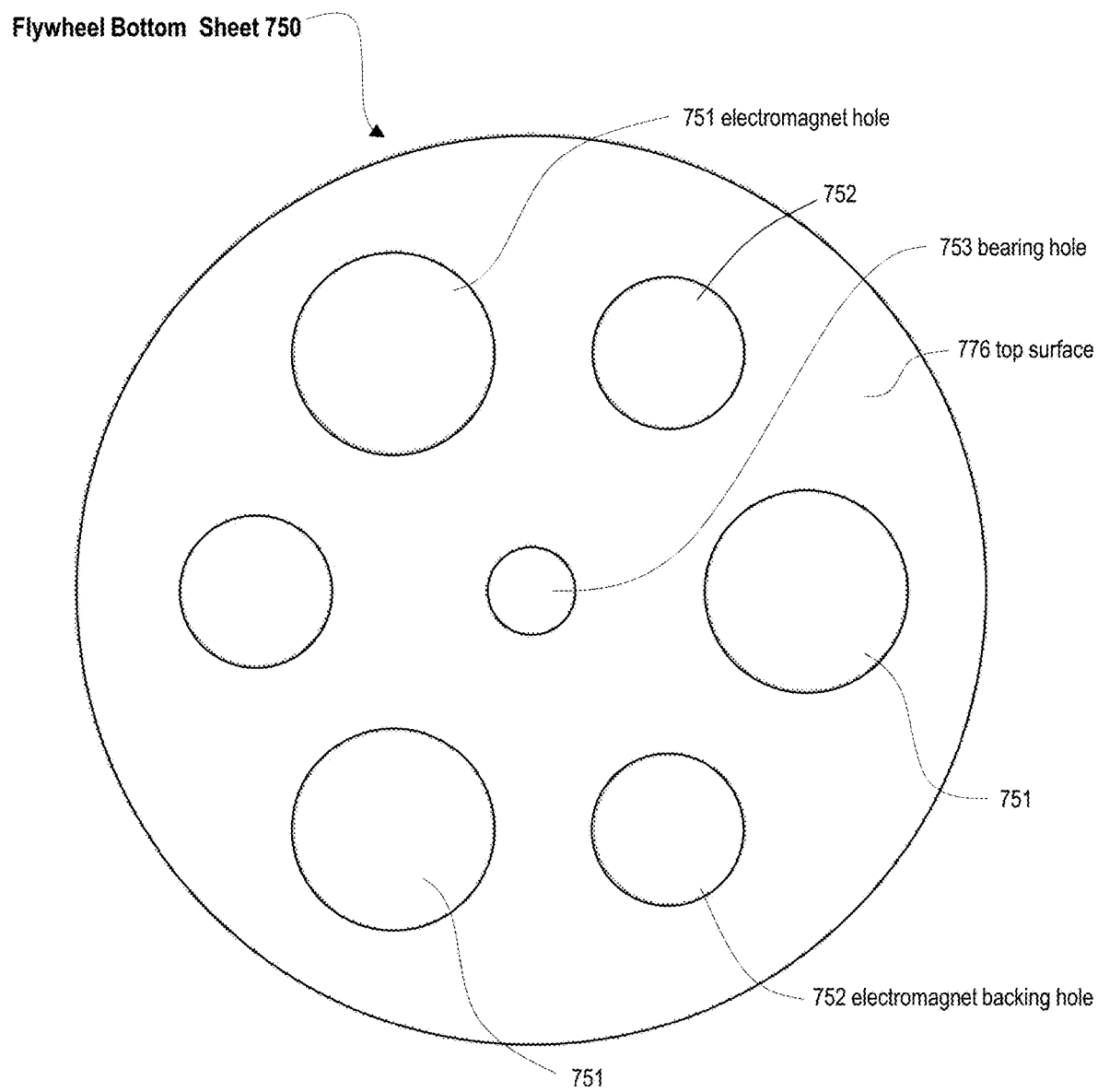
FIG. 17 is a top view of a component of the differential motor assembly of FIG. 14, in accordance with at least one embodiment of the disclosure.

FIG. 17 is a top view of a flywheel bottom sheet 750. The flywheel bottom sheet 750 includes bearing hole 753 that serves to house central shaft 701. The flywheel bottom sheet 750 includes a top surface 776. The flywheel bottom sheet 750 includes a plurality of the electromagnetic holes 751. The flywheel bottom sheet 750 further includes a plurality of electromagnet backing holes 752. The electromagnet holes 751 provide an aperture through which electromagnets can operate. That is, a functional side of an electromagnet may be positioned so as to contact or about the electromagnet holes 751. In this manner, electromagnets are exposed to operate and function. On the other hand, the electromagnet backing hole 752 is provided to support and provide access to a backside of the electromagnet. The backside of the electromagnet might be characterized as the nonfunctional side. The electromagnet backing hole 752 can provide access to an electromagnet as further described below.

Figure 18:
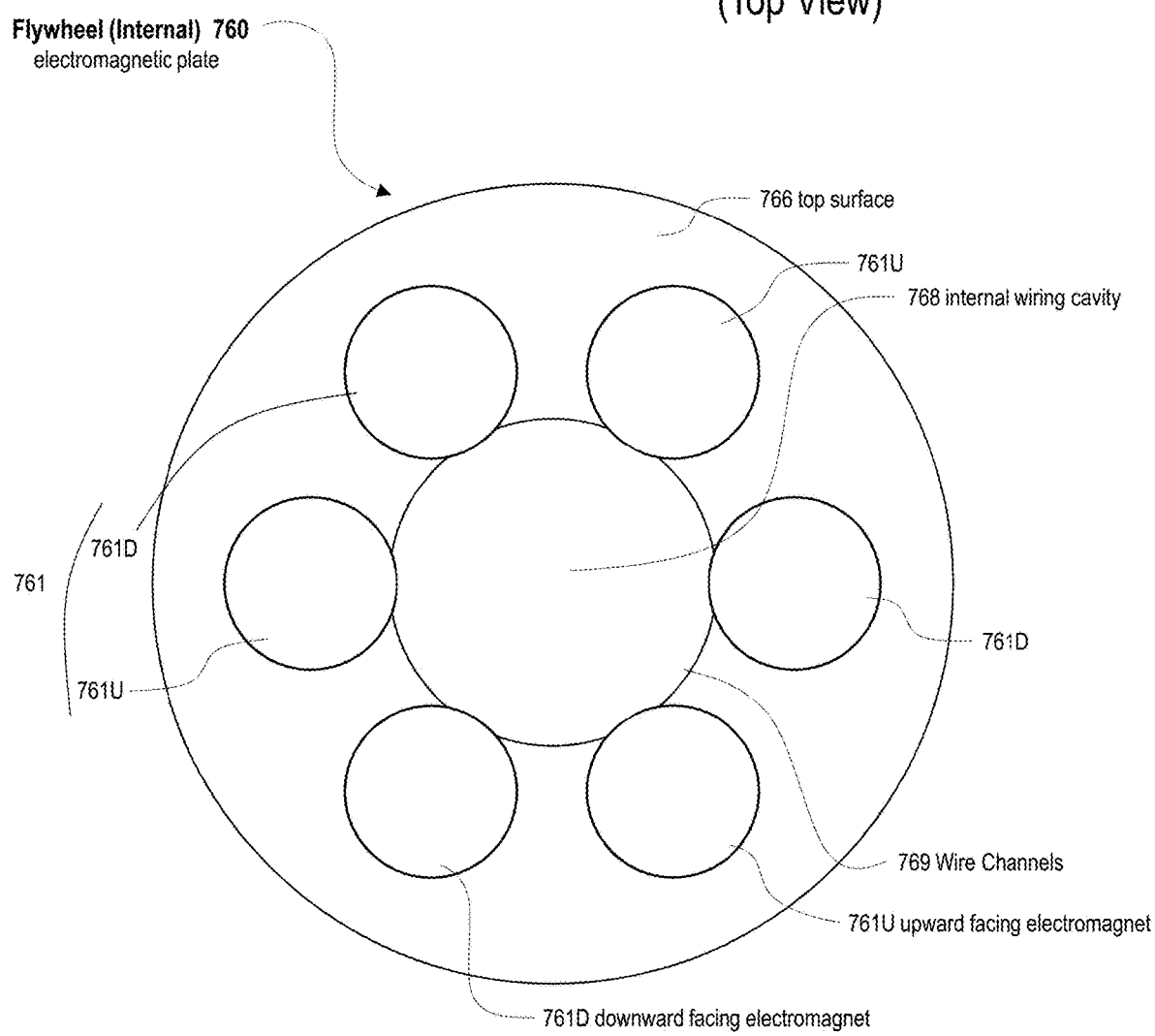
FIG. 18 is a top view of a component of the differential motor assembly of FIG. 14, in accordance with at least one embodiment of the disclosure.

FIG. 18 is a top view of a flywheel electromagnetic plate 760. The flywheel electromagnetic plate 760 can it be adhesive or otherwise affixed to the flywheel bottom sheet 750.

Alternatively, mechanical fasteners can be used to affix the flywheel bottom sheet 752 the flywheel electromagnetic plate 760. Similarly, the flywheel top sheet 770 can be affixed to the flywheel electromagnet plate 760 using adhesive or mechanical fasteners.

As shown in FIG. 18, the flywheel electromagnetic plate 760 includes apertures that support a plurality of electromagnets 761. Some of the electromagnets 761 may be upward facing and some of the electromagnets 761 may be downward facing. In the example battery 700 and shown in FIG. 18, there are 3 upward facing electromagnets 761U. additionally, there are 3 downward facing electromagnets 761D. The upward facing electromagnets alternate with the downward facing electromagnets.

Figure 19:
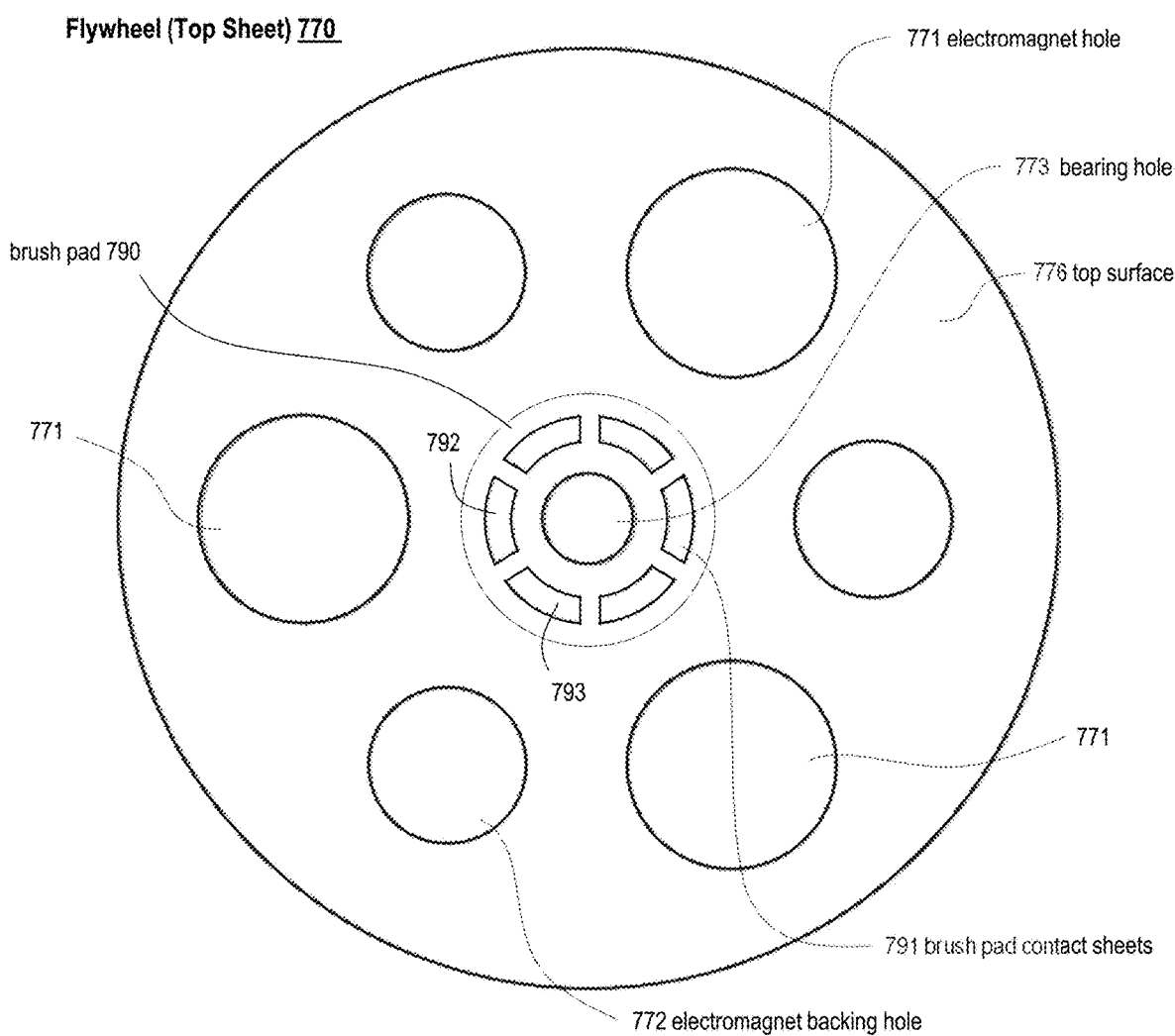
FIG. 19 is a top view of a component of the differential motor assembly of FIG. 14, in accordance with at least one embodiment of the disclosure.

FIG. 19 is a top view of a flywheel top sheet 770. In a manner similar to the flywheel bottom sheet 750, the flywheel top sheet 770 can include a plurality of electromagnet holes 771. The flywheel top sheet 770 can also include a plurality of electromagnet backing holes 772. The holes 771 alternate with the holes 772. As described above, each electromagnet hole 771 provides an opening through which the corresponding electromagnet operates. So as to allow effective operation, the electromagnet hole 771 can be provided to be a diameter that corresponds to a diameter of the particular electromagnet. In similar manner, each electromagnet hole 771 can be provided in a diameter that corresponds to a diameter of the particular electromagnet that is housed therein.

The flywheel top sheet 770 also includes a brush pad 790. The brush pad 790 includes a plurality of brush pad contact sheets 791. The brush pad contact sheets can include what might be characterized as positive contact sheet 792 and negative contact sheet 793. The contact sheets 791 of the brush pad 790 variably contact the motor brushes 788, 789. Further details are described below.

Figure 20:
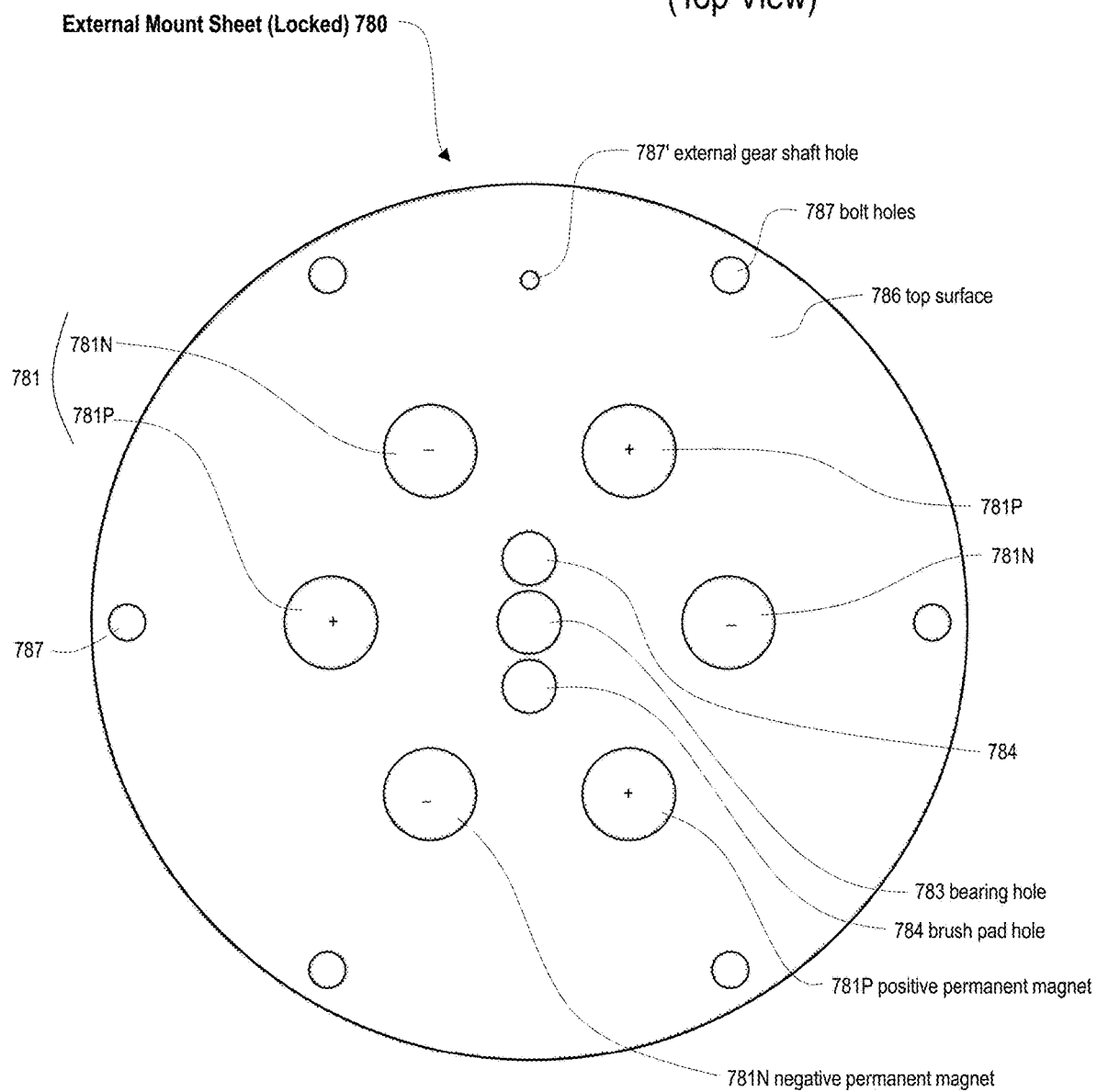
FIG. 20 is a top view of a component of the differential motor assembly of FIG. 14, in accordance with at least one embodiment of the disclosure.

As described above, the battery 700 also includes the external mount sheet 780. FIG. 20 is a top view of the external mount sheet 780, in accordance with at least one embodiment of the disclosure. The external mount sheet 780 includes a plurality of bolt holes 787 that support vertical bolts 702. Accordingly, the external mount sheet 780 may be fixedly attached to the turntable assembly 710. The unified flywheel 740 is allowed and provided to rotate between the external mount sheet 780 and the turntable assembly 710. Accordingly, the unified flywheel 740 may be characterized as being sandwiched between the external mount sheet 780 and the turntable assembly 710.

The external mount sheet 780 includes a bearing hole 783. The bearing hole 783 rotatably houses and supports the central shaft 701. The external mount sheet 780 also includes brush pad holes 784. The brush pad holes 784 provide a pass-through and house the motor brushes 788, 789. The external mount sheet 780 also includes an external gear shaft hole 787', which serves to support a shaft that powers the external gear 738. Relatedly, a rotation motor 739, as shown in FIG. 13, can be affixed to the top surface 786 of the external mount sheet 780. The rotation motor 739 can be controlled by a suitable controller so as to conform rotation of the inner platform 734. This rotation of the inner platform 734, and the permanent magnets 731 provided thereon, allow the spatial position of such permanent magnet 731 to be varied relative to permanent magnets 781 mounted on the external mount sheet 780, as shown in FIG. 20.

That is, as shown in FIG. 20, the external mount sheet 780 can support a plurality of magnets 781. In a manner similar to the permanent magnets 731 of the external mount sheet 730, the permanent magnets 781 are provided to alternate between negative and positive direction. Illustratively, the permanent magnets 781 can include positive permanent magnets 781P and negative permanent magnets 781N.

The electromagnets in the various and assorted diagrams and descriptions can utilize a variety of wiring setups to achieve their particular set of tasks. Example of potential circuits can be either series, parallel, or a culmination of the two. Connecting the electromagnets in series can produce a system where the voltage of the electromagnets is cumulative whilst the amperage remains constant, and connecting them in parallel can likewise maintain the same voltage, but add their amperages together. Culminating the two systems into a mixture will proportionally increase both the voltage and amperage of the system as a whole with respect to the original electromagnets.

FIG. 13 can connect the electromagnets present in the unified flywheel in series as to combine and/or add their voltages. The direct wiring of this series circuit can take place within the internal wiring cavity and/or in slots, for example wire channel(s) 769, of the unified flywheel, and have its positive end and negative end connect to 3 respective alternating brush pads. That is, a particular electromagnet's positive end can connect to 3 first brush pads. Its negative end can connect to 3 second brush pads. The first brush pads and the second brush pads can alternate around the brush pad base, or assembly.

The models represented in the various drawings in this application can utilize a variety of materials, although some may be preferable for certain tasks. Materials which carry a very high tensile strength are particularly good for elements such as the flywheel where maximum rotational speed can dictate the charge capacity of the battery. Virtually all of the non electrical system components can be made out of any material desired, although as previously stated, structural integrity can play a large role in choosing. Some of the electrical components however may be limited to material choice by their conductivity. Examples of this include the brush pad's non conductive portions where the material selected has to be non conductive, and in the cables where a high conductivity may be required to effectively carry current.

Figure 25:
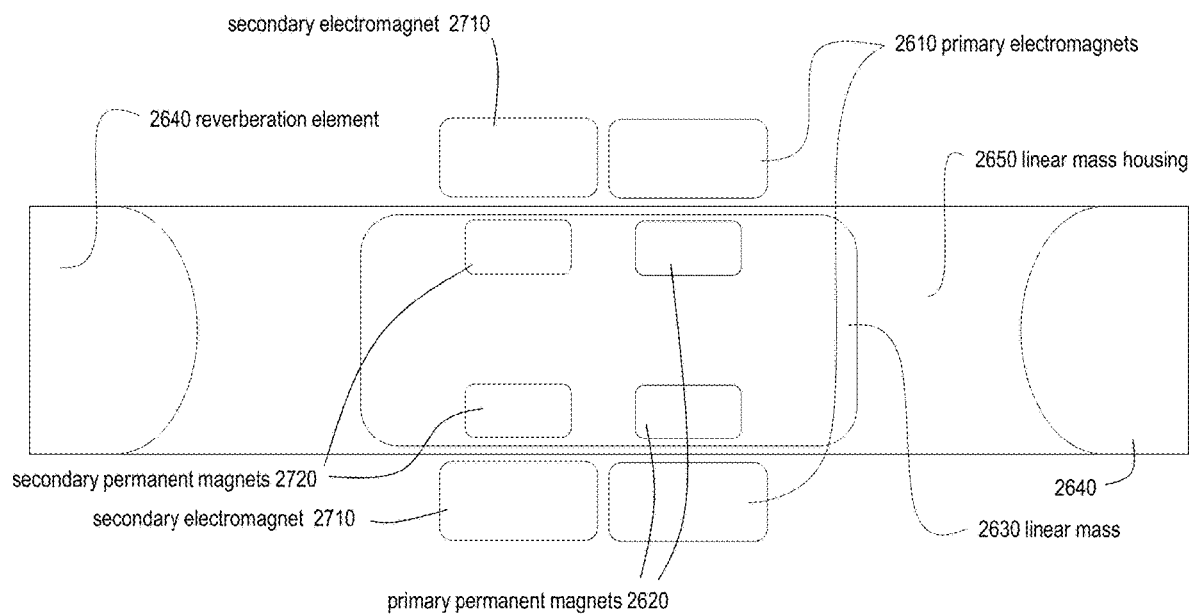
FIG. 25 is a schematic diagram that illustrates a variable linear AC battery, in accordance with at least one embodiment of the disclosure.

Various arrangements including batteries and assemblies are described herein as including permanent magnets and/or electromagnets. It is appreciated that permanent magnets may be switched or swapped with electromagnets as may be desired. Relatedly, it is appreciated that in accordance with one aspect of the disclosure, an electromagnet is exposed to a varying EMF experience. This varying EMF experience may be controlled by a user, by a suitable control system or through a mechanical system, for example, so as to control the EMF experience of an energy object. For example, an energy object of the disclosure may be constituted by a flywheel as variously described herein. An energy object of the disclosure may be constituted by a linear mass, such as is shown in FIG. 25. However, the disclosure is not limited to such each energy objects. In accordance with the disclosure, an energy object, which possesses kinetic energy, for example, can be associated or physically affixed with an electromagnet and exposed to varying EMF experiences so as to vary current flowing from such energy object/electromagnet associated with such energy object. The EMF experience may be varied such that no or minimal current flows, or alternatively, such that a maximum amount of current flows. As current flows in a particular battery system of the disclosure, the kinetic energy in the energy object will be depleted. An energy object of the disclosure can also be associated or physically affixed to a permanent magnet, such as is illustrated in FIG. 25. As position of the electromagnets are varied about the permanent magnet affixed to the energy object, energy flow from such electromagnets can be varied.

It is appreciated that in the various batteries, assemblies, and other arrangements of the disclosure, performance will be affected by various operating attributes, such as friction. For example, in the situation of a rotating flywheel, frictional forces associated with the support of the rotating flywheel will affect performance and the ultimate amount of energy that can be obtained from a given amount of kinetic energy stored in a rotating flywheel. As otherwise described herein, it is appreciated that measures may be taken to address such frictional forces, such as magnetic levitation of energy objects described herein. Such can include magnetic levitation of a flywheel. Other arrangements may be utilized so as to minimize friction and other operating attributes which can affect performance.

Figure 21:
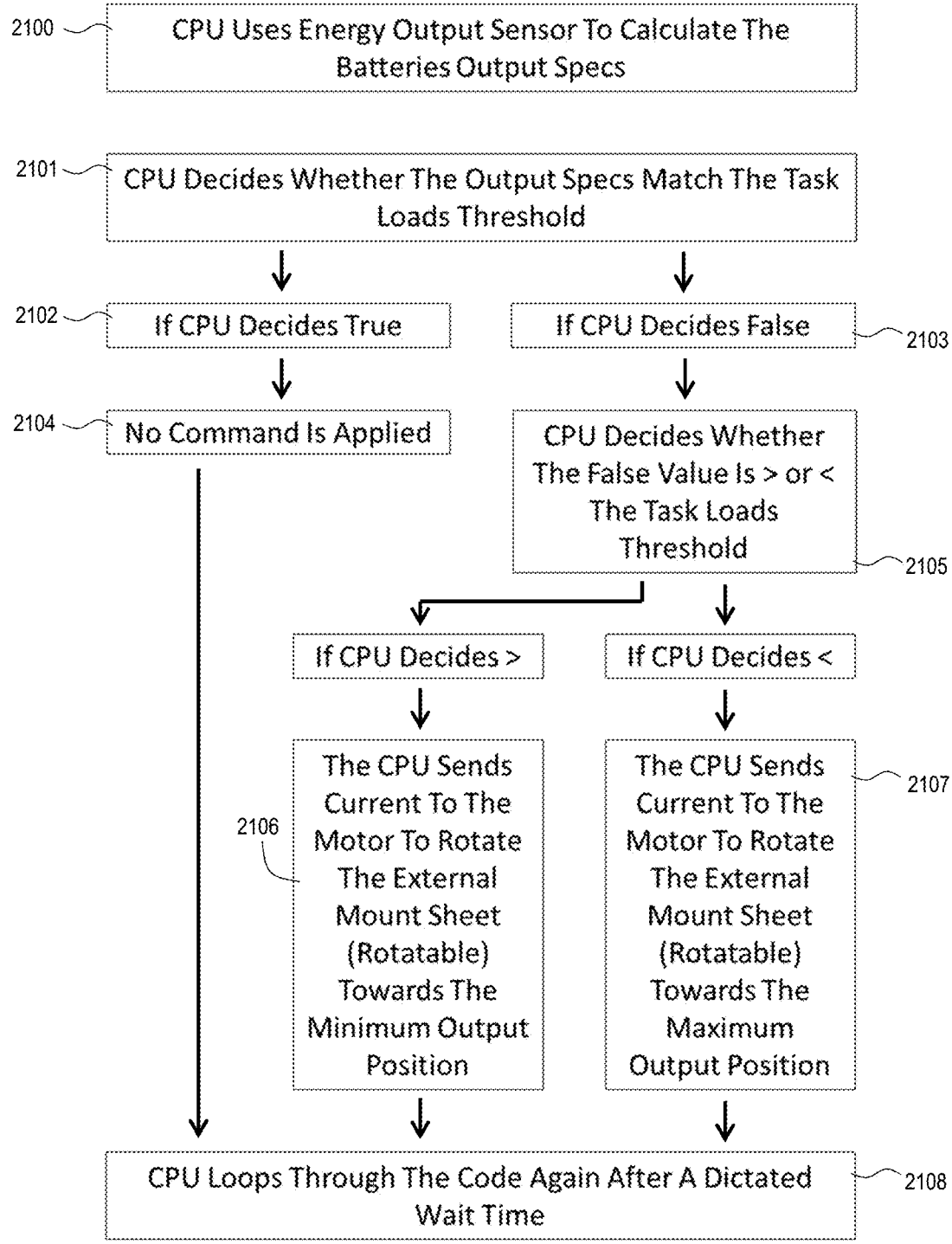
FIG. 21 is a flow chart showing a process of the disclosure, in accordance with at least one embodiment of the disclosure.

FIG. 21 is a flowchart of processing in accordance with at least one embodiment of the disclosure.

FIG. 12 illustrates a possible code sequence that can be used with a variety of the other assemblies illustrated in this disclosure. This particular code sequence can be used to move the tuning magnets to a desired location such that a desired output can be drawn from the system. The first stage of this sequence 2100 tells the CPU to calculate the current energy output of the system via either a predetermined prediction curve, or more commonly an output sensor. The CPU then takes that value and decides whether the current output specs match a task load threshold 2101. If the CPU decides true 2102, then no motor command is applied 2104, and the CPU simply loops back to the top of the code after a wait time 2108. If the CPU decides false 2103 however, a secondary decision is made by the computer 2105 as to whether the false value is greater than or less than the task load threshold.

If the CPU decides greater than, the CPU sends current to the motor to rotate the tuning magnets towards the minimum output position 2106. If the CPU decides less than, it sends current to the motor to rotate the tuning magnets towards the maximum output position 2107. This then leads to a wait time 2108 before the code is looped back through again.

This code sequence or process can be used with a variety of the figures to allow computer controlled adjustment of the systems output to a target value between a certain threshold. A system of this type can be used to allow a computer to match an external electrical load's exact energy draw, to increase efficiency of the energy storage.

Accordingly, the process shown in FIG. 21 can be performed by a suitable computer processor or computer processors. Additionally, it is appreciated that any of a wide variety of attributes, operating parameters, and other data or information may be utilized with the various arrangements of the disclosure.

It is appreciated that one or more arrangements of the disclosure may be used in conjunction with each other. For example, one or more similar batteries or other arrangements may be used in conjunction with each other. One or more different batteries were other arrangements may be used in conjunction with each other.

Figure 22:
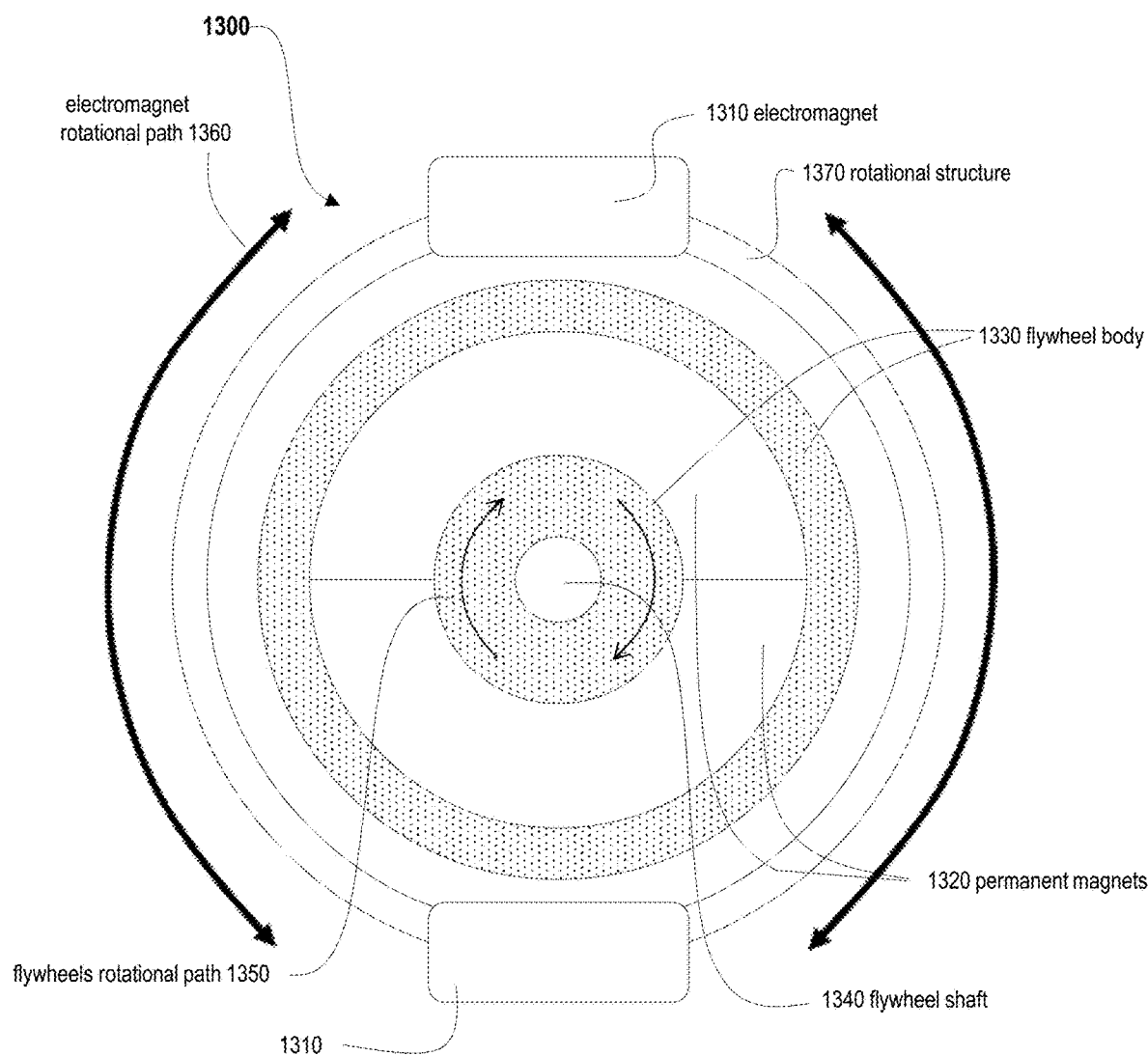
FIG. 22 is a top view of a variable AC layer, in accordance with at least one embodiment of the disclosure.

FIG. 22 is a top view of a top half of a variable output AC generator and variable input AC motor portion, i.e. a variable AC layer 1300, in accordance with at least one embodiment of the disclosure. The flywheel body 1330 is bound to both the permanent magnets 1320 and a flywheel shaft 1340, and rotates within the electromagnets 1310 and a rotational structure 1370. As both the flywheel body, and permanent magnets rotate along the flywheel's rotational path 1350 in relation to the electromagnets, they can produce an electromotive force, whose magnitude is dictated by both the speed of the rotation of the flywheel 1330 in relation to the electromagnets, and the relative distance in radius between the permanent magnets 1320 and the electromagnets 1310. This system shown in the diagram is one half of a larger system as displayed in FIG. 24, but it is understood that this half can still operate as a standard AC (alternating current) motor, which when kinetically charged can act as a permanent magnet AC generator. A battery of this nature of the disclosure stores energy in the rotation of the flywheel or flywheel body 1330, acting as rotational kinetic energy, which can then later be syphoned off as electrical energy, in accordance with the law of conservation of energy. As the center of each of the permanent magnets passes over the centerline of the electromagnet, the electromotive force generated is effectively zero, and the current generated by the system as a whole reverses direction, either from positive to negative, or negative to positive when it carries past the centerline. This diagram of FIG. 22 also denotes a rotational structure 1370 that rotates the electromagnets relative position around the flywheel shaft and the flywheel as a whole. This rotation of the rotational structure along the electromagnet rotational path 1360, and therefore the rotation of the electromagnets along the electromagnet rotational path can be controlled by an external source, and can be shifted to any arbitrary position along its rotation at any given point to achieve a desired position.

Figure 23:
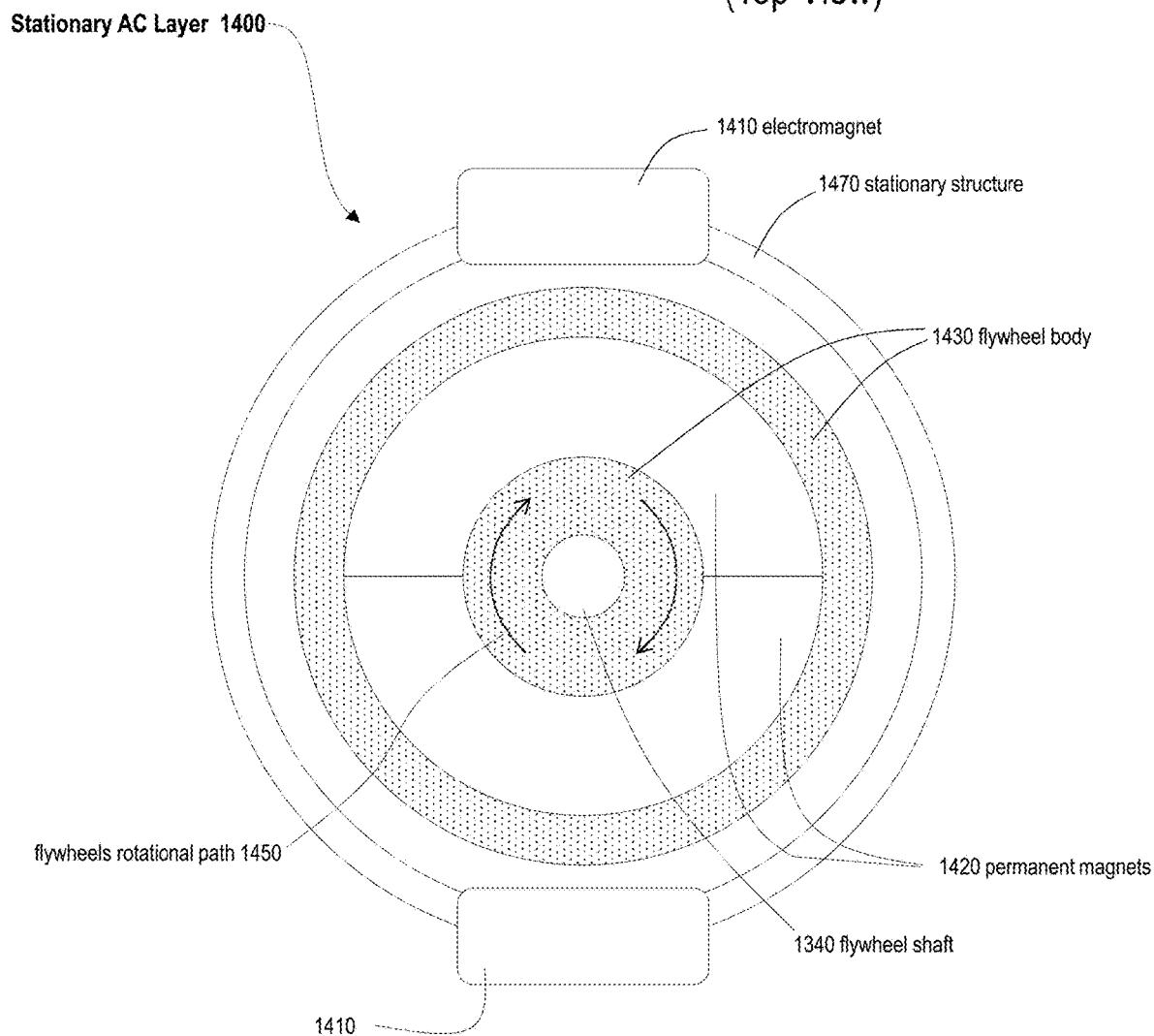
FIG. 23 is a top view of a stationary AC layer, in accordance with at least one embodiment of the disclosure.

FIG. 23 is a top view of a bottom half of a variable output AC generator and variable input AC motor portion 1300, i.e. a stationary AC layer 1400, in accordance with at least one embodiment of the disclosure. The flywheel body 1430 is bound to both the permanent magnets 1420 and a flywheel shaft 1340, and rotates within the electromagnets 1410 and a stationary structure 1470.

As both the flywheel body, and permanent magnets rotate along the flywheels rotational path 1450 in relation to the electromagnets, they can produce an electromotive force, whose magnitude is dictated by both the speed of the rotation of the flywheel in relation to the electromagnets, and the relative distance in radius between the permanent magnets and the electromagnets. This system shown in the diagram is one half of a larger system as displayed in FIG. 24, but it is understood that this half can still operate as a standard AC (alternating current) motor, which when kinetically charged can act as a permanent magnet AC generator. A battery of this nature stores energy in the rotation of the flywheel, acting as rotational kinetic energy, which can then later be syphoned off as electrical energy, in accordance with the law of conservation of energy. As the center of each of the permanent magnets passes over the centerline of the electromagnet, the electromotive force generated is effectively zero, and the current generated by the system as a whole reverses direction, either from positive to negative, or negative to positive when it carries past the centerline. This diagram also denotes a stationary structure that can maintain the electromagnets relative position around the flywheel shaft and the flywheel as a whole.

Figure 24:
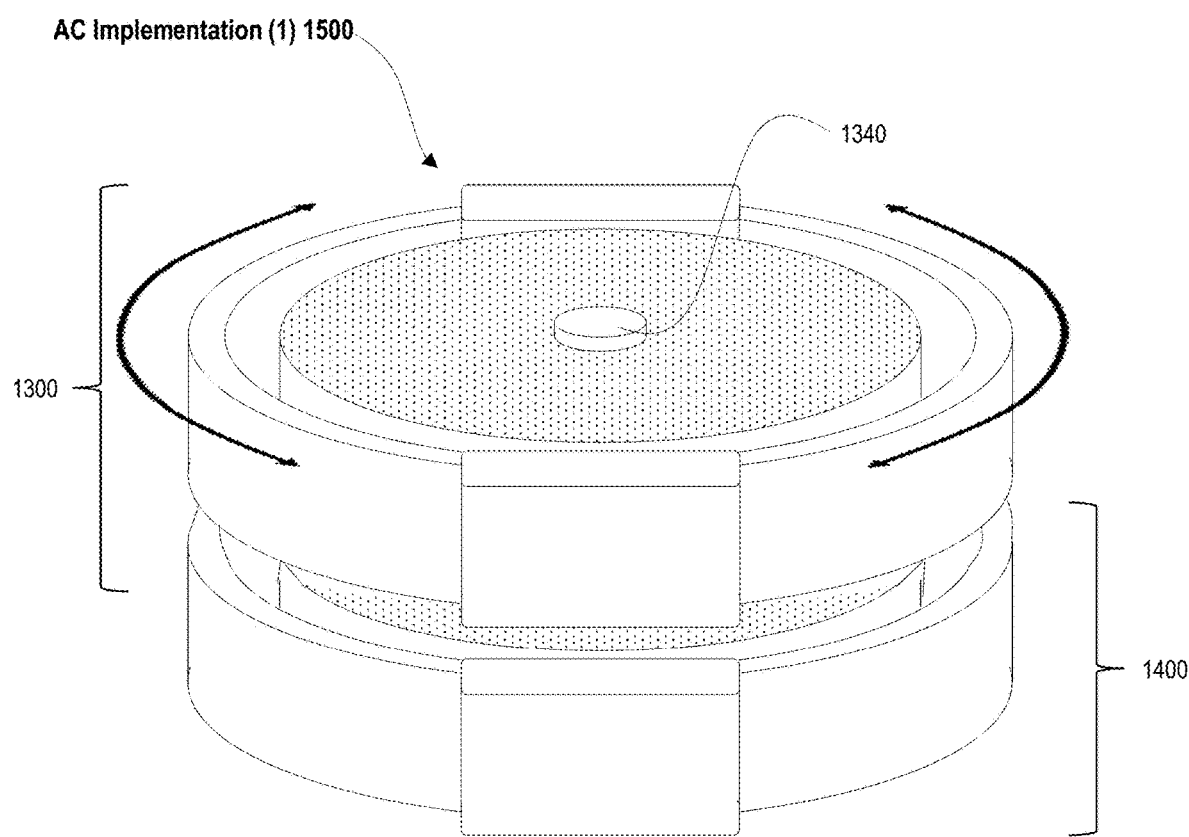
FIG. 24 is a perspective view of an AC implementation system 1500, in accordance with at least one embodiment of the disclosure.

FIG. 24 is a perspective view of an AC implementation system 1500, in accordance with at least one embodiment of the disclosure.

FIG. 24 shows the assembly of both FIG. 22, and FIG. 23, to produce a collective system 1500. This system can bind the two subsystems shown by the other FIGS. 22 and 23 with the central shaft, or by linking the flywheel bodies, and or permanent magnets of FIG. 22, and FIG. 23. This linking of the two subassemblies by the flywheels and or shafts can result in a system where the rotational structure 1370 can rotate relative to both the stationary structure 1470 and the flywheel unit. Because the permanent magnets change the direction of their current output as they pass over the centerline of the permanent magnets, shifting the rotational structure, and in turn the electromagnets 1310, changes the point at which the variable AC layer changes direction of current in regard to the stationary AC layer. While both layers can independently generate electricity and act as a standard AC motor when their outputs are separate, binding the output cables of the two sets of electromagnets allows you to generate a spectrum of outputs ranging from a maximum output, to a minimum output. When the rotational structure is shifted in regard to the stationary structure, you can produce an EMF that is relative to the amount of time the two layers spend aggregating the same direction of current. When the variable AC layer generates current whose direction consistently opposes that of the stationary AC layer, the system as a whole can result in a zero or nearly zero net current flow, caused by the destructive interference of the two electron flows effectively stalling each other out. Because no energy is being syphoned off of the system in the form of electrical output, the rotational speed of the flywheel unit is not diminished or is minimally diminished. However, the position of the rotational structure in relation to the rest of the system can reside in such a way that the variable AC layer generates current in the same direction as the stationary AC layer for part of the flywheels rotation. When this is the case, a partial output will be achieved where current will be syphoned off for the duration of the flywheel unit's rotational travel where the two halves of the subsystem generate similarly flowing current, and current will observe destructive interference in the duration of the rotational travel where the current flows oppose. Such a position can additionally be achieved when the rotational structures of the two halves of the system align the point at which they reverse current directions, during which the output and input of the system will mimic that of a standard AC motor and or generator.

FIG. 25 is a side view of a variable linear AC battery, in accordance with at least one embodiment of the disclosure. The battery includes a linear mass housing 2650. The housing 2650 can be cylindrical in shape. The housing 2650 can be constructed of suitable material such as a plastic material or a metal material, in accordance with respective embodiments of the disclosure. The battery 2600 includes a linear mass 2630. The linear mass 2630 is energized so as to go back and forth between reverberation element 2640 and reverberation element 2640'. Such back-and-forth or oscillation can be performed at a very rapid pace, for example thousands of times a minute. The linear mass 2630 includes both primary permanent magnets 2620 and secondary permanent magnets 2720. Each of the permanent magnets 2620, 2720, have a North and South polarity. The housing 2650 is provided with permanent magnets 2720, 2710, residing in the interior of the housing 2501—so as to oscillate between opposing ends of the housing. The reverberation elements 2640, 2640' can be in the form of a spring and/or elastic material. In operation, the linear mass 2630 approaches the reverberation element 2640 at speed, impacts the reverberation element 260, and is impacted back from the reverberation element 2640 due to the elastic nature of the reverberation element 2640. The reverberation element 2640' is of similar structure and performs in a similar manner.

Figure 26:
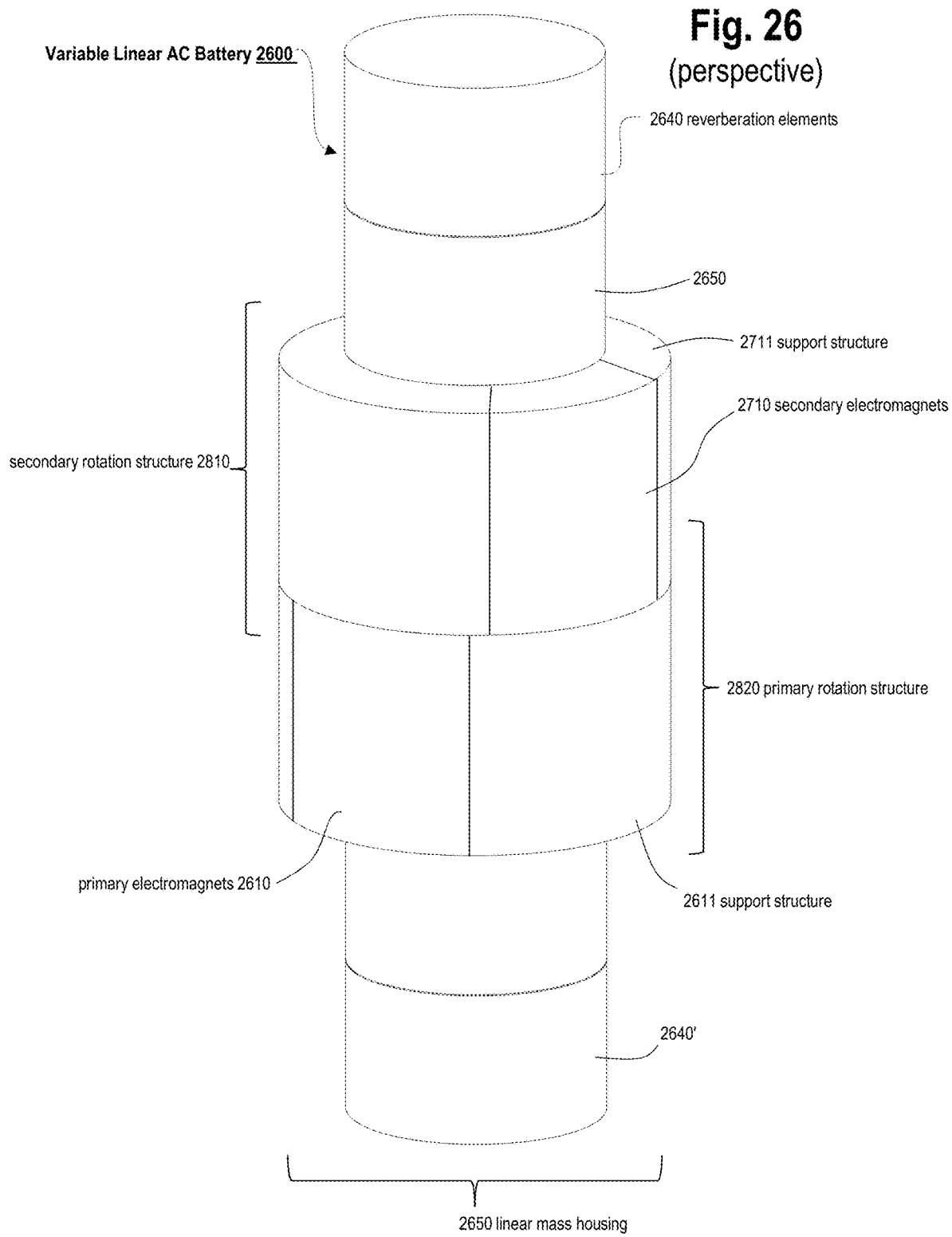
FIG. 26 is a schematic diagram that further illustrates the variable linear AC battery of FIG. 25, in accordance with at least one embodiment of the disclosure.

As shown in FIG. 26, the battery 2600 also includes a secondary electromagnet 2710 and a primary electromagnet 2610. The primary electromagnet 2610 and the secondary electromagnet 2710 are provided so as to be rotatable about an outer periphery of the linear mass housing 2650. FIG. 26 is a perspective view of the variable linear AC battery 2600, in accordance with at least one embodiment of the disclosure. The battery 2600, as is shown in FIG. 26, includes the reverberation elements 2640, 2640'. The battery 2600 also includes a primary rotation structure 2820 and a secondary rotation structure 2810. Each of the primary rotation structure 2820 and a secondary rotation structure 2810 encircles the linear mass housing 2650 and is allowed to rotate about the linear mass housing 2650. More specifically, the primary rotation structure 2820 includes primary electromagnets 2610 that are supported by a support structure 2611. Primary electromagnets 2610 can be provided on both sides of the support structure 2611.

The secondary rotation structure 2810 includes the secondary electromagnets 2710. Secondary electromagnets 2710 can be provided on both sides of the support structure 2711.

In operation, the primary rotation structure 2820 and the secondary rotation structure 2810 can be selectively rotated about the linear mass housing 2650. Depending on the position of the primary electromagnets 2610 relative to the position of secondary electromagnets 2710, a constructive interference scenario may be established as described above, or alternatively, an additive interference scenario may be established as described above, or yet alternatively, somewhere between such two former scenarios, i.e. such that power may be slowly drained from the battery 2600. As a result, the kinetic energy of the linear mass 2630, oscillating within the linear mass housing 2650, can be selectively siphoned or drained from. As current flows from the variable linear AC battery 2600, the speed at which the linear mass 2630 oscillates will decrease due to conservation of energy. A battery is thus provided.

All of the electromagnets described herein may, as desired, be provided or include wires that connect opposite ends of coils that go to make up the electromagnet. For example, the electromagnets described herein may be provided with a positive wire and a negative wire. Such wires may be characterized as constituting input or output wires. Such wires may provide current to a electromagnet so as to generate the electromagnet. Such wires may output current from any electromagnet upon such electromagnet generating the current that flows out the wire. Any arrangement, component, or assembly, and similar structure described herein may be provided with a suitable housing so as to contain or house parts of such arrangement, component, or assembly as described herein. Such parts may be fixed statically to a housing as described herein and as desired. Such parts may be movably disposed to a housing as described herein and as desired.

The systems and methods of the disclosure as described herein provide an alternative to traditional batteries, such as chemical batteries. The disclosure provides a way to effectively store energy in a physical form. The disclosure provides the ability to take high watt input energy and convert such input energy into a mechanical force—before pulling energy off the mechanical force created, at a slower pace than such energy was originally input at. Such is one of the core features of the disclosed technology of this patent application. My specific technology is both the concept of storing energy faster than the energy is utilized in accord with aspects of the disclosure, as well as ways of completing this task (as shown in the attached diagrams). Although I have created many ways to produce my end goal of storing energy faster than I export the energy at, using various structure, each version of the disclosure may include its own unique advantages and drawbacks. A further aspect of the technology, of the disclosure, is the ability to utilize movable magnets to change the magnetic field of an electric motor/generator, and ultimately create a transmission that is able to produce any desired current by either having the movable magnets fight against (or enhance) the strength of the original magnets. A similar technique to having two sets of magnets is to have a single set that is either drawn in or pulled out of a motor structure so as to create a desired electrical output. Applications of this energy storage include vehicles and personal power banks (batteries), as well as a wide variety of other applications.

++

Figure 28:
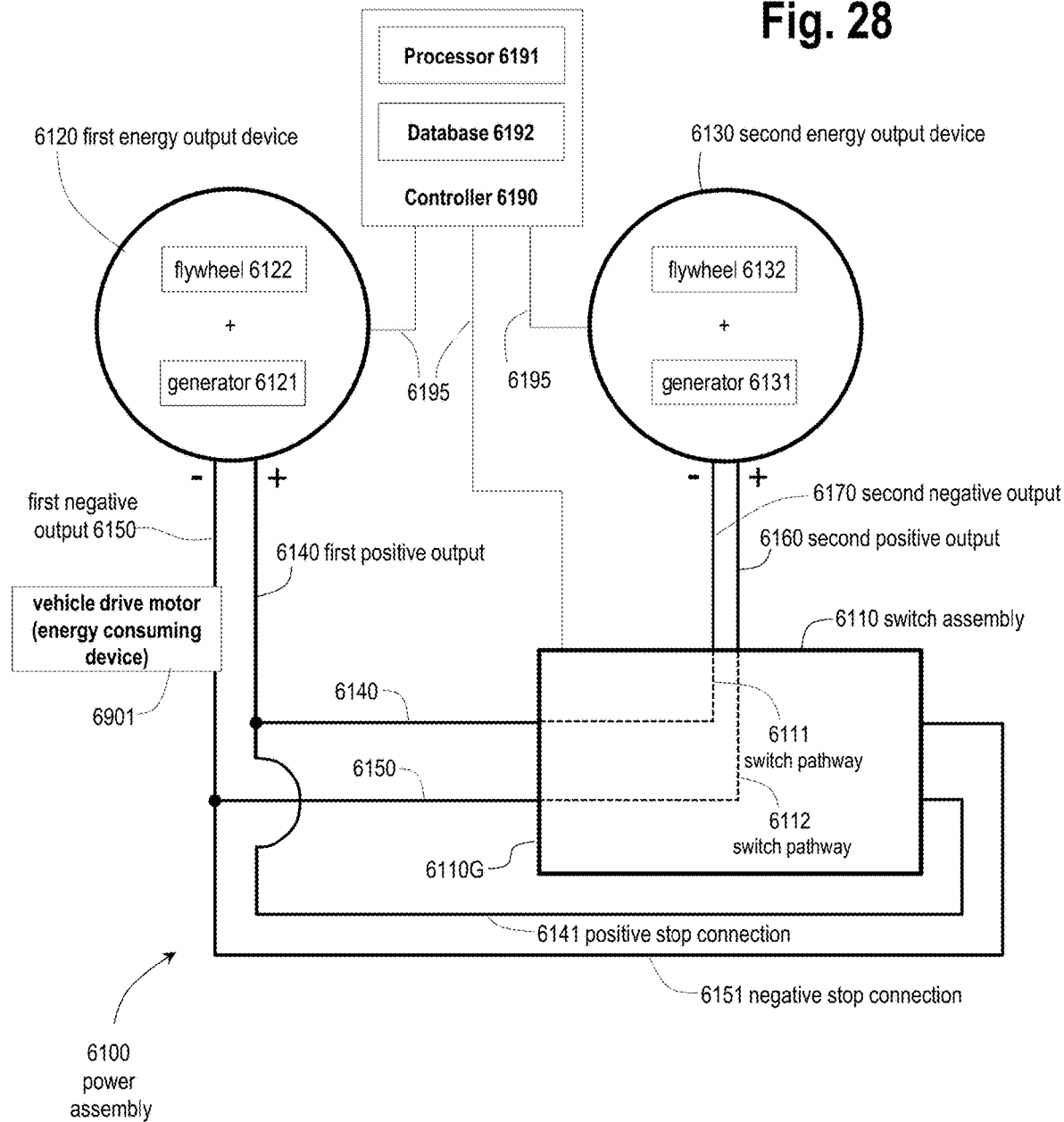
FIG. 28 is a schematic diagram that shows a power assembly in accordance with at least one embodiment of the disclosure.

FIG. 28 is a schematic diagram that shows a power assembly 6100, in accordance with at least one embodiment of the disclosure. The power assembly 6100 can include a first energy output device 6120 and a second energy output device 6130. The first energy output device 6120 can include as a component the motor 10, as shown in FIG. 27, and a flywheel that is connected to the motor 10, as well as sensors according to principles of the disclosure. In such arrangement, the motor 10 can act as a generator that outputs current or energy. That is, the motor/generator 10 can be driven by a connected flywheel so as to output energy. The energy output device 6120 is not limited to including a DC motor that is driven by a flywheel. The energy output device can include a DC motor that is driven by some other energy source. Another energy source might be the energy assembly or potential energy assembly 7900 as illustrated in the schematic diagram of FIG. 38. The energy output device 6120 can include an AC motor driven by a flywheel. The energy output device 6120 can include an AC motor driven by some other energy device, such as the energy assembly 6800 of FIG. 38.

The energy output device 6120 can include a device or system that outputs either direct current (DC) or alternating current (AC), for example. The output of current, i.e. energy, can include the production of energy by passing a first object with kinetic energy passed another stationary object(s) wherein the first object can include an electromagnet and the other stationary object(s) can include a permanent magnet. Such relative movement produces a flow of current within the electromagnet or in other words provides a flow of energy, i.e. a flow of electromotive force (EMF), from the energy output device 6120. The flow of energy can be described as a first negative output 6150 and a first positive output 6140. The power assembly 6100 can also include second energy output device 6130. The second energy output device 6130 can include a generator that is driven by a flywheel or a generator that is driven by some other energy source. The structure of the second energy output device 6130 can be the same as or similar to the structure of the first energy output device 6120. The energy output devices 6120 and 6130 can be driven by different energy sources. The energy output devices 6120 and 6130 can be driven by the same energy source(s). However, as described below, the energy output from the first energy output device 6120 and the energy output from the second energy output device 6130 can be coordinated with respect to each other. The energy output from first energy output device 6120 can be coordinated, with respect to the second energy output device 6130, so as to power an energy consuming device 6901. For example, the energy consuming device 6901 can be the drive motor of a vehicle such as an electric car.

The first energy output device 6120 can be described as a primary EMF output in that such device can selectively output an EMF force. The second energy output device 6130 can be described as a secondary EMF output in that such device can selectively output an EMF force. The first positive output 6140 can be described as a primary positive output 6140. The first negative output 6150 can be described as a primary negative output 6150. The second positive output 6160 can be described as a secondary positive output 6160. The second negative output 6170 can be described as a secondary negative output 6170.

Figure 29:
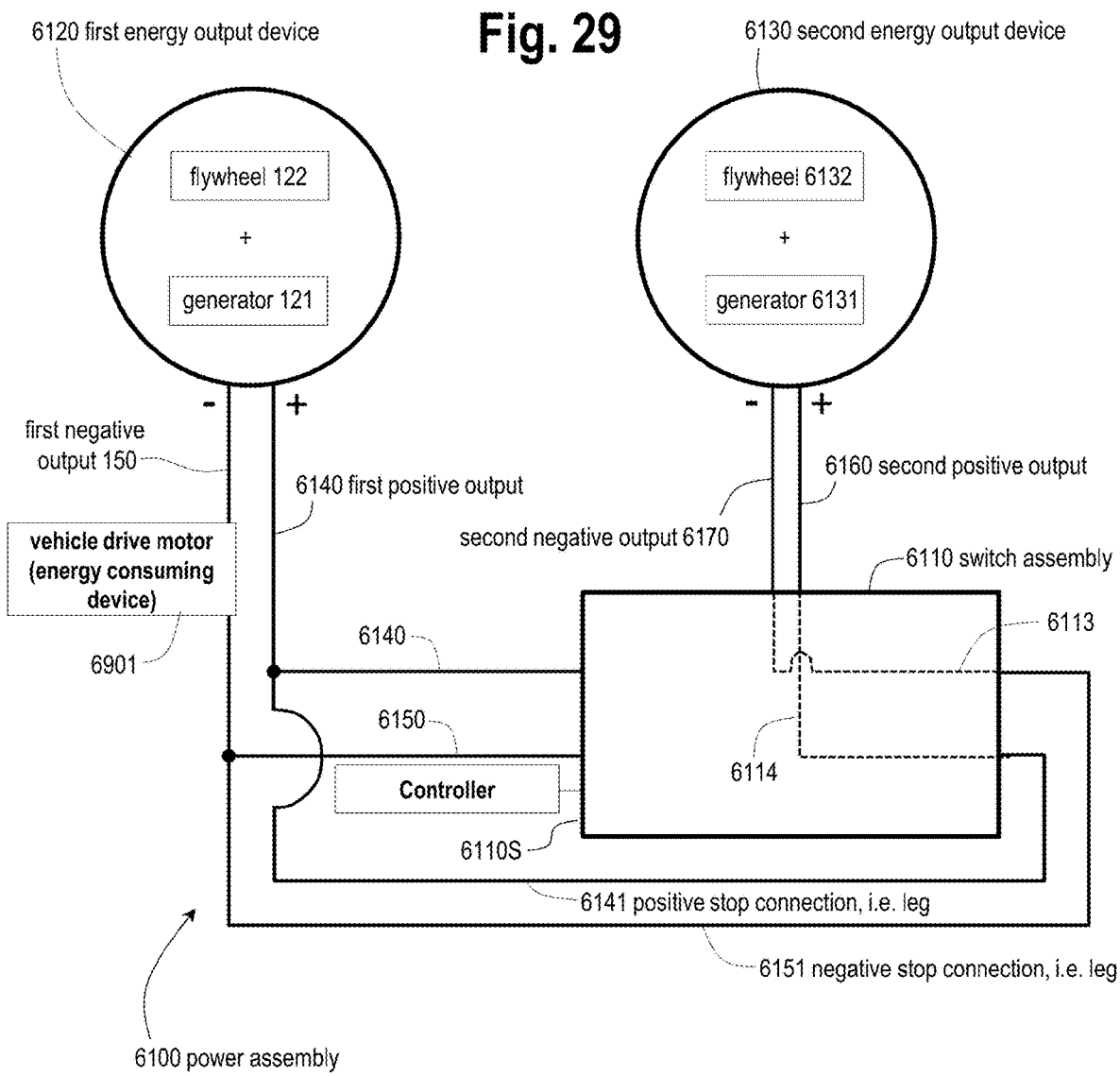
FIG. 29 is a schematic diagram that shows the power assembly of FIG. 28 in a different arrangement in accordance with at least one embodiment of the disclosure.

The power assembly 6100 can include a switch assembly 6110. The switch assembly 6110 can be "switched" between a first arrangement 6110G (FIG. 28) and a second arrangement 6110S, as shown in FIG. 29, i.e. a go and stop arrangement. Relatedly, the power assembly 6100 can include a positive stop connection 6141 and a negative stop connection 6151.

The positive stop connection 6141 forms what can be described as an extension or additional leg of the first positive output 6140. The negative stop connection 6151 forms what can be described as an extension or additional leg of the first negative output 6150. The connections 6141, 6151, in conjunction with the switch assembly 6110, provide a physical arrangement by which the arrangements (6110G and 6110S) can be switched or in other words toggled. More specifically, in the first arrangement 6110G, i.e. "go", the first positive output 6140 is connected to the second negative output 6170 via switch pathway 6111, AND the first negative output 6150 is connected to the second positive output 6160 via switch pathway 6112. In such first arrangement 6110G, a circuit is formed such that electricity can flow through such formed circuit. As a result, the energy consuming device 6901 will be powered. The circuit formed might be described as a serial circuit. The circuit provides for the first energy output device 6120 and the second energy output device 6130 to be connected such that the two energy output devices 6120, 6130 "run with" each other. Accordingly, current flows and the energy consuming device 6901 is powered.

In the second arrangement 6110S, i.e. "stop", the two energy output devices 6120, 6130 do NOT "run with" each other and energy is effectively stopped or substantially stopped. That is, in the second arrangement 110S, the first positive output 6140 is connected to the second positive output 6160 via switch pathway 6113 and via the positive stop connection 6141, AND the first negative output 6150 is connected to the second negative output 6170 via switch pathway 6114 and via negative stop connection 6151. In such second arrangement 6110S, i.e. a "stop" arrangement, the two positive outputs of the first energy output device 6120 and the second energy output device 6130 are abutted against each other. Additionally, the two negative outputs of the first energy output device 6120 and the second energy output device 6130 are abutted against each other. Accordingly, a circuit is NOT formed such that electricity can flow through such formed circuit. As a result, the energy consuming device 6901 will NOT be powered, i.e. since current will not flow. Since current does not flow in the second arrangement 6110S and no energy is being consumed by the energy consuming device 6901, energy will not be pulled or drained from the energy output devices 6120, 6130, for example, the flywheel(s) will not slow down as a result of an energy drain. Such is consistent with conservation of energy.

Accordingly, the arrangements of FIGS. 28 and 29 include the switch assembly 6110 that can be controlled so as to selectively power or not power the energy consuming device 6901. With regard to the power assembly 6100 as described above, the first energy output device 6120 and the second energy output device 6130 could each, respectively, include a flywheel that is connected to a generator. For example, generator/motor could be of construct as shown in FIG. 27. With each of the energy output devices 6120, 6130, the flywheel can be rotating so as to store kinetic energy. The flywheel can be connected to the generator. For example, with reference to the motor/generator 10 of FIG. 27, the flywheel could rotate the shaft 14. As the generator rotates and is driven by the flywheel, the generator will generate electrical output. As such output is generated by the generator 10, the flywheel will decrease in speed. Accordingly, kinetic energy of the flywheel will be converted to electrical output of the generator 10. Accordingly, in the arrangement 6110G, electrical output can be generated by the generator 6121 (as driven by the flywheel 6122) and the generator 6131 (as driven by the flywheel 6132) with a proportional reduction in speed, over time, of the flywheels 6122, 6132. In the arrangement 6110G, the first energy output device 6120 can be described as "running with" the second energy output device 6130. Such is described above. In such an arrangement 6110G, electrical current flows and the energy consuming device 6901 is powered.

However, in the arrangement of FIG. 29, the first energy output device 6120 can be described as "running against" the second energy output device 6130. In such arrangement, current, i.e. electrical power, does not flow since the first positive output 6140 is effectively "counter" or "balanced" against the second positive output 6160. Since there is not energy flow in the arrangement 6110S, the energy consuming device 6901 will not be powered. Relatedly, since there is not energy being consumed and there is not energy being generated by the generators 6121, 6131, the flywheels 6122, 6132 will not experience a decrease in kinetic energy. In other words, the flywheels 6122, 6132 will not slow down.

Accordingly, in the power assembly 6100, the switch assembly 6110 can be manipulated between the arrangement 6110G and the arrangement 6110S so as to provide energy to the energy consuming device 6901 or not provide energy to the energy consuming device 6901. In other words, the switch assembly 6110 can be manipulated so as to change the pathways of electrical communication so as to render either the arrangement 6110G or the arrangement 6110S.

Hereinafter, additional aspects of the power assembly 6100 will be described.

As described above, the switch assembly 6110 can be manipulated so as to control whether the switch is on or off, i.e. whether the energy consuming device does get electrical power or whether the energy consuming device does not get electrical power. Such description conveys an ideal situation in which the first positive output 6140 is exactly balanced against the second positive output 6160. In real-world practice, such ideal situation may not be present. Illustratively, a situation of the first positive output 6140 is slightly different than the second positive output 6160, then current will flow to the extent of the imbalance between the outputs 6140, 6160. Indeed, in arrangements, it is indeed such an imbalance that can provide a spectrum of energy output.

With regard to a further aspect of the power assembly 6100, each of the energy output devices 6120, 6130 can be constructed so as to generate DC power. In such arrangement, polarity of the output current will flip-flop back-and-forth from positive to negative. Accordingly, it may be needed or desired to synchronize the first energy output device 6120 with the second energy output device 6130. Such synchronization can include ensuring that the energy output device 6120 is running at the same rate of flip, i.e. running at the same frequency, as the energy output device 6130. Such synchronization can include ensuring that the energy output device 6120 is in "synch" with the energy output device 6130.

A controller 6190 can be a component of the power assembly 6100 or can be connected to the power assembly 6100. The controller 6190 can control the various operations of the power assembly 6100. The controller 6190 can include a processor 6191 or multiple processors. The controller 6190 can include a database 6192 or multiple databases. The controller 6190 can control any of the operations described herein. Any of the power assemblies described herein can be provided to control operations of the particular power assembly. The database can include instructions and data so as to provide for operation as described herein.

With regard to a further aspect of the power assembly 6100, each of the energy output devices 6120, 6130 can be constructed so as to generate AC power. In such arrangement, polarity of the output current will not fluctuate back and forth from positive to negative. Accordingly, it may not be needed or desired to synchronize the timing of the first energy output device 6120 with the timing of the second energy output device 6130, i.e., since polarity of each energy output device will remain constant.

The first energy output device 6120 can be described as a first EMF generation system 6120. The second energy output device 6130 can be described as a second EMF generation system 6130. Each of the first EMF generation system 6120 and the second EMF generation system 6130 can generate or output an electromotive force (EMF). The output devices 120, 130 can be synchronized with each other with regard to rotation and spatial relationship between interior permanent magnets and electromagnets. Accordingly, the output devices 120:30 can be synchronized so as to switch polarities in sync with each other and to provide energy fluctuating back and forth, positive to negative, at the same pace. For example, the output device 6120 and the output device 6130 might be connected together via a common driveshaft.

Figure 30:
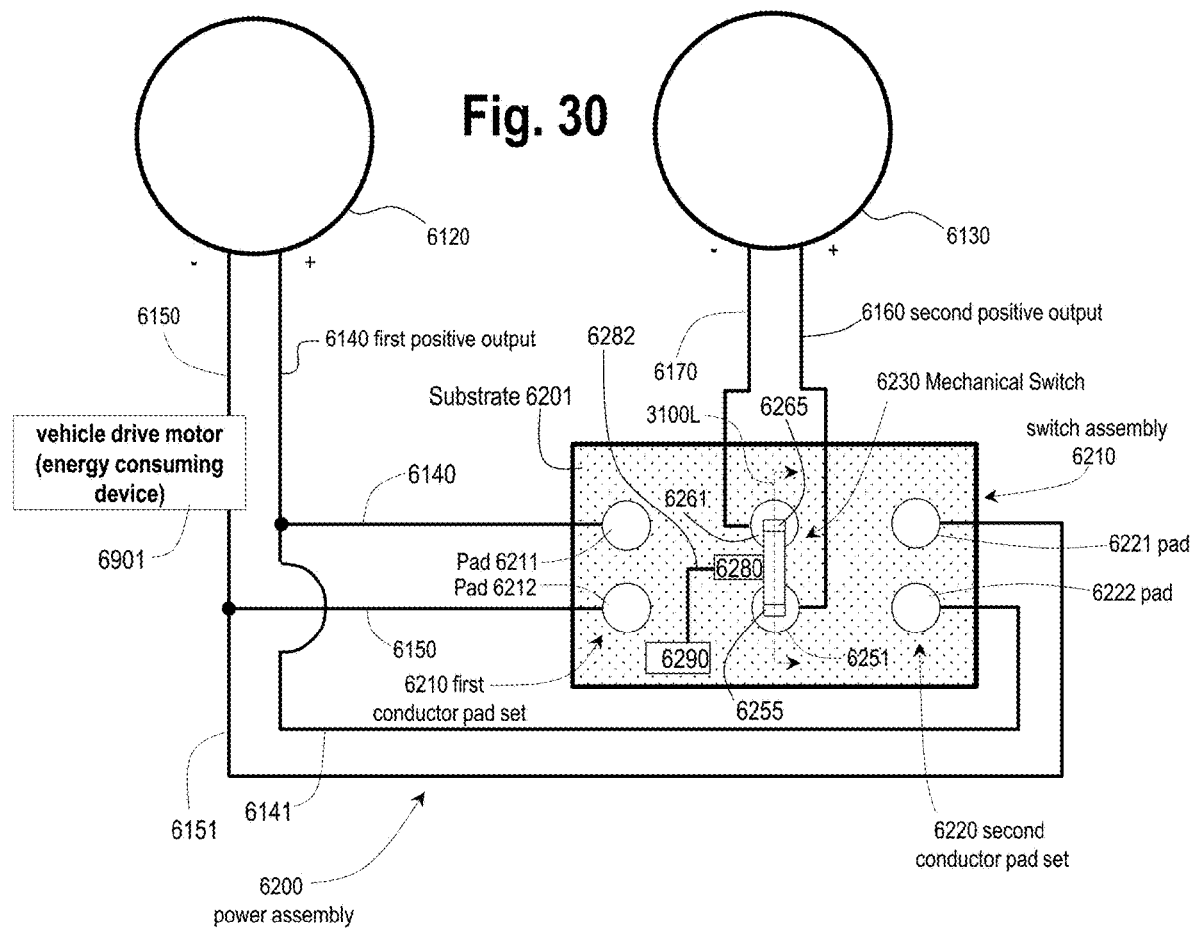
FIG. 30 is a schematic diagram of a power assembly in accordance with at least one embodiment of the disclosure.

FIG. 30 is a schematic diagram of a power assembly 6200 in accordance with at least one embodiment of the disclosure. The power assembly 6200 can include a first EMF generation system 6120 and a second EMF generation system 6130 in similar or same manner as the power assembly 6100 described above.

The power assembly 6200 can also include a first positive output 6140, a first negative output 6150, a second positive output 6160, and a second negative output 6170, similar to those depicted in FIGS. 28 and 29.

As shown in FIG. 30, the power assembly 6200 can include switch assembly 6210. The switch assembly 6210 provides a mechanical arrangement that provides the functionality described above with respect to FIG. 29 and FIG. 28. Specifically, the switch assembly 6210 provides a mechanical arrangement that can perform the switching between arrangement 6110G in which current flows (so as to power the energy consuming device 6901) and arrangement 6110S in which current does not flow and the kinetic energy or other stored energy in the first energy output device 6120 and the second energy output device 6130 is conserved. Such conservation can include a flywheel spinning effectively in a "coast" state.

Figure 31:
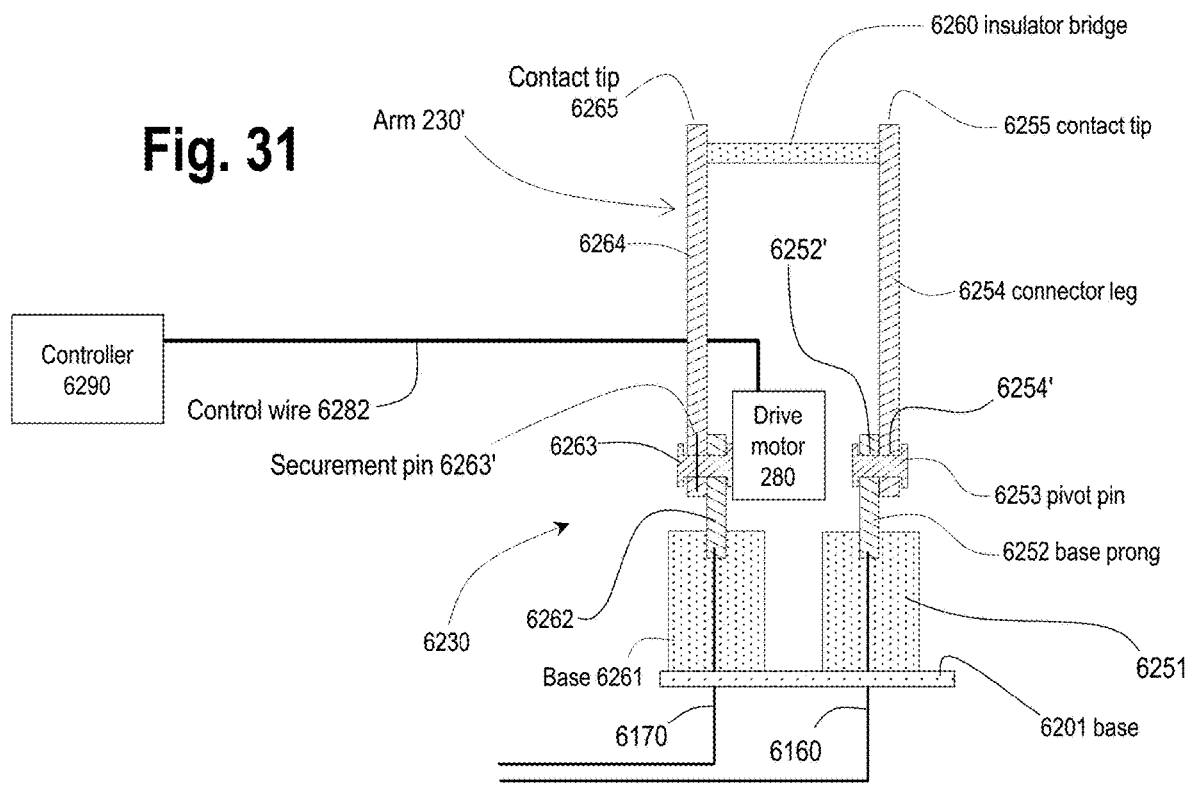
FIG. 31 is a schematic cross-sectional diagram of the mechanical switch of FIG. 30, in accordance with at least one embodiment of the disclosure.

With reference to FIG. 30, the switch assembly 6210 can include a mechanical switch 6230. FIG. 31 is a schematic cross-sectional diagram along line 3100L of the mechanical switch 6230. The mechanical switch 6230 includes a base 6251 and a base 6261 and an arm 6230'. Each of the base 6251 and the base 6261 can be mounted on a suitable substrate 6201. The switch assembly 6210 can include a substrate 6201 as is also shown in FIG. 30. Each of the base 6251 and the base 6261 can be constructed of electrically nonconductive or insulating material. As shown in FIG. 31, the base 6251 houses the second positive output 6160. The substrate 6201 can also be constructed of electrically nonconductive or insulating material. The substrate 6201 might be constructed of plastic or polycarbonate, for example.

The second positive output 6160 can be in the form of a wire, conduit, or other conductive material. The base 6251 also houses or supports a base prong 6252. The base prong 6252 can be embedded or molded within the base 6251. The second positive output 6160 can extend through the base 6251 so as to attach or connect to the base prong 6252. The second positive output 6160 can also be embedded or molded within the base 6251. For example, the base prong 6252 can extend vertically upwardly from the base 6251. The base prong 6252 can include an aperture 6252' that supports a pivot pin 6253. The pivot pin 6253 can pass through the aperture 6252' of the base prong 6252. The pivot pin 6253 and the base prong 6252 can pivotally support a connector leg 6254. The connector leg 6254 can include an aperture 6254'. The pivot pin 6253 can also pass through the aperture 6254'. Accordingly, via the pivot pin 6253, the connector leg 6254 can be rotatably or pivotally or pivotably attached upon the base prong 6252. A distal end 6255 of the connector leg 6264 can include a contact tip 6255. Connector leg 6254 and the base prong 6252 can be constructed of conductive material, such as metal. The base prong 6252 can be in conductive contact with the connector leg 6254 and/or the pivot pin 6253 can be constructed of conductive material such as metal. Accordingly, electricity or current can flow from the contact tip 6255, through the connector leg 6254, to the base prong 6252, and to the second positive output 6160. The arm 6230' can this include the connector leg 6254 and the connector leg 6264.

The mechanical switch 6230 can also include a base 6261. The base 6261 can house the second negative output 6170, which can be in the form of a wire, conduit, or other conductive material. The base 6261 can also house or support a base prong 6262. The base prong 6262 can be embedded or molded within the base 6261. The second negative output 6170 can extend through the base 6261 so as to attach or connect to the base prong 6262. The second negative output 6170 can also be embedded or molded within the base 6261. For example, the base prong 6262 can extend vertically upwardly from the base 6261.

The base prong 6262 can include an aperture 6262' that supports a pivot pin 6263. The pivot pin 6263 can pass through the aperture 6252' of the base prong 6262. The pivot pin 6263, in similar manner to the pivot pin 6253, can rotatably or pivotally support a connector leg 6264.

Accordingly, via the pivot pin 6263, the connector leg 6264 can be rotatably or pivotally or pivotably attached upon the base prong 6262. A distal end 6265 of the connector leg 6264 can include a contact tip 6265. Connector leg 6264 and the base prong 652 can be constructed of conductive material, such as metal. The base prong 6262 can be in conductive contact with the connector leg 6264 and/or the pivot pin 6263 can be constructed of conductive material such as metal. Accordingly, electricity or current can flow from the contact tip 6265, through the connector leg 6264, to the base prong 6262, and to the second negative output 6170.

The mechanical switch 6230 also includes an insulator bridge 6260. The insulator bridge 6260 can be constructed of nonconductive or insulating material. The insulator bridge 6260 can bridge or span between the connector leg 6254 and the connector leg 6264. For example, the insulator bridge 6260 can be connected at or near the contact tip 6255 and the contact tip 6265. The insulator bridge 6260 can provide structural support to the mechanical switch 6230 and can maintain spatial distance or spacing between the contact tip 6255 and the contact tip 6265. In both FIG. 30 and FIG. 31, the mechanical switch 6230 is shown in a vertical or upright disposition. In such disposition, the second negative output 6170 and the second positive output 6160 are each, respectively, in a disconnected state.

With further reference to FIG. 30, the switch assembly 6210 can include a first conductor pad set 6210. The first conductor pad set 6210 can include a pad 6211 and a pad 6212. The pad 6211 can be connected to the first positive output 6140. The pad 6212 can be connected to the first negative output 6150. Additionally, the switch assembly 6210 can include a second conductor pad set 6220. The second conductor pad set 6220 can include a pad 6221 and a pad 6222. The pad 6222 can be connected to the first positive output 6140. The pad 6221 can be connected to the first negative output 6150.

From the vertical position illustrated in both FIG. 30 and FIG. 31, the mechanical switch 6230 can be rotated, about the pivot pin 6253 and the pivot pin 6263. As shown in FIG. 30, the mechanical switch 6230 can be rotated (to the left) such that contact tip 6265 makes contact with the pad 6211. In conjunction, the contact tip 6255 makes contact with the pad 6212. In such arrangement, the first negative output 6150 is connected to the second positive output 6160.

Additionally, the first positive output 6140 is connected to the second negative output 6170.

Accordingly, such disposition of the mechanical switch 6230 provides the 6110G arrangement as shown in FIG. 28. In such arrangement, electricity or current can flow as discussed above. Specifically, current can flow so as to power and energy consuming device 6901.

Alternatively, the mechanical switch 6230, as shown in FIG. 30, can be rotated (to the right) such that the contact tip 6265 makes contact with the pad 6221. In conjunction, the contact tip 6255 makes contact with the pad 6222. In such arrangement, the first negative output 6150 is connected to the second negative output 6170. Additionally, the first positive output 6140 is connected to the second positive output 6160. Accordingly, such disposition of the mechanical switch to 30 provides the 6110S arrangement as shown in FIG. 29. In such arrangement, electricity or current does not flow as discussed above. Accordingly, the energy consuming device 901 will not be powered.

The mechanical switch 6230 as illustrated can be switched back and forth by putting physical pressure on the mechanical switch 6230. For example, a user might put physical pressure on the insulator bridge 6260 so as to rotate the switch between making contact with the pads 6211, 6212 and making contact with the pads 6221, 6222. However, in other embodiments, such "switching" of the mechanical switch 6230 might be motorized in some manner and controlled by a controller 6290. The controller 6290 can include one or more processors and one or more databases. For example, a drive motor 6280 (connected to the controller 6290 via control wire 6282) with gear arrangement might drive, under control of the controller 6290, the connector legs 6254, 6264 about the base prongs 6252, 6262 so as to motorized or mechanize the mechanical switch 6230. A securement pin 6263' can be used to secure the connector leg 6264 with the pivot pin 6263 so as to prevent relative rotation therebetween.

With such mechanization, the switchover can be very quick in time. Other mechanical arrangements can be utilized so as to physically rotate the connector legs 6254, 6264 between the 6110S arrangement and the 6110G arrangement. Additionally, it should be appreciated that the switch assembly 6210 and the mechanical switch 6230 can be of a wide variance in size depending on the particular use intended for the power assembly.

To describe further with reference to FIGS. 30 and 31, the power assembly 6200 can include a primary or first conductor pad set 6210 that terminates cable ends of outputs 6140 and 6150 respectively, as well as a secondary or second conductor pad set 6220 that terminates cable ends of output 6140 and 6150 respectively. The first negative output 6150 can include connector leg 6151 that provides a connection to pad 6221. The first positive output 6140 can include a connector leg 6141 the provides a connection to pad 6222.

Figure 32:
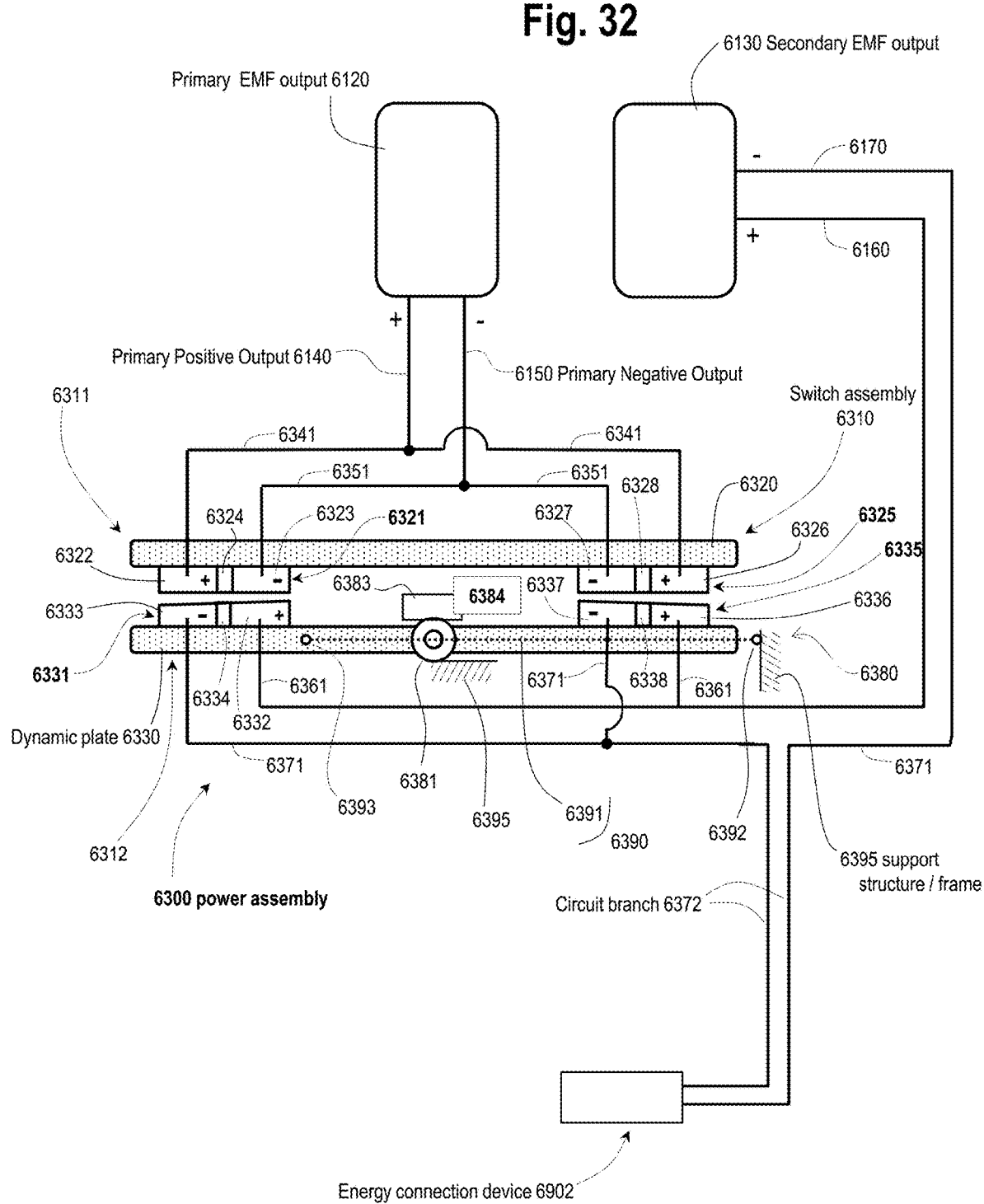
FIG. 32 is a schematic diagram that illustrates a further power assembly, in accordance with at least one embodiment of the disclosure.

The power assembly 6200 can include the mechanical switch 6230 that terminates the cable ends of outputs 6160 and 6170. The mechanical switch 6230 can be comprised of conductive sides, and a nonconductive top. The mechanical switch 6230 can be toggled from side to side, to utilize the conductive sides, to form a circuit. This circuit can include outputs 6160 and 6170, as well as either terminating end of 6140 and 6150. In particular, this circuit can include outputs 6160 and 6170, as well as either the first conductor pad set 6210 or the second conductor pad set 6220. FIG. 32 is a schematic diagram that illustrates a further power assembly 6300, in accordance with at least one embodiment of the disclosure.

The power assembly 6300 can include a primary EMF output 6120 and a secondary EMF output 6130 similar or the same as those depicted in other FIGS. 28 and 30 and described above. For example, the primary EMF output 6120 can include a flywheel attached to a generator. The secondary EMF output 6130 can include a flywheel attached to a generator. The power assembly 6300 can include a switch assembly 6310.

The primary EMF output 6120 can include or be connected to a primary positive output 6140 and a primary negative output 6150. The secondary EMF output 6130 can include or be connected to a secondary positive output 6160 and a secondary negative output 6170.

The primary positive output 6140 can include a plurality of legs or portions 6341 that provide conductive pathways to different components or different parts of components.

The primary negative output 6150 can include a plurality of legs or portions 6351 that provide conductive pathways to different components or different parts of components.

The secondary positive output 6160 can include a plurality of legs or portions 6361 that provide conductive pathways to different components or different parts of components.

The secondary negative output 6170 can include a plurality of legs or portions 6371 that provide conductive pathways to different components or different parts of components.

The switch assembly 6310 can provide functionality related to the functionality provided by the switch assembly 6110 as described above. That is, the switch assembly 6310 can vary the connective interrelationship of the primary EMF output 6120, the secondary EMF output 6130, and an energy connection device 6905. The energy connection device 6905 can be connected to the secondary negative output 6170 so as to be in a circuit with the secondary negative output 6170. Such connection can be provided by legs or portions 6371 and circuit branch 6372. Hereinafter, further details of the switch assembly 6310 will be described.

The switch assembly 6310 can include a static plate 6320 and a dynamic plate 6330. As described below, the static plate 6320 and the dynamic plate 6330 can be movable relative to each other so as to vary the connective disposition of the primary EMF output 6120, the secondary EMF output 6130, and the energy connection device 6905.

To explain further, a go pad set 6321 can be mounted on the static plate 6320. The go pad set 6321 can include positive pad 6322 and negative pad 6323. An insulator portion, band, or layer 6324 can be provided between the positive pad 6322 and the negative pad 6323 so as to provide insulation therebetween, i.e. so as to prevent conduction of electricity between the positive pad 6322 and the negative pad 6323. The positive pad 6322 can be connected to the primary positive output 6140. The negative pad 6323 can be connected to the primary negative output 6150.

A go pad set 6331 can be mounted on the dynamic plate 6330. The go pad set 6331 can include positive pad 6332 and negative pad 6333. An insulator portion, band, or layer 6334 can be provided between the positive pad 6332 and the negative pad 6333 so as to provide insulation therebetween, i.e. so as to prevent conduction of electricity between the positive pad 6332 and the negative pad 6333. The positive pad 6332 can be connected to the secondary positive output 6160. The negative pad 6333 can be connected to the secondary negative output 6170.

A stop pad set 6325 can be mounted on the static plate 6320. The stop pad set 6325 can include positive pad 6326 and negative pad 6327. An insulator portion, band, or layer 6328 can be provided between the positive pad 6326 and the negative pad 6327 so as to provide insulation therebetween, i.e. so as to prevent conduction of electricity between the positive pad 6326 and the negative pad 6327. The positive pad 6326 can be connected to the primary positive output 6140. The negative pad 6327 can be connected to the primary negative output 6150.

A stop pad set 6335 can be mounted on the dynamic plate 6330. The stop pad set 6335 can include positive pad 6336 and negative pad 6337. An insulator portion, band, or layer 6338 can be provided between the positive pad 6336 and the negative pad 6337 so as to provide insulation therebetween, i.e. so as to prevent conduction of electricity between the positive pad 6336 and the negative pad 6337. The positive pad 6336 can be connected to the secondary positive output 6160. The negative pad 6337 can be connected to the secondary negative output 6170 via the circuit branch 6372 and the energy connection device 6902.

The switch assembly 6310 can include a pivot assembly 6380. The pivot assembly 6380 can support the dynamic plate 6330. The pivot assembly 6380 can include a pivot pin assembly 6381 and cable assembly 6390. The assemblies 6380, 6390 can serve to rotatably support the dynamic plate 6330 and control rotation of the dynamic plate 6330 so as to selectively contact the go pad set 6321 with the go pad set 6331, or alternatively, contact the stop pad set 6325 with the stop pad set 6335. In other words, the dynamic plate 6330 can be rotated by the pivot assembly 6380 so as to toggle between a go disposition wherein electrical energy is provided to the energy connection device 6902 (in a go disposition) OR electrical energy is not provided to the energy connection device 6902 (in a stop disposition).

The pivot pin assembly 6381 can include pivot pin 6382. The pivot pin 6382 can rotatably support the pivot pin assembly 6381 with the dynamic plate 6330 so as to control rotation of the dynamic plate 6330. The pivot pin assembly 6381 can include a drive motor 6383 or other drive device 6383. For example, the dynamic plate 6330 can include a driven gear and the drive motor 6383 include a driving gear. The driving gear of the motor can drive the driven gear of the dynamic plate so as to control rotation of the dynamic plate 6330. Accordingly, such arrangement can control whether the go pad sets 6321, 6331 are connected or alternatively whether the stop pad sets 6325, 6335 are connected. The pivot pin assembly can be affixed to and supported by a support structure 6395. Thus, the dynamic plate 6330 can be rotatably supported on the support structure 6395. The drive motor or other drive device 6383 can be controlled by a suitable controller 6384.

The pivot assembly 6380 can also include a tension cable assembly 6390. The tension cable assembly 6390 can include a tension cable 6391. The tension cable 6391 can be an elastic cable such as a rubber band, or elastomeric band. The tension cable 6391 can be a metal or steel cable that is fitted with one or more springs so as to render the tension cable 6391 elastic. The tension cable 6391 can elastically extend between a static cable attachment 6392 and a dynamic cable attachment 6393. The static cable attachment 6392 can be affixed to the support structure 6395 of the switch assembly 6310. The dynamic cable attachment 6393 can be attached to the dynamic plate 6330 such that the pivot pin 6382 is positioned between the dynamic cable attachment 6393 and the static cable attachment 6392. Such arrangement is shown in FIG. 32 and FIG. 33.

The tension cable assembly 6390 can provide functionality so as to "snap" the dynamic plate 6330 between (1) a "go" arrangement in which the go pad sets 6321, 6331 are connected, i.e., with the stop pad sets 6325, 6335 disconnected, and (2) a "stop" arrangement in which the stop pad sets 6325, 6335 are connected, i.e., with the go pad sets 6321, 6331 disconnected. As shown in FIG. 33, the go pad sets 6321, 6331 are connected. Accordingly, the electrical pathways in the power assembly 6200 can be shifted.

Figure 33:
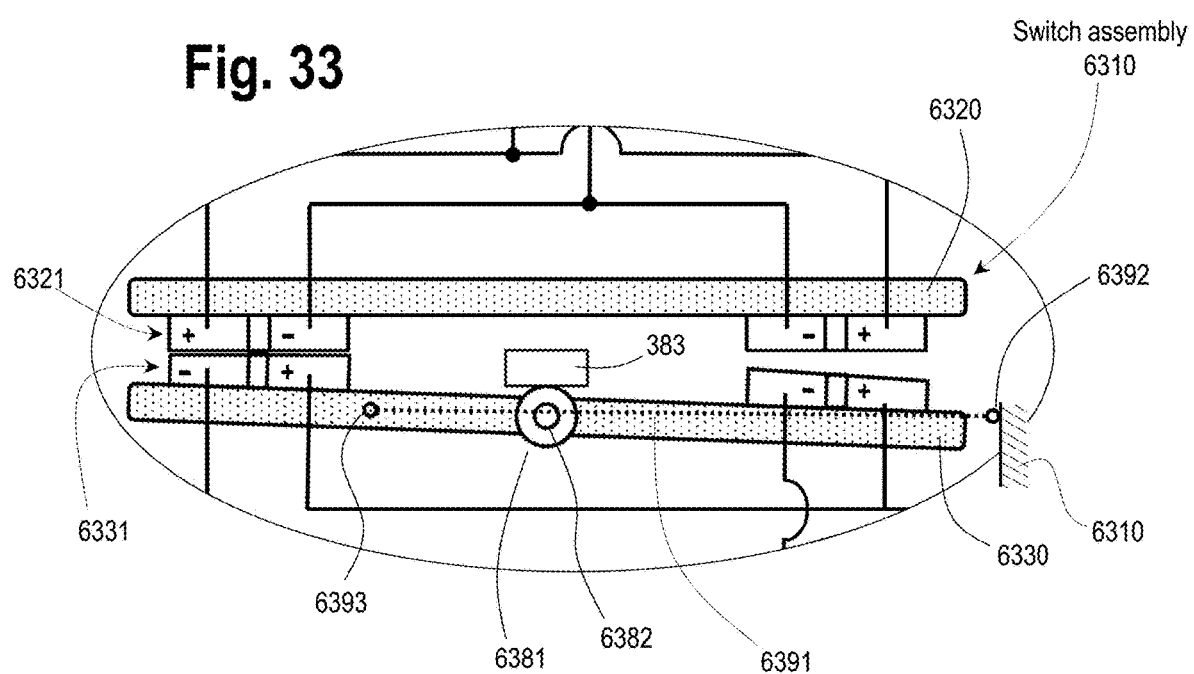
FIG. 33 is a schematic partial view of the power assembly of FIG. 32, in accordance with at least one embodiment of the disclosure.

As shown in FIG. 33, the pivot pin 6382 is positioned below the tension cable 6391. On the other hand, when the stop pads 6325, 6335 are connected, the pivot pin 6382 is positioned above the tension cable 6391. Both of such interrelationships are provided by design by the geometry of the switch assembly 6310. FIG. 32 shows an interim position or switchover position in which the stop pads 6325, 6335 are not connected and the go pads 6321, 6331 are not connected. As the dynamic plate 6330 is in the position shown in FIG. 32, the tension cable 6391 will be centered over or substantially centered over the pivot pin 6382. However, in the position shown in FIG. 32, the dynamic plate 6330 will effectively be in an un-stable position. From such unstable position shown in FIG. 32, due to the arrangement with the tension cable 6391, the dynamic plate 6330 will want to "snap" to an off-center position. That is, the dynamic plate 6330 will be biased toward either the position shown in FIG. 33, or in a position with the stop pad sets 6325, 6335 connected. In other words, the dynamic plate 6330 will be elastically biased toward either the "go" position of FIG. 33 or a "stop" position. The degree or amount of biasing can be varied in design by varying the elastic force exerted by the tension cable 6391 and the position of the dynamic cable attachment 6393, with slight gravitational forces being taken into account depending on any imbalances of the assembly site aside.

Accordingly, such biasing in conjunction with operation of the drive motor 6383 or other drive device can provide an effective arrangement so as to toggle the switch assembly 6310 between the go position and the stop position. Such toggling between the go position and the stop position can be performed very quickly by operation of the drive motor 6383 as controlled by the controller 6384.

To explain further and in other words, the dynamic cable attachment 6393 will travel in an arc about the pivot pin 6382. At the position shown in FIG. 32, the dynamic cable attachment 6393 will be at a point further from the static cable attachment 6392 as compared to when the dynamic plate 6330 is rotated either the go position or the stop position. Accordingly, in the position of FIG. 32, the tension cable 6391 will be at a higher state of potential energy as compared to when the dynamic plate 6330 is rotated either to the go position or the stop position. Accordingly, the tension cable 6391 will tend to pull the tension cable 6391 "off-center" of the pivot pin 6382 so as to decrease the potential energy present in the system. It is this relationship and dynamic that will tend to "snap" the dynamic plate 6330 to either the go position or the snap position.

The static plate 6320 can be constructed of insulating or nonconductive material and can be provided with respective holes or apertures for the legs 6341 to pass therethrough—to connect with each leg's corresponding pad. The static plate 6320 can be constructed of insulating or nonconductive material and can be provided with respective holes or apertures for the legs 6351 to pass therethrough—to connect with each leg's corresponding pad.

The dynamic plate 6330 can be constructed of insulating or nonconductive material and can be provided with respective holes or apertures for the legs 6371 to pass therethrough—to connect with each leg's corresponding pad. The dynamic plate 6330 can be constructed of insulating or nonconductive material and can be provided with respective holes or apertures for the legs 6361 to pass therethrough—to connect with each leg's corresponding pad.

The legs 6361 (of the secondary positive output 6160) and the legs 6371) of the secondary negative output 6170) can be constructed of flexible wires or flexible cables or other flexible conduit so as to allow needed rotation of the dynamic plate 6330.

In the arrangement of FIG. 32, the switch assembly 6310 can be described as including a first plate assembly 6311 and a second plate assembly 6312. The first plate assembly 6311 can include the static plate 6320, the go pad set 6321, and the stop pad set 6325. The second plate assembly 6312 can include the dynamic plate 6330, the go pad set 6331 and the stop pad set 6335.

As illustrated in FIG. 32, the wiring or circuit of the power assembly 6200 can include the energy connection device 6902. Related to the disclosure provided above, when the go pad set 6321 is connected to the go pad set 6331, electrical energy will be "pulled" from the EMF output 6120 and the EMF output 6130. However, when the stop pad set 6325 is connected to the stop pad set 6335, the primary EMF output 6120 will be opposed to or "fight against" the secondary EMF output 6130. As result, electrical energy will not be pulled from the EMF outputs 6120, 6130. That is, the EMF forces of the EMF outputs 6120, 6130 will oppose or balance each other so that no electrical energy will be output. Relatedly, in the case that the EMF outputs 6120, 6130 include a flywheel, the flywheel will continue to rotate without a degradation in speed due to no output electrical energy. It is of course appreciated that some degradation in speed may result from frictional forces, for example.

The energy connection device 6902 can be an energy consuming device such as a vehicle drive motor. The energy connection device 6902 can be a plug or other connection device that can provide electrical connection to any of a variety of electrical devices as may be desired.

Figure 34:
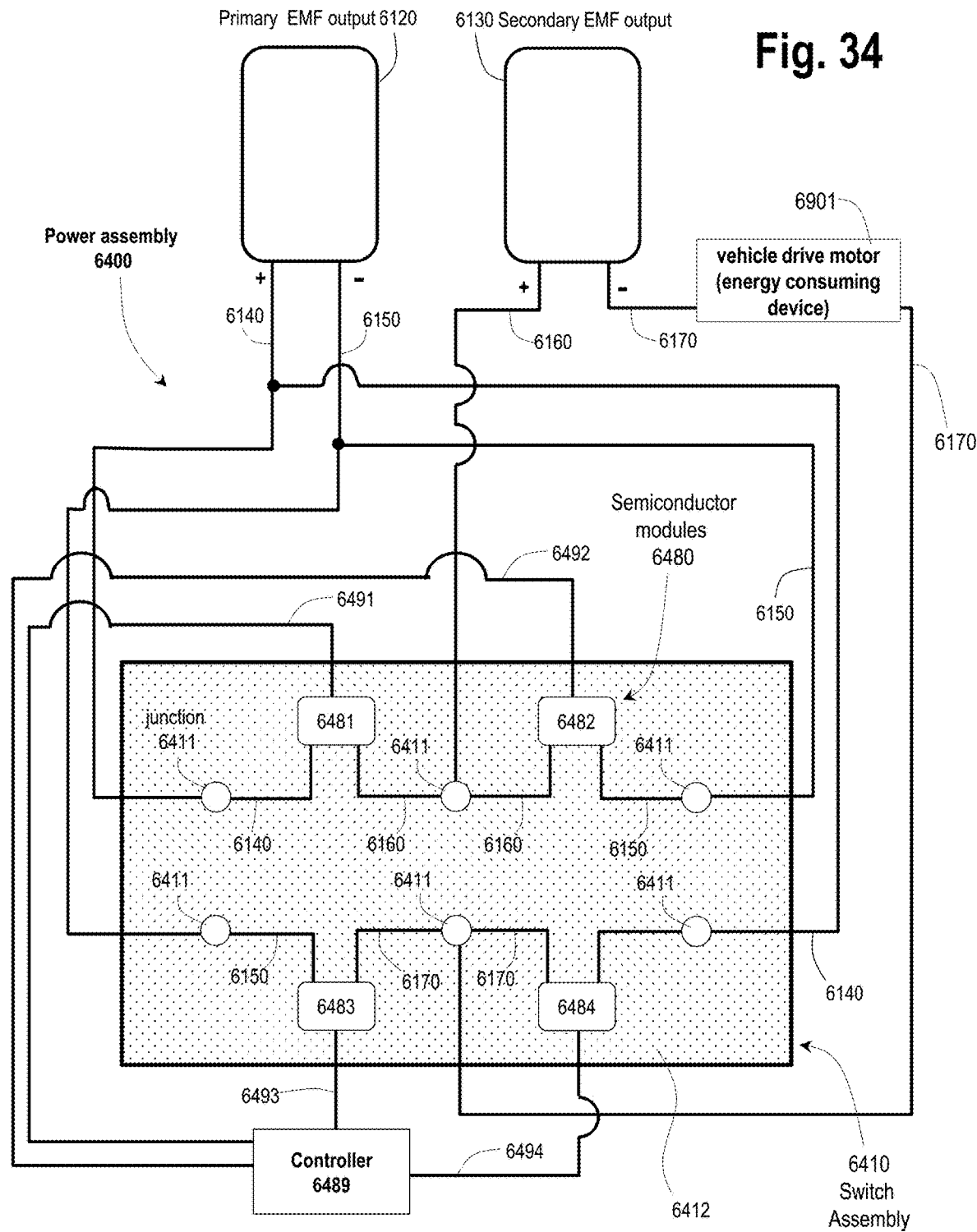
FIG. 34 is a schematic diagram that illustrates a further power assembly, in accordance with at least one embodiment of the disclosure.

FIG. 34 is a schematic diagram that illustrates a further power assembly 6400, in accordance with at least one embodiment of the disclosure.

The power assembly 6400 can include a primary EMF output 6120 and a secondary EMF output 6130 similar or the same as those depicted in other FIGS. 28 and 30 and described above. For example, the primary EMF output 6120 can include a flywheel attached to a generator. The secondary EMF output 6130 can include a flywheel attached to a generator. The power assembly 6400 can include a switch assembly 6410.

The primary EMF output 6120 can include or be connected to a primary positive output 6140 and a primary negative output 6150. The secondary EMF output 6130 can include or be connected to a secondary positive output 6160 and a secondary negative output 6170.

The primary positive output 6140 can include a plurality of legs or portions that provide conductive pathways to different components or different parts of components. The primary negative output 6150 can include a plurality of legs or portions that provide conductive pathways to different components or different parts of components. The secondary positive output 6160 can include a plurality of legs or portions that provide conductive pathways to different components or different parts of components. The secondary negative output 6170 can include a plurality of legs or portions that provide conductive pathways to different components or different parts of components.

The switch assembly 6410 can provide functionality related to the functionality provided by the switch assembly 6110 as described above. That is, the switch assembly 6410 can vary the connective interrelationship of the primary EMF output 6120, the secondary EMF output 6130, and an energy connection device 6902. The energy connection device 6902 can be connected to the secondary negative output 6170 so as to be in a circuit with the secondary negative output 6170.

Hereinafter, further details of the switch assembly 310 will be described.

The switch assembly 6410 can include a plurality of semiconductor modules. The semiconductor modules can include module 6481, module 6482, module 6483, in module 6484. Each of such modules can be connected to a controller 6489. The modules can perform functionality related to the functionality provided by the switch assembly 6310 of FIG. 32. The modules can perform functionality related to the functionality provided by the switch assembly 6210 of FIG. 30. The modules 6481, 6482, 6483, 6484 can be in the form of a solid-state relay. The modules 6481, 6482, 6483, 6484 can include any known technology that provides the functionality that the material can be energized so as to render the material conductive. Alternatively, if the material is not energized, then the material will not be conductive. Accordingly, through energization or non-energization of the modules 6481, 6482, 6483, 6484—the controller 6489 can control which modules are on or off. In other words, the controller 6489 can control which modules are enabled or disabled so as to conduct electricity.

The controller 6489 can control the module 6481 via wires 6491, which can be in the form of a plurality of control wires. The controller 6489 can control the module 6482 via wires 6492, which can be in the form of a plurality of control wires. The controller 6489 can control the module 6483 via wires 6493, which can be in the form of a plurality of control wires. The controller 6489 can control the module 6484 via wires 6494, which can be in the form of a plurality of control wires. In accordance with at least some embodiments of the disclosure, the modules 6481, 6482, 6483, 6484 might alternatively be in the form of mechanical switches that the controller 6489 is able to turn on or off.

In operation of the power assembly 3400, the primary EMF output 6120 and the secondary EMF output 6130 can power the energy consuming device 6901, as shown in FIG. 34.

In operation, the controller 6489 can switch the module 6481 to be ON, the module 6483 to be ON, the module 6482 to be OFF, and the module 6484 to be OFF. In such disposition, the positive output 6140 will be connected to the positive output 6160. Accordingly, the direction of flow of current (or the direction of flow of electrons) is not aligned. As a result, energy will not be pulled off of the EMF outputs 6120. Illustratively, in such disposition, flywheels respectively disposed in the output 6120 and the output 6130 will continue to rotate without a degradation in rotational speed or loss in kinetic energy, i.e. since power is not being pulled off of such flywheels (excepting minimal degradation in rotational speed as a result of frictional forces).

Alternatively, in operation, the controller 6489 can switch the module 6481 to be OFF, the module 6483 to be OFF, the module 6482 to be ON, and the module 6484 to be ON. In such disposition, the positive output 6140 will be connected to the NEGATIVE output 6170 via the energy consuming device 6901. Also, the negative output 6150 will be connected to the positive output 6160. Accordingly, the direction of flow of current (or the direction of flow of electrons) IS aligned. As a result, energy will indeed be pulled off of the EMF outputs 6120. Illustratively, in such disposition, flywheels respectively disposed in the output 6120 and the output 6130 will decrease in rotational speed and will lose kinetic energy as power is being off. Based on conservation of energy, the degradation in speed of the flywheels can correspond to the amount of energy being consumed by the energy consuming device 6901, taking into account loss of energy due to frictional forces.

Accordingly, the manipulation of the modules 6481, 6482, 6483, 6484 via the controller 6489 can allow one to either turn on or off the ability for the system to generate electricity at any particular instance in time.

As shown in FIG. 34, the power assembly 3400 can include a plurality of junctions 6411. The junctions 6411 can include or be in the form of electrical connections. The junctions 6411 can allow ease of switching out one or more of the modules 6481, 6482, 6483, 6484. For example, if a module fails, then the junctions 6411 can allow ease in replacement of such module.

Figure 35:
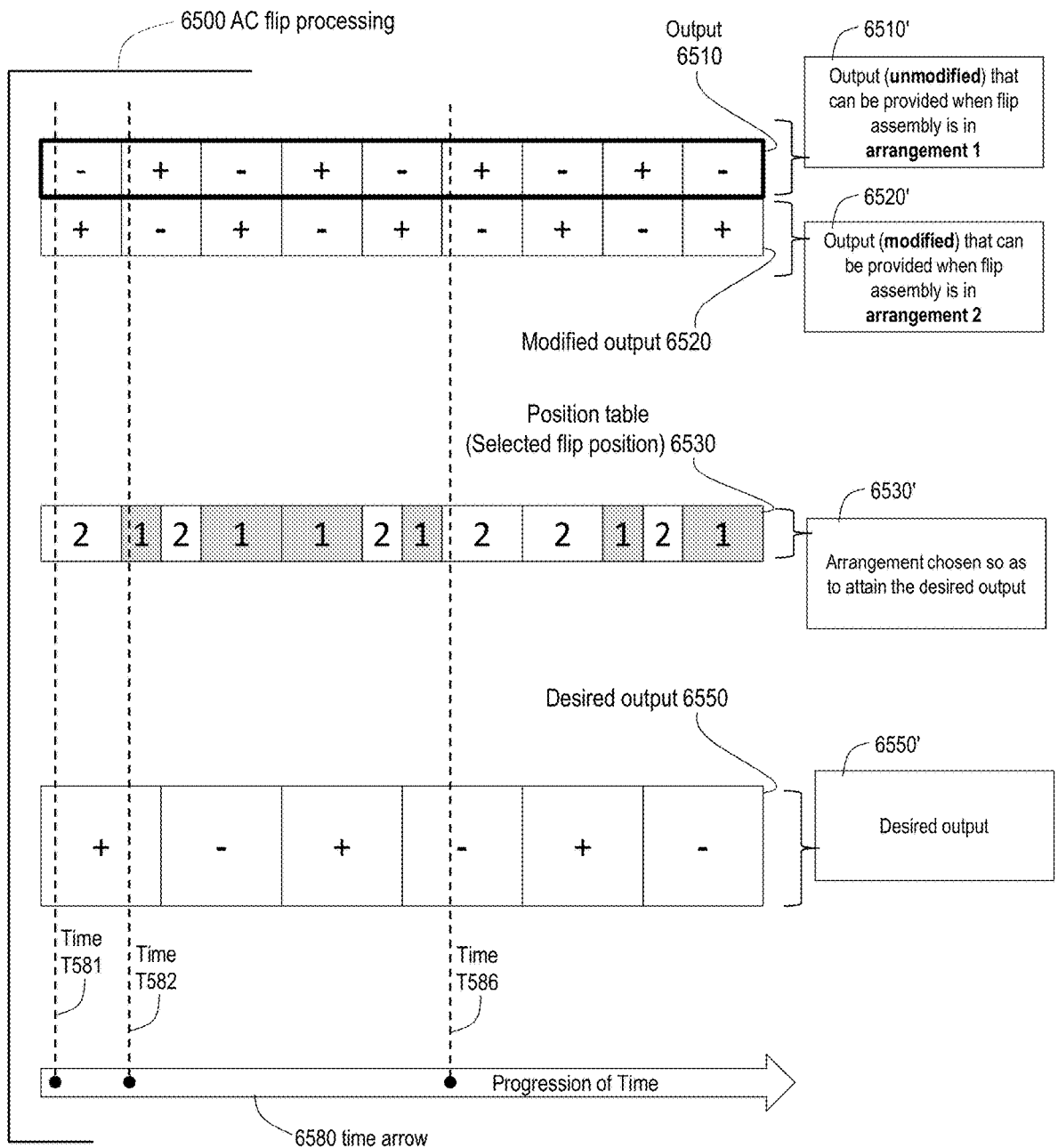
FIG. 35 is a diagram showing "AC stacked output" or "flip" processing in accordance with at least one embodiment of the disclosure.

FIG. 35 is a diagram showing "AC stacked output" or "flip" processing 6500 in accordance with at least one embodiment of the disclosure. In such processing, current or energy is manipulated so as to attain a desired polarity. For example, it may be desired to attain a particular polarity so as to energize a specific mechanical device, such as the drive wheels of a vehicle so as to rotate in a particular direction. To explain, the power assemblies of FIG. 30, FIG. 32, and FIG. 34 selectively output or do not output energy that is sourced from a primary EMF output and a secondary EMF output. That is, in a "go" arrangement, power is output from the power assembly of FIG. 32, for example, as described above. On the other hand, in a "stop" arrangement, power is not output from the power assembly of FIG. 32.

Figure 37:
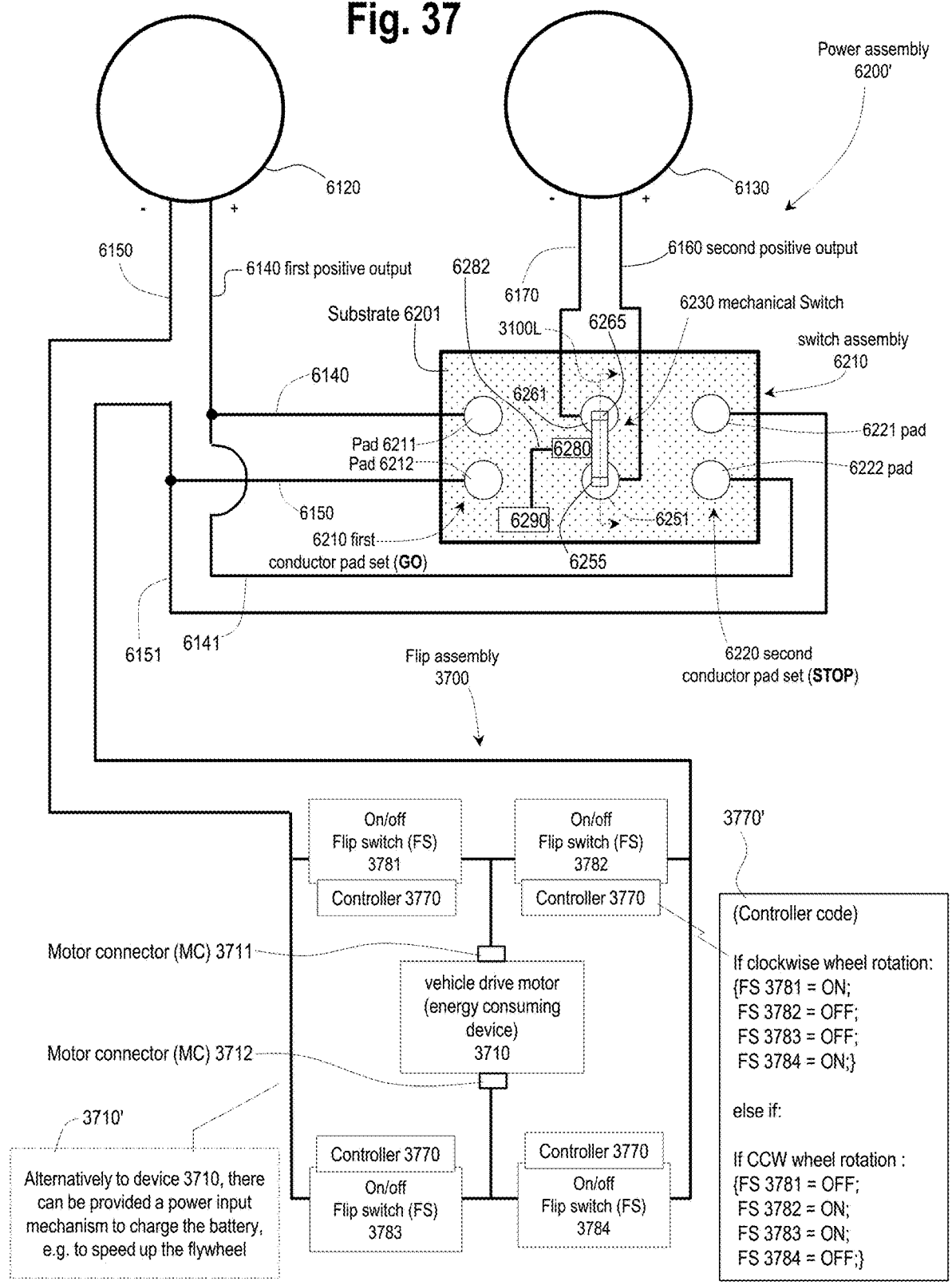
FIG. 37 is a schematic diagram of the power assembly FIG. 30, modified by a flip assembly, in accordance with at least one embodiment of the disclosure.

In the situation that power is indeed being output from the power assembly 6200 of FIG. 32, a polarity of such output power will be dependent, in accordance with at least some embodiments, to the particulars of the primary EMF output 6120 working in conjunction with the secondary EMF output 6130. FIG. 35 illustrates a control processing layer that can manipulate energy output from a power assembly 6200 such as illustrated in FIG. 32 or FIG. 30. As described below, FIG. 37 is a schematic diagram of a processing portion that can perform the processing of FIG. 35. For example, the AC stacked output processing or what can be described as flip processing can adjust a cycle speed and/or polarity (at a given point in time) of AC output current (which is output from a power assembly of the disclosure) so as to attain a desired output of AC current. For example, the output of the AC current might be for a vehicle motor that is used to propel a vehicle.

To perform flip processing, a flip assembly can be provided. Such a flip assembly is shown in FIG. 37 as flip assembly 3700. As reflected at tag 6510' in FIG. 35, output 6510 can be provided when flip assembly 3700 is in a first arrangement, i.e. in an "arrangement 1". As reflected at tag 6520' in FIG. 35, output 6520 can be provided when flip assembly 3700 is in a second arrangement, i.e. an "arrangement 2".

As can be seen in the output 6510, polarity of the output goes back and forth or toggles between positive and negative. It should be appreciated that a particular power consuming mechanism can require a particular toggle pace so as to be energized. Such consuming mechanism might be the drive motor of a vehicle. As reflected at tag 6550', a desired or required output can be in the form of the desired output 6550. In comparing output 6510 vis-à-vis desired output 6550, it should be appreciated that such outputs do not match. Accordingly, it can be the situation that it is needed to adjust the output 6510 so as to attain the desired output 6550. The AC stacked output processing or flip processing, as performed by a flip assembly 3700 (FIG. 37), provides this functionality.

To illustratively explain further, the output 6510 could be un-modified output that is generated from an arrangement such as shown in FIG. 30. For example, the output 6510 could be the output that is observed at the energy consuming device 6901. However, with the arrangement of FIG. 30 as shown, it may be needed or desired to modify the energy output from the energy consuming device 6901. The flip assembly 3700 and flip processing of the disclosure, by providing a control layer, allow such modification. Relatedly, the output 6520 of FIG. 35 may be described as modified output afforded by the flip assembly 3700.

To describe in further detail and with further reference to FIG. 35, a progression of time is represented by arrow 6580. In the illustrative example of FIG. 35, it can be seen that the desired output 6550 toggles between positive and negative at a slower rate or pace as compared to the generated output 6510.

The flip assembly 3700, as controlled by a controller, allows modification of the output 6510 so as to attain the desired output 6550. For example, FIG. 35 shows time T581. At time T581 the desired output 6550 requires a positive polarity. However, the unmodified output 6510 is negative polarity. Accordingly, the polarity can be switched or flipped by the flip assembly 3700. That is, the flip assembly will be changed to "arrangement 2"—so as to generate a modified output. As reflected at tag 6530', position table 6530 shows which flip arrangement, i.e. arrangement 1 or arrangement 2, is selected.

FIG. 35 also shows time T582. At time T582, the desired output 6550 is still positive polarity. However, the unmodified output 6510 has changed to be of positive polarity. Accordingly, in such situation, the unmodified output 6510 indeed corresponds to the desired output 6550. Accordingly, the position table 6530 shows that the flip assembly 3700 has been flipped to arrangement 1.

FIG. 35 also shows time T586. At time T586, the desired output is negative. At such time T586, the unmodified output will be positive. Accordingly, the flip processing (as provided by the flip assembly 3700) will be invoked so as to flip the polarity.

The flip processing as illustrated in FIG. 35 can be controlled by a suitable controller. For example, the controller can detect a rotational position of each of the two flywheels respectively driving the EMF outputs 6120, 6130. Note, such two respective flywheels can be synchronized or correlated with each other so as to provide the output 6510. Based on the rotational position of the two flywheels, the controller can know or be aware of which polarity the EMF output 6120, 6130 is outputting. In other words, the controller can know—through sensors—the polarity being received at the energy connection device 6902 and the manner in which the polarity is being toggled back and forth. Additionally, the controller can be fed data so as to know or be aware of the requisite or desired output 6550. Accordingly, at any point in time (including future points in time), the controller can determine whether the unmodified output being pushed out from the power assembly 3000 (FIG. 30) is or is not a match to the required output needed at the energy consuming device 6901. At the particular point in time, if the unmodified output 6510 is indeed the same as the desired output 6550, then arrangement 1 will be invoked by the controller (and the polarity will not be flipped). At a particular point in time, if the unmodified output 6510 is indeed NOT the same as the desired output 6550, then arrangement 2 will be invoked by the controller (and the polarity will indeed be flipped).

In an alternative embodiment different from the power assembly 3000, a different power assembly could include a series of permanent magnets positioned on a rotating drum. The rotating drum rotates within a case with electromagnets on either side of the rotating drum. Accordingly, the permanent magnets on the drum are sandwiched between the electromagnets on either side of the drum. The electromagnets might be positioned on a suitable support structure in a static disposition. By modifying or not modifying and output 6510 that is pushed out by such structure, one is able to adjust or manipulate polarity and pace of polarity of the output 6510. Accordingly, the system provides capability to match cycle speed and direction of current flow of a desired output 6550.

The description above with reference to FIG. 35 has been provided in the context of powering a device such as the drive wheel of a vehicle. However, the flip processing can also be used so as to "power up" the power assembly 3000 or another power assembly as described herein. In such processing, the controller would know particulars of the "power up" input coming into an energy connection device 6902—and would also know the particulars (i.e. polarity and pace of toggle of polarity) that is needed so as to power up the power assembly 6200. Accordingly, the controller can flip the polarity, using flip processing, so as to adjust the incoming energy (coming into the energy connection device 6902) to match with particulars of the energy needed to power up the power assembly 6200.

The flip processing can be described as "stacking" in that—by controlling or modifying the output 6510 (or output as observed by the energy consuming device 6901 of FIG. 30) through what might be described as on and offs, the system can generate or stack the unmodified output with a flipping control layer, i.e. a processing later. Accordingly, an electrical output can be selectively modified so as to match (the cycle speed and direction of current flow) to the particular output that is indeed required, such as by a car's drive motor.

As described with reference to FIGS. 35 and 36, this flip processing of the disclosure can be useful in (A) converting any Hertz AC or DC electricity from a source into a battery of the disclosure (e.g. the power supply 6200 of FIG. 32), regardless of movement speed of the particular mechanical storage unit, and (B) dispensing the energy (from the power supply 6200, for example) to any Hertz AC or DC device.

Figure 36:
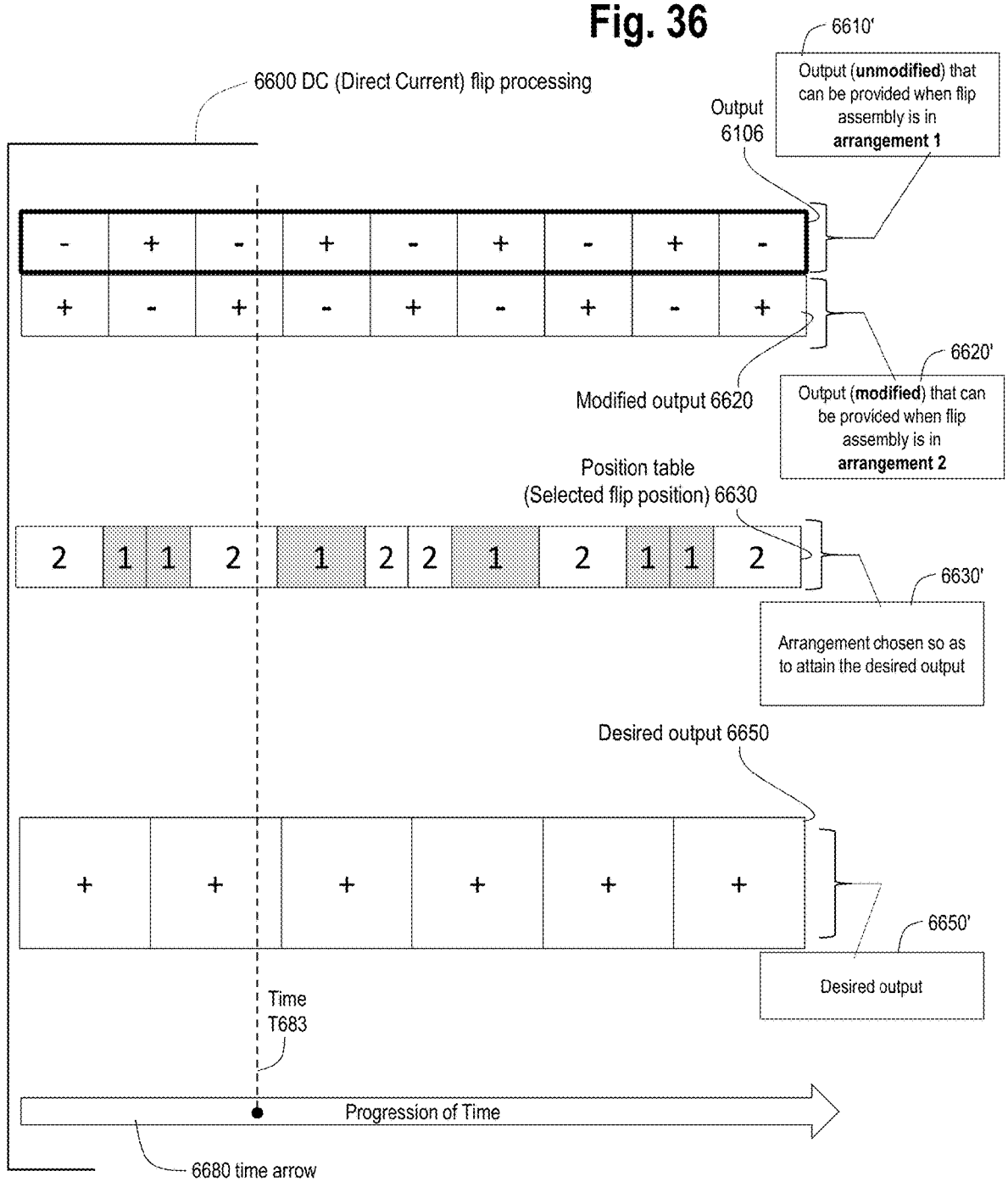
FIG. 36 illustrates DC stacked output processing or "flip processing" to provide a DC current, in accordance with at least one embodiment of the disclosure.

FIG. 36 illustrates DC stacked output processing or in other words "flip processing" 6600 to provide a DC current, in accordance with at least one embodiment of the disclosure. FIG. 36 demonstrates the application of flip processing in matching a DC current needed (e.g. to power a vehicle) with an AC current provided (e.g. from the power assembly 6200 or 6300).

As can be seen in the output 6610, polarity of the output goes back and forth or toggles between positive and negative. It should be appreciated that a particular power consuming mechanism can require a particular toggle pace so as to be energized. Such consuming mechanism might be the drive motor of a vehicle. As reflected at tag 6650', a desired or required output can be in the form of the desired output 6650. In comparing output 6610 vis-à-vis desired output 6650, it should be appreciated that such outputs do not match. Accordingly, it can be the situation that it is needed to adjust the output 6610 so as to attain the desired output 6650. The flip processing, as performed by a flip assembly 3700 (FIG. 37), provides this functionality.

To illustratively explain further, the output 6610 could be un-modified output that is generated from an arrangement such as shown in FIG. 30. For example, the output 6610 could be the output that is observed at the energy connection consuming device 6901. However, with the arrangement of FIG. 30 as shown, it may be needed or desired to modify the energy output for the energy consuming device. The flip assembly 3700 and flip processing of the disclosure, by providing a control layer, allows such modification. Relatedly, the output 6620 of FIG. 36 may be described as modified output afforded by the flip assembly 3700.

To describe in further detail and with further reference to FIG. 36, a progression of time is represented by arrow 6680. In the illustrative example of FIG. 35, it can be seen that the desired output 6650 does NOT toggle between positive and negative as compared to the generated output 6610.

The flip assembly 3700, as controlled by a controller 3770 (FIG. 37), allows modification of the output 6610 so as to attain the desired output 6650. For example, FIG. 36 shows time T683. At time T683, the desired output 6650 requires a positive polarity. However, the unmodified output 6610 is negative polarity. Accordingly, the polarity can be switched or flipped by the flip assembly 3700. That is, the flip assembly will be changed to "arrangement 2"—so as to generate a modified output. As reflected at tag 6630', position table 6630 shows which flip arrangement, i.e. arrangement 1 or arrangement 2, is selected.

The flip processing as illustrated in FIG. 35 can be controlled by a suitable controller 3770 (FIG. 37). For example, the controller can detect a rotational position of each of the two flywheels respectively driving the EMF outputs 6120, 6130. Note, such two respective flywheels can be synchronized or correlated with each other (e.g. to output positive polarity at the same time, and to output negative polarity at the same time) so as to provide the generated output. Based on the rotational position of the two flywheels, the controller can know or be aware of which polarity the EMF output 6120, 6130 is outputting. In other words, the controller can know—through sensors—the polarity being received at the energy connection device 6902 and the manner in which the polarity is being toggled back and forth. Additionally, the controller can be fed data so as to know or be aware of the requisite or desired output 6650. Accordingly, at any point in time (including future points in time), the controller can determine whether the unmodified output being pushed out (or that will be pushed out) from the power assembly 3000 (FIG. 30) is or is not a match to the required output needed at the energy consuming device 6901. At the particular point in time, if the unmodified output 6610 is indeed the same as the desired output 6650, then arrangement 1 will be invoked by the controller (and the polarity will not be flipped). At a particular point in time, if the unmodified output 6610 is indeed NOT the same as the desired output 6650, then arrangement 2 will be invoked by the controller (and the polarity will indeed be flipped).

As referenced above, FIG. 37 is a schematic diagram of a power assembly 3000' of FIG. 30, modified by the incorporation of a flip assembly or flipper assembly 3700, in accordance with at least one embodiment of the disclosure. The power assembly 3000' can include EMF outputs 6120, 6130; switch assembly 6210, associated connections, and additional structure and components the same as or similar to that shown in FIG. 30. However, circuitry associated with the energy consuming device 6901 can be varied as compared to that shown in FIG. 30. In particular, the arrangement of FIG. 37 can include the flip assembly 3700.

As shown in FIG. 37, the power assembly 3000' can include flip assembly 3700. The flip assembly 3700 can include an energy consuming device 3710. The energy consuming device 3710 can constitute or be in the form of a vehicle drive motor 3710. The energy consuming device 3710 can include a motor connector (MC) 3711 and a motor connector (MC) 3712. The motor connectors 3711, 3712 can be the electrical connections to the energy consuming device 3710. For example, if a positive polarity is applied to the MC 3711, then the motor 3710 will turn in a first direction. Alternatively, if a negative polarity is applied to the MC 3711, then the motor 3710 will turn in a second or opposite direction.

As described above, power is generated from the EMF sources 6120, 6130 and manipulation of the switch assembly 6210. The power will be available at the flip assembly 3700 of a particular polarity. The flip assembly 3700 can reverse or "flip" such polarity as may be desired. Operation and processing of the flip assembly 3700 can be performed by a controller 3770. The controller 3770 can be distributed across the flip assembly 3700 with the various components of the controller 3770 connected wirelessly or via wires or other communication pathways. The controller 3770 can include one or more processors and associated databases. The controller 3770 can be in communication with or can be integrated with the controller 6280 in the switch assembly 6210.

The flip assembly 3700 can include a flip switch (FS) 3781; a flip switch (FS) 3782; a flip switch (FS) 3783; and a flip switch (FS) 3784. Each of such flip switches can be controlled by the controller 3770. Each of such flip switches can be an on/off switch so as to allow current to pass through, or alternatively, so as to not allow current to pass through.

In operation of the flip assembly 3700, the controller 3770 can control whether the various flip switches 3781, 3782, 3783, 3784 are on or off. As a result, the controller 3770 can control the polarity that the energy consuming device 3710 experiences. Such functionality provides for the ability to adjust an incoming energy or current source to be what is needed or desired. Such functionality provides for the ability to control operation of the energy consuming device 3710 as desired. For example, such functionality can be used to reverse direction of wheel rotation of a vehicle.

Illustratively, example is provided at box 3770' in FIG. 37. Box 3770' provides controller code that can be used by the controller 3770, for example. In such illustrative example, if clockwise rotation is desired, then the controller 3770 would control the various flip switches to be of the disposition: FS 3781=ON; FS 3782=OFF; FS 3783=OFF; FS 3784=ON.

On the other hand, if counterclockwise (CCW) will rotation is desired, then the controller 3770 would control the various flip switches to be of the disposition: FS 3781=OFF; FS 3782=ON; FS 3783=ON; FS 3784=OFF.

As reflected at 3710', alternatively to device 3710, there can be provided a power input mechanism to charge the battery, i.e. rather than an energy consuming device 3710. Further, for example, the energy consuming device 3710 might be used to charge the EMF output devices 6120, 6130. Such charging might include the speeding up of a flywheel, for example. In some embodiments, the energy consuming device 3710 might be "switched out" for an energy generating device so as to charge the EMF output devices 6120, 6130.

To explain further, wiring can be provided between the switch assembly 6210 and the energy consuming device 3710 so as to flip the current being experienced by the energy consuming device 3710. Such arrangement can be used to control direction in which a flow of electrons flows through the energy consuming device 3710. The on/off operation of the flip switches might also be described as enabling or disabling the flip switches.

As disclosed herein, the systems and methods of the disclosure output and input energy. Energy can be described in various forms as electrical energy, current, voltage, electrical output, electrical input, EMF (electromotive force) power, and related terminology and similar terms. The manipulation of the wiring in the systems described herein can allow for a circuit, either in part or in full, to change the direction of current within a system with respect to each current producing element. If the circuit is completed in such a way that the current produced by the two sources is in the same direction, a higher, aggregate movement of electrons can take place, whereas if the circuit is completed in such a way that the two sources generate current in opposite directions, a smaller, aggregate movement of electrons can take place. In the event that a higher aggregate movement takes place, the system will see a larger depreciation in kinetic energy storage, than that of the smaller aggregate storage. The relationship between the energy drawn off the system and the depreciation can be proportionally calculable, with environmental resistance accounting for a small net energy loss. This relationship between the system being in a higher aggregate movement, and having a high delta (with respect to the mechanical energy storage system) can additionally represent the relationship between the system and an external source in charging the device (taking electrical energy from the environment, and using it to charge the device).

By changing the direction of the flow of electrons with respect to an input/output port, the system can control whether the input/output port's direction of current flow matches that of the rest of the system or not. This then and in turn can allow either the user, and/or a computer processing unit to manipulate frequency of an AC electron flow produced by the system into any other frequency AC electron flow or any directional DC electron flow, via a similar logic to those described in FIG. 35 and FIG. 36. This logic can additionally be used in reverse to charge the device, by taking any frequency AC current or any directional DC current, and manipulating them to charge the device at whatever the systems instantaneous AC/DC frequency/direction is. Although this method for charging a device of the disclosure can be useful, the system can also use an external force, to manually speed up or slow down the mechanical energy storage device. By doing so, one can drastically reduce the charging time, proportionally to the differential between the force, and the mass of the mechanical energy storage device. An example of this could be a car charging station, where a powerful motor is able to transfer a large wattage through the external motor to a rotating flywheel within a relatively short or instantaneous timeframe. This sort of charging capability will prove exceptionally useful in smaller devices, such as drones and portable chargers, where the differential in size can be exaggerated easily. This differential between the charge time, and the use time can also be used via the reverse charging technique, by implementing pulse width modulation to the output. By doing so, one can effectively output a lower wattage for a longer duration of time, whilst still using the same amount of total energy (before accounting for energy loss due to resistance). In this method, one can additionally input square mean waves, and output sine mean waves, which in turn can require less power, and put less strain on the power drawing system at hand.

In addition to the technology in this disclosure, standard known electrical practices, such as the implementation of current/voltage smoothers can be used to make the system more efficient, and practical. The current/voltage smoothers in particular can be placed in the circuit after the primary and secondary generators, but before the directional switches, such that one can output a more constant flow of electrons that can be manipulated with pulse width modulation for a more coherent, and predictable assembly.

In the case that you are building a natively AC generator, rather than a DC generator where you always know the flow of electrons, a sensor setup can be implemented such that the CPU can always know what direction of current is produced by each of the sub-generators (the primary and secondary generators), even when a zero net current is produced. An example of such a setup could be a color sensor mounted on the support structure, which monitors a black and white dial which is adhered to the moving object, and which changes between two colors at each magnet interval.

Figure 38:
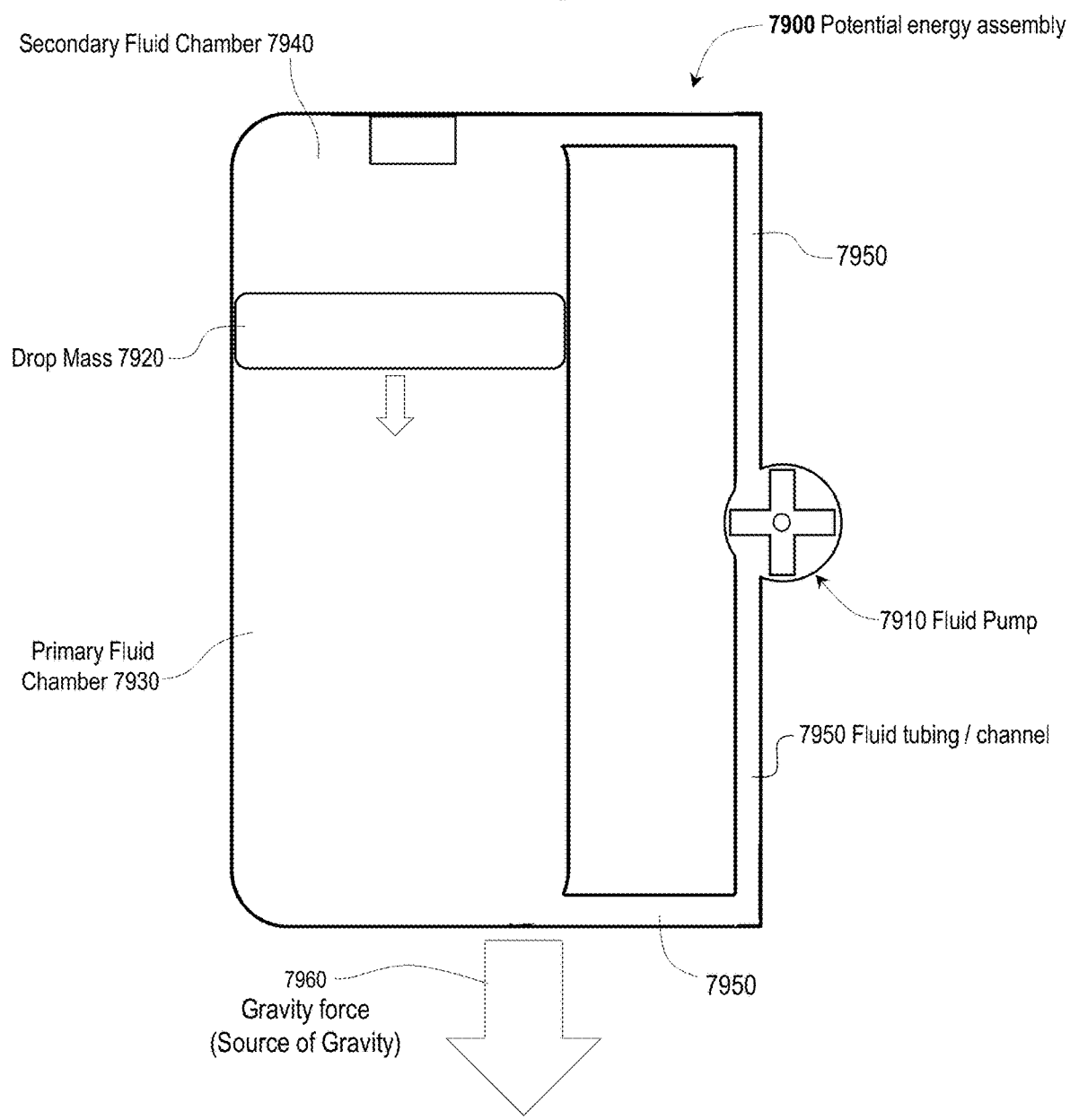
FIG. 38 illustrates potential energy storage unit, in accordance with at least one embodiment of the disclosure.

FIG. 38 illustrates potential energy storage unit example, in accordance with at least one embodiment of the disclosure. FIG. 38 demonstrates an example of a mechanical energy storage arrangement that can use potential energy, whilst avoiding utilizing either a flywheel or an oscillating mass. FIG. 38 shows a potential energy assembly 7900 can include a fluid pump 7910, a drop mass 7920, a primary fluid chamber 7930, a secondary fluid chamber 7940, fluid tubing 7950, and a source of gravity 7960. The primary fluid chamber 7930 can hold an incompressible fluid, such as water, which is positioned below a drop mass 7920, which in turn wants to force the fluid through the fluid tubing 7950, and rotate the fluid pump 7910. This fluid pump can be mechanically connected to a generator system, such as the stacked output matching assembly, or any generator disclosed herein, to transfer the forced fluid movement into electrical energy. The potential energy assembly 7900 can provide a source of energy that can be used in the power assemblies or systems as described herein.

++

It is appreciated that features and/or characteristics of a particular embodiment described herein may be used in conjunction with other embodiments, as may be desired.

In this disclosure, quotation marks, such as with "energy object", have been used to enhance readability and/or to parse out a term or phrase for clarity.

It is appreciated that the various components of embodiments of the disclosure may be made from any of a variety of materials including, for example, plastic, plastic resin, nylon, composite material, foam, rubber, wood, metal, leather polycarbonate, and/or ceramic, for example, or any other material as may be desired. For example, the device(s) of this disclosure may be produced from a plastic resin, such as polyethylene, and be injection molding.

A variety of production techniques may be used to make the apparatuses as described herein. For example, suitable textile fabrication, suitable injection molding and other molding techniques and other manufacturing techniques might be utilized. Also, the various components of the apparatuses may be integrally formed, as may be desired, in particular when using molding construction techniques. Also, the various components of the apparatuses may be formed in pieces and connected together in some manner, such as with suitable adhesive and/or heat bonding.

The various apparatuses and components of the apparatuses, as described herein, may be provided in various sizes and/or dimensions, as desired.

It will be appreciated that features, elements and/or characteristics described with respect to one embodiment of the disclosure may be variously used with other embodiments of the disclosure as may be desired.

It will be appreciated that the effects of the present disclosure are not limited to the above-mentioned effects, and other effects, which are not mentioned herein, will be apparent to those in the art from the disclosure and accompanying claims.

Although the preferred embodiments of the present disclosure have been disclosed for illustrative purposes, those skilled in the art will appreciate that various modifications, additions and substitutions are possible, without departing from the scope and spirit of the disclosure and accompanying claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present.

It will be understood that when an element or layer is referred to as being "onto" another element or layer, the element or layer can be directly on another element or layer or intervening elements or layers. Examples include "attached onto", secured onto", and "provided onto". In contrast, when an element is referred to as being "directly onto" another element or layer, there are no intervening elements or layers present. As used herein, "onto" and "on to" have been used interchangeably.

It will be understood that when an element or layer is referred to as being "attached to" another element or layer, the element or layer can be directly attached to the another element or layer or intervening elements or layers. In contrast, when an element is referred to as being "attached directly to" another element or layer, there are no intervening elements or layers present. It will be understood that such relationship also is to be understood with regard to: "secured to" versus "secured directly to"; "provided to" versus "provided directly to"; and similar language.

As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper", "top", "bottom", "left", "right" and the like, may be used herein for ease of description to describe the relationship of one element or feature to another element(s) or feature(s) as illustrated in the drawing figures. It will be understood that spatially relative terms are intended to encompass different orientations of structures in use or operation, in addition to the orientation depicted in the drawing figures. For example, if a device in the drawing figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein should be interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "including", "comprises" and/or "comprising," and variations thereof, for example, when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to schematic diagrams, diagrams and/or cross-section illustrations, for example, that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of components illustrated herein but are to include deviations in shapes that result, for example, from manufacturing or fabrication.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, as otherwise noted herein, when a particular feature, structure, or characteristic is described in connection with any embodiment, it is submitted that it is within the purview of one skilled in the art to effect and/or use such feature, structure, or characteristic in connection with other ones of the embodiments.

Embodiments are also intended to include or otherwise cover methods of using and methods of manufacturing any or all of the elements disclosed above.

While the subject matter has been described in detail with reference to exemplary embodiments thereof, it will be apparent to one skilled in the art that various changes can be made, and equivalents employed, without departing from the scope of the disclosure.

All related art references discussed herein are hereby incorporated by reference in their entirety.

All documents referenced herein are hereby incorporated by reference in their entirety.

The foregoing detailed description has set forth various embodiments of the systems, devices, assemblies and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

Thus, particular embodiments of the subject matter have been described. In some cases, the actions described in accordance with one or more of the embodiments may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

It is appreciated that a feature of one embodiment of the disclosure as described herein may be used in conjunction with features of one or more other embodiments as may be desired.

As used herein, "data" and "information" may have been used interchangeably.

Any motorized structure as described herein may utilize gears, linkages, sprocket with chain, or other known mechanical arrangement so as to transfer requisite motion and/or energy. Hereinafter, further aspects of implementation of the systems and methods of the disclosure will be described.

As described herein, at least some embodiments of the system of the disclosure and various processes, of embodiments, are described as being performed by one or more computer processors. Such one or more computer processors may be in the form of a "processing machine," i.e. a tangibly embodied machine. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, code or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the machine used to implement the disclosure may be in the form of a processing machine. The processing machine may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the disclosure.

The processing machine used to implement the disclosure may utilize a suitable operating system. Thus, embodiments of the disclosure may include a processing machine running the Windows 10 operating system, the Windows 8 operating system, Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the disclosure as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing is described above is performed by various components and various memories. However, it is appreciated that the processing performed by two distinct components as described above may, in accordance with a further embodiment of the disclosure, be performed by a single component. Further, the processing performed by one distinct component as described above may be performed by two distinct components. In a similar manner, the memory storage performed by two distinct memory portions as described above may, in accordance with a further embodiment of the disclosure, be performed by a single memory portion. Further, the memory storage performed by one distinct memory portion as described above may be performed by two memory portions.

Further, as also described above, various technologies may be used to provide communication between the various processors and/or memories, as well as to allow the processors and/or the memories of the disclosure to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the disclosure on a processing machine, for example. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the disclosure may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

A suitable programming language may be used in accordance with the various embodiments of the disclosure. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the systems and methods of the disclosure. Rather, any number of different programming languages may be utilized as is necessary or desirable.

Also, the instructions and/or data used in the practice of the disclosure may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, as also described above, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the disclosure.

Further, the memory or memories used in the processing machine that implements the disclosure may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods of the disclosure, a variety of "user interfaces" may be utilized to allow a user to interface with the processing machine or machines that are used to implement the disclosure. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the systems and methods of the disclosure, it is not necessary that a human user actually interact with a user interface used by the processing machine of the disclosure. Rather, it is also contemplated that the user interface of the disclosure might interact, i.e., convey and receive information, with another processing machine, rather than a human user.

Accordingly, the other processing machine might be characterized as a user. Further, it is contemplated that a user interface utilized in the systems and methods of the disclosure may interact partially with another processing machine or processing machines, while also interacting partially with a human user.

In an embodiment-A, a power assembly that stores and disperses energy, the power assembly comprising: (A) a first energy object that experiences movement so as to store kinetic energy in the energy object, the energy object including a first magnet assembly through which electrons are driven resulting in electric output from the first magnet assembly, and the electric output dependent on experienced EMF (electro-motive force) that is experienced by the first magnet assembly, and the first energy object outputting a first positive output and a first negative output; (B) a second energy object that experiences movement so as to store kinetic energy in the energy object, the energy object including a second magnet assembly through which electrons are driven resulting in electric output from the second magnet assembly, and the electric output dependent on experienced EMF (electro-motive force) that is experienced by the second magnet assembly, and the second energy object outputting a second positive output and a second negative output; and (C) a switch assembly adapted to perform switching to switch between: a first arrangement in which the first positive output is connected to the second positive output, and such first arrangement provides decreased energy output; and a second arrangement in which the first positive output is connected to the first negative output, and such second arrangement provides increased energy output relative to the decreased energy output; and the increased energy output relative to the decreased energy output is attributable to the switching. In the embodiment-A of the power assembly, the switch assembly being controlled by a controller that controls switching between the first arrangement and the second arrangement. In the embodiment-A of the power assembly, including an energy consuming device, and the increased energy output is output to the energy consuming device. In the embodiment-A of the power assembly, including an energy consuming device, and the increased energy output is output to the energy consuming device, and the energy consuming device includes a drive motor for a vehicle. In the embodiment-A of the power assembly, the switch assembly includes a pair of movable contact tips, a first conductor pad set, and a second conductor pad set, and the movable contact tips being selectively connected to the first conductor pad set OR the second conductor pad set. In such embodiment, the first conductor pad set and the second conductor pad set are provided on an insulating substrate. In the embodiment-A of the power assembly, the pair of movable contact tips are provided on a distal end of an arm. In the embodiment-A of the power assembly, the switch assembly includes a mechanical switch. In the embodiment-A of the power assembly, the switch assembly includes a plurality of computer controlled, by a computer, solid state switches, and the computer configured to control the plurality of solid state switches by energizing to turn on, and by de-energizing to turn off. In the embodiment-A of the power assembly, the switch assembly includes a static plate and a dynamic plate. In such embodiment, the dynamic plate being pivotable about a pivot and driven by a controller. In the embodiment-A of the power assembly, the first energy object is a mechanical energy storage device including a rotating flywheel. In the embodiment-A of the power assembly, wherein the first energy object is configured to be charged by increasing speed of the flywheel, and is configured to decrease in rotational speed in conjunction with the increased energy output.

In an embodiment-B, a power assembly that stores and disperses energy, the power assembly comprising: (A) a first energy object that experiences movement so as to store kinetic energy in the energy object, the energy object including a first magnet assembly through which electrons are driven resulting in electric output from the first magnet assembly, and the electric output dependent on experienced EMF (electro-motive force) that is experienced by the first magnet assembly, and the first energy object outputting a first positive output and a first negative output; (B) a second energy object that experiences movement so as to store kinetic energy in the energy object, the energy object including a second magnet assembly through which electrons are driven resulting in electric output from the second magnet assembly, and the electric output dependent on experienced EMF (electro-motive force) that is experienced by the second magnet assembly, and the second energy object outputting a second positive output and a second negative output; (B) a switch assembly adapted to perform switching to switch between: a first arrangement in which the first positive output is connected to the second positive output, and such first arrangement provides decreased energy output; and a second arrangement in which the first positive output is connected to the first negative output, and such second arrangement provides increased energy output relative to the decreased energy output, and the increased energy output relative to the decreased energy output is attributable to the switching; and the increased energy constituting output energy; and a flip assembly that performs flipping of the output energy. In the embodiment-B of the power assembly, the switch assembly being controlled by a controller that controls switching between the first arrangement and the second arrangement. In the embodiment-B of the power assembly, the switch assembly being controlled by a controller that controls switching between the first arrangement and the second arrangement; and the controller further controlling the flip assembly to perform the flipping of the output energy. In the embodiment-B of the power assembly, the flip assembly includes four (4) flip switches. In the embodiment-B of the power assembly, the flip assembly includes four (4) flip switches, and the flip switches are solid state devices that are controllable by a controller. In the embodiment-B of the power assembly, the flipping of the output energy includes selectively flipping or not flipping the output energy so as to attain desired energy output for an energy consuming device. In the embodiment-B of the power assembly, the flipping of the output energy includes selectively flipping or not flipping the output energy so as to attain a desired AC (alternating current) energy output for an energy consuming device. In the embodiment-B of the power assembly, the flipping of the output energy includes selectively flipping or not flipping the output energy so as to attain a desired DC (direct current) energy output for an energy consuming device. In the embodiment-B of the power assembly, the flipping of the output energy includes: a first flipping arrangement in which the polarity of the output energy is unmodified; and a second flipping arrangement in which the polarity of the output energy is modified so as to reverse polarity of the output energy. In the embodiment-B of the power assembly, including an energy consuming device, and the increased energy output is output to the energy consuming device. In the embodiment-B of the power assembly, including an energy consuming device, and the increased energy output is output to the energy consuming device, and the energy consuming device includes a drive motor for a vehicle. In the embodiment-B of the power assembly, the switch assembly includes a mechanical switch. In the embodiment-B of the power assembly, the first energy object is a mechanical energy storage device including a rotating flywheel. In the embodiment-B of the power assembly, the first energy object is a mechanical energy storage device including a rotating flywheel and a generator.

In an embodiment-C, an energy apparatus that stores and disperses energy, the energy apparatus comprising: (A) an energy object that experiences movement so as to store kinetic energy in the energy object, the energy object including a magnet assembly through which electrons are driven resulting in electric output from the magnet assembly, and the electric output dependent on experienced EMF (electro-motive force) that is experienced by the magnet assembly; (B) a supporting structure that supports the energy object while providing for the movement of the energy object; a first tuning magnet that is supported adjacent the energy object, the first tuning magnet positionable throughout a range of positions, the positions including a first position and a second position; a second tuning magnet that is supported adjacent to the energy object; wherein: (a) in the first position, the first tuning magnet possesses a first spatial relationship with the second tuning magnet that results in a first aggregation of EMF, and the first aggregation of EMF resulting in the experienced EMF being a first experienced EMF, and the first experienced EMF, with the movement of the energy object, resulting in the electric output being a first electric output, and (b) in the second position, the first tuning magnet possesses a second spatial relationship with the second tuning magnet that results in a second aggregation of EMF, and the second aggregation of EMF resulting in the experienced EMF being a second experienced EMF, and the second experienced EMF, with the movement of the energy object, resulting in the electric output being a second electric output. In the embodiment-C of the energy apparatus, the movement of the energy object is constituted by rotation of the energy object. In the embodiment-C of the energy apparatus, the energy object is a mechanical energy storage device constituted by a rotating flywheel. In the embodiment-C of the energy apparatus, wherein the magnet assembly includes an electromagnet connected to wires, and the electric output being output through the wires. In the embodiment-C of the energy apparatus, the movement of the energy object is constituted by oscillation of the energy object along a linear path, and the oscillation effected by springs or elastic members at opposing ends of the linear path. In the embodiment-C of the energy apparatus, the first position is a first angular position, and the second position is a second angular position. In the embodiment-C of the energy apparatus, the energy object is a flywheel, and the energy apparatus includes structure to speed up the flywheel from an external source. In the embodiment-C of the energy apparatus, the structure to speed up the flywheel from an external source includes a gear arrangement. In the embodiment-C of the energy apparatus, the energy object is a flywheel, and the energy apparatus is configured to speed up the flywheel by inputting current into the energy object. In the embodiment-C of the energy apparatus, the magnet assembly is one of a permanent magnet and an electromagnet. In the embodiment-C of the energy apparatus, the magnet assembly being an electromagnet and the energy object being a flywheel, and the electrical output is output through at least one wire. In the embodiment-C of the energy apparatus, the first position is where EMFs of the first and second tuning magnets are canceled out, as observed by the energy object, resulting in an output of substantially zero. In the embodiment-C of the energy apparatus, the first position is where EMFs of the first and second tuning magnets, as observed by the energy object, are combined. In the embodiment-C of the energy apparatus, the angular position of the second tuning magnet being selectable. In the embodiment-C of the energy apparatus, the angular position of the second tuning magnet being fixed. In the embodiment-C of the energy apparatus, the energy object being a spinning flywheel, and the flywheel supported on bearings, and the energy object being a plurality of electromagnet provided in the flywheel.

It will be readily understood by those persons skilled in the art that the present disclosure is susceptible to broad utility and application. Many embodiments and adaptations of the present disclosure other than those herein described, as well as many variations, modifications and equivalent arrangements, will be apparent from or reasonably suggested by the present disclosure and foregoing description thereof, without departing from the substance or scope of the disclosure.

Accordingly, while the present disclosure has been described here in detail in relation to its exemplary embodiments, it is to be understood that this disclosure is only illustrative and exemplary of the present disclosure and is made to provide an enabling disclosure of the invention. Accordingly, the foregoing disclosure is not intended to be construed or to limit the present disclosure or otherwise to exclude any other such embodiments, adaptations, variations, modifications and equivalent arrangements.

What is claimed is:

1. A power assembly that stores and disperses energy, the power assembly comprising:
   a first energy object that experiences movement so as to store kinetic energy in the first energy object, the first energy object including a first magnet assembly through which electrons are driven resulting in electric output from the first magnet assembly, and the electric output dependent on experienced EMF (electro-motive force) that is experienced by the first magnet assembly, and the first energy object outputting a first positive output and a first negative output;
   a second energy object that experiences movement so as to store kinetic energy in the second energy object, the second energy object including a second magnet assembly through which electrons are driven resulting in electric output from the second magnet assembly, and the electric output dependent on experienced EMF (electro-motive force) that is experienced by the second magnet assembly, and the second energy object outputting a second positive output and a second negative output;
   a switch assembly adapted to perform switching to switch between:
      a first arrangement in which the first positive output is connected to the second positive output, and such first arrangement provides decreased energy output; and
      a second arrangement in which the first positive output is connected to the first negative output, and such second arrangement provides increased energy output relative to the decreased energy output; and
      the increased energy output relative to the decreased energy output is attributable to the switching.

2. The power assembly of claim 1, the switch assembly being controlled by a controller that controls switching between the first arrangement and the second arrangement.

3. The power assembly of claim 1, including an energy consuming device, and the increased energy output is output to the energy consuming device.

4. The power assembly of claim 1, including an energy consuming device, and the increased energy output is output to the energy consuming device, and the energy consuming device includes a drive motor for a vehicle.

5. The power assembly of claim 1, the switch assembly includes a pair of movable contact tips, a first conductor pad set, and a second conductor pad set, and the movable contact tips being selectively connected to the first conductor pad set OR the second conductor pad set.

6. The power assembly of claim 5, the first conductor pad set and the second conductor pad set are provided on an insulating substrate.

7. The power assembly of claim 1, the switch assembly includes a pair of movable contact tips that are provided on a distal end of an arm.

8. The power assembly of claim 1, the switch assembly includes a mechanical switch.

9. The power assembly of claim 1, the switch assembly includes a plurality of computer controlled, by a computer, solid state switches, and the computer configured to control the plurality of solid state switches by energizing to turn on, and by de-energizing to turn off.

10. The power assembly of claim 1, the switch assembly includes a static plate and a dynamic plate.

11. The power assembly of claim 10, the dynamic plate being pivotable about a pivot and driven by a controller.

12. The power assembly of claim 1, the first energy object is a mechanical energy storage device including a rotating flywheel.

13. The power assembly of claim 12, wherein the first energy object is configured to be charged by increasing speed of the rotating flywheel, and is configured to decrease in rotational speed in conjunction with the increased energy output.

14. A power assembly that stores and disperses energy, the power assembly comprising:

a first energy object that experiences movement so as to store kinetic energy in the first energy object, the first energy object including a first magnet assembly through which electrons are driven resulting in electric output from the first magnet assembly, and the electric output dependent on experienced EMF (electro-motive force) that is experienced by the first magnet assembly, and the first energy object outputting a first positive output and a first negative output;

a second energy object that experiences movement so as to store kinetic energy in the second energy object, the second energy object including a second magnet assembly through which electrons are driven resulting in electric output from the second magnet assembly, and the electric output dependent on experienced EMF (electro-motive force) that is experienced by the second magnet assembly, and the second energy object outputting a second positive output and a second negative output;

a switch assembly adapted to perform switching to switch between:

a first arrangement in which the first negative output is connected to the second negative output, and such first arrangement provides decreased energy output;

a second arrangement in which the first positive output is connected to the first negative output, and such second arrangement provides increased energy output relative to the decreased energy output; and the increased energy output relative to the decreased energy output is attributable to the switching.

* * * * *